United States Patent
Jungck et al.

(10) Patent No.: US 9,444,785 B2
(45) Date of Patent: Sep. 13, 2016

(54) TRANSPARENT PROVISIONING OF NETWORK ACCESS TO AN APPLICATION

(75) Inventors: Peder J. Jungck, San Carlos, CA (US); Matthew Donald Drown, Palo Alto, CA (US); Sean M. Goller, Mountain View, CA (US)

(73) Assignee: CloudShield Technologies, Inc., Sunnyvale, CA (US)

( * ) Notice: Subject to any disclaimer, the term of this patent is extended or adjusted under 35 U.S.C. 154(b) by 582 days.

(21) Appl. No.: 12/617,248

(22) Filed: Nov. 12, 2009

(65) Prior Publication Data
US 2010/0103837 A1 Apr. 29, 2010

Related U.S. Application Data

(63) Continuation-in-part of application No. 12/493,312, filed on Jun. 29, 2009, and a continuation-in-part of application No. 11/189,172, filed on Jul. 25, 2005, now Pat. No. 7,570,663, which is a continuation of application No. 09/858,309, filed on May 15, 2001, now Pat. No. 7,032,031, which is a continuation-in-part of application No. 09/602,129, filed on Jun. 23, 2000, now Pat. No. 6,829,654.

(51) Int. Cl.
*H04L 29/06* (2006.01)
*H04L 29/12* (2006.01)
(Continued)

(52) U.S. Cl.
CPC ..... *H04L 63/0227* (2013.01); *H04L 29/12066* (2013.01); *H04L 61/1511* (2013.01); *H04L 63/0263* (2013.01); *H04L 63/1458* (2013.01); *H04L 12/2836* (2013.01); *H04L 29/06068* (2013.01); *H04L 29/06156* (2013.01); *H04L 29/06476* (2013.01); *H04L 29/08756* (2013.01);
(Continued)

(58) Field of Classification Search
None
See application file for complete search history.

(56) References Cited

U.S. PATENT DOCUMENTS

| 4,692,918 A | 9/1987 | Elliott et al. |
|---|---|---|
| 5,179,556 A | 1/1993 | Turner |

(Continued)

FOREIGN PATENT DOCUMENTS

| EP | 0 865 180 A2 | 3/1998 |
|---|---|---|
| EP | WO 98/17039 | 4/1998 |

(Continued)

OTHER PUBLICATIONS

Rule-Based Filtering for Java Applets, Iglio et al., Computer Security Applications Conference, 1998, Proceedings, 14th Annual Dec. 7-11, 1998 pp. 112-119.

(Continued)

*Primary Examiner* — Andrew Oh
(74) *Attorney, Agent, or Firm* — Lempia Summerfield Katz LLC

(57) ABSTRACT

An apparatus and method for enhancing the infrastructure of a network such as the Internet is disclosed. A packet interceptor/processor apparatus is coupled with the network so as to be able to intercept and process packets flowing over the network. Further, the apparatus provides external connectivity to other devices that wish to intercept packets as well. The apparatus applies one or more rules to the intercepted packets which execute one or more functions on a dynamically specified portion of the packet and take one or more actions with the packets. The apparatus is capable of analyzing any portion of the packet including the header and payload. Actions include releasing the packet unmodified, deleting the packet, modifying the packet, logging/storing information about the packet or forwarding the packet to an external device for subsequent processing. Further, the rules may be dynamically modified by the external devices.

68 Claims, 30 Drawing Sheets

(51) Int. Cl.
  *H04L 29/08* (2006.01)
  *H04L 12/28* (2006.01)
  *H04L 12/24* (2006.01)
(52) U.S. Cl.
  CPC ........ *H04L 41/0213* (2013.01); *H04L 41/5054* (2013.01); *H04L 69/08* (2013.01); *H04L 69/169* (2013.01)

(56) References Cited

U.S. PATENT DOCUMENTS

| | | | |
|---|---|---|---|
| 5,195,181 A | 3/1993 | Bryant et al. | |
| 5,566,170 A | 10/1996 | Bakke et al. | |
| 5,619,621 A | 4/1997 | Puckett | |
| 5,784,582 A | 7/1998 | Hughes | |
| 5,805,820 A | 9/1998 | Bellovin et al. | |
| 5,867,704 A | 2/1999 | Tanaka et al. | |
| 5,938,737 A | 8/1999 | Smallcomb et al. | |
| 5,953,503 A | 9/1999 | Mitzenmacher et al. | |
| 5,991,713 A | 11/1999 | Unger et al. | |
| 5,996,011 A | 11/1999 | Humes | |
| 6,006,264 A | 12/1999 | Colby et al. | |
| 6,011,842 A * | 1/2000 | Brivet | H04M 3/42 370/352 |
| 6,014,660 A | 1/2000 | Lim et al. | |
| 6,016,512 A | 1/2000 | Huitema | |
| 6,029,175 A | 2/2000 | Chow et al. | |
| 6,038,223 A * | 3/2000 | Hansson | H04W 74/002 370/328 |
| 6,038,233 A * | 3/2000 | Hamamoto | H04L 29/12009 370/401 |
| 6,046,980 A | 4/2000 | Packer | |
| 6,052,718 A | 4/2000 | Gifford | |
| 6,061,451 A * | 5/2000 | Muratani | H04N 7/1675 348/E7.056 |
| 6,064,676 A | 5/2000 | Slattery et al. | |
| 6,065,055 A | 5/2000 | Hughes et al. | |
| 6,070,191 A | 5/2000 | Narendran et al. | |
| 6,073,168 A | 6/2000 | Mighdoll et al. | |
| 6,084,878 A | 7/2000 | Crayford et al. | |
| 6,105,027 A | 8/2000 | Schneider et al. | |
| 6,108,703 A | 8/2000 | Leighton et al. | |
| 6,118,784 A * | 9/2000 | Tsuchiya | H04L 12/66 370/392 |
| 6,119,165 A | 9/2000 | Li et al. | |
| 6,154,839 A * | 11/2000 | Arrow | H04L 12/4641 709/245 |
| 6,157,955 A | 12/2000 | Narad et al. | |
| 6,167,438 A | 12/2000 | Yates et al. | |
| 6,172,986 B1 * | 1/2001 | Watanuki | H04L 69/16 370/401 |
| 6,178,505 B1 | 1/2001 | Schneider et al. | |
| 6,182,148 B1 | 1/2001 | Tout | |
| 6,185,598 B1 | 2/2001 | Farber et al. | |
| 6,226,642 B1 | 5/2001 | Beranek et al. | |
| 6,247,059 B1 | 6/2001 | Johnson et al. | |
| 6,256,671 B1 | 7/2001 | Strentzsch et al. | |
| 6,285,679 B1 | 9/2001 | Dally et al. | |
| 6,295,457 B1 * | 9/2001 | Narayanaswamy | H04W 88/12 370/230 |
| 6,324,582 B1 | 11/2001 | Sridhar et al. | |
| 6,324,585 B1 | 11/2001 | Zhang et al. | |
| 6,330,561 B1 | 12/2001 | Cohen et al. | |
| 6,389,462 B1 | 5/2002 | Cohen et al. | |
| 6,389,468 B1 | 5/2002 | Muller et al. | |
| 6,393,026 B1 | 5/2002 | Irwin | |
| 6,397,259 B1 | 5/2002 | Lincke et al. | |
| 6,408,336 B1 | 6/2002 | Schneider et al. | |
| 6,424,658 B1 | 7/2002 | Mathur | |
| 6,425,003 B1 | 7/2002 | Herzog et al. | |
| 6,453,335 B1 | 9/2002 | Kaufmann | |
| 6,457,061 B1 * | 9/2002 | Bal | H04L 29/12009 709/245 |
| 6,480,508 B1 | 11/2002 | Mwikalo et al. | |
| 6,502,135 B1 | 12/2002 | Munger et al. | |
| 6,502,236 B1 * | 12/2002 | Allen | G06F 8/41 717/106 |
| 6,526,426 B1 | 2/2003 | Lakritz | |
| 6,535,518 B1 | 3/2003 | Hu et al. | |
| 6,546,423 B1 | 4/2003 | Dutta et al. | |
| 6,560,227 B1 | 5/2003 | Bartoldus et al. | |
| 6,574,666 B1 | 6/2003 | Dutta et al. | |
| 6,578,073 B1 | 6/2003 | Starnes et al. | |
| 6,580,717 B1 * | 6/2003 | Higuchi | H04L 29/12009 370/401 |
| 6,581,090 B1 | 6/2003 | Lindbo et al. | |
| 6,587,466 B1 | 7/2003 | Bhattacharya et al. | |
| 6,598,034 B1 | 7/2003 | Kloth | |
| 6,598,167 B2 * | 7/2003 | Devine | G06F 11/0709 707/E17.107 |
| 6,604,143 B1 | 8/2003 | Nagar et al. | |
| 6,606,708 B1 * | 8/2003 | Devine | G06F 11/0709 705/26.1 |
| 6,606,710 B2 | 8/2003 | Krisnan et al. | |
| 6,611,875 B1 | 8/2003 | Chopra et al. | |
| 6,625,166 B2 | 9/2003 | Tsukamoto et al. | |
| 6,654,787 B1 | 11/2003 | Aronson et al. | |
| 6,662,213 B1 | 12/2003 | Xie et al. | |
| 6,691,124 B2 | 2/2004 | Gupta et al. | |
| 6,691,231 B1 | 2/2004 | Lloyd et al. | |
| 6,708,218 B1 * | 3/2004 | Ellington, Jr. | H04K 29/06 709/230 |
| 6,708,219 B1 * | 3/2004 | Borella | H04L 12/4633 709/230 |
| 6,728,885 B1 | 4/2004 | Taylor et al. | |
| 6,731,625 B1 * | 5/2004 | Eastep | H04L 29/06 370/352 |
| 6,768,992 B1 | 7/2004 | Jolitz | |
| 6,772,347 B1 | 8/2004 | Xie et al. | |
| 6,785,728 B1 | 8/2004 | Schneider et al. | |
| 6,785,730 B1 * | 8/2004 | Taylor | H04L 67/2823 370/466 |
| 6,826,694 B1 | 11/2004 | Dutta et al. | |
| 6,829,654 B1 | 12/2004 | Jungck | |
| 6,832,256 B1 | 12/2004 | Toga | |
| 6,847,989 B1 | 1/2005 | Chastain et al. | |
| 6,850,529 B1 | 2/2005 | Wong | |
| 6,854,063 B1 | 2/2005 | Qu et al. | |
| 6,950,947 B1 | 9/2005 | Purtell et al. | |
| 6,957,346 B1 * | 10/2005 | Kivinen | H04L 12/4633 713/153 |
| 6,973,084 B1 | 12/2005 | Jha | |
| 6,990,124 B1 * | 1/2006 | Dalias | H04M 7/126 370/352 |
| 7,020,700 B1 | 3/2006 | Bennett et al. | |
| 7,032,031 B2 | 4/2006 | Jungck et al. | |
| 7,042,855 B1 * | 5/2006 | Gilchrist et al. | 370/328 |
| 7,069,249 B2 | 6/2006 | Stolfo et al. | |
| 7,088,726 B1 * | 8/2006 | Hamamoto | H04L 29/12358 370/401 |
| 7,114,008 B2 | 9/2006 | Jungck et al. | |
| 7,146,505 B1 | 12/2006 | Harada et al. | |
| 7,225,249 B1 * | 5/2007 | Barry | G06F 17/3089 709/227 |
| 7,246,150 B1 | 7/2007 | Donoho et al. | |
| 7,346,649 B1 | 3/2008 | Wong | |
| 2002/0042829 A1 * | 4/2002 | Mizuhara | H04L 29/06 709/229 |
| 2002/0057657 A1 * | 5/2002 | La Porta | H04L 29/06 370/331 |
| 2002/0065938 A1 | 5/2002 | Jungck et al. | |
| 2002/0099854 A1 * | 7/2002 | Jorgensen | H04L 1/20 709/249 |
| 2002/0112073 A1 | 8/2002 | MeLampy et al. | |
| 2002/0194291 A1 | 12/2002 | Jungck et al. | |
| 2003/0009651 A1 | 1/2003 | Najam et al. | |
| 2003/0018796 A1 | 1/2003 | Chou et al. | |
| 2003/0041263 A1 * | 2/2003 | Devine | G06F 11/0709 726/4 |
| 2003/0187992 A1 | 10/2003 | Steenfeld et al. | |

(56) References Cited

U.S. PATENT DOCUMENTS

| | | | | |
|---|---|---|---|---|
| 2005/0157729 | A1* | 7/2005 | Rabie | H04L 12/5601 370/395.53 |
| 2006/0029038 | A1 | 2/2006 | Jungck | |
| 2011/0096794 | A1* | 4/2011 | Takase | H04L 12/5601 370/466 |

FOREIGN PATENT DOCUMENTS

| | | |
|---|---|---|
| EP | WO 99/05584 | 2/1999 |
| EP | WO 99/09725 | 2/1999 |
| EP | WO 99/27684 | 6/1999 |
| EP | WO 99/60459 | 11/1999 |
| EP | WO 00/14938 | 3/2000 |
| EP | WO 00/27092 | 5/2000 |
| EP | WO 00/28713 | 5/2000 |

OTHER PUBLICATIONS

A Common Multi-Agent Testbed for Diverse Seamless Personal Information Networking Applications, Abu-Hakima et al., Jul. 1998.
John Pescatore, Gartner Analyst, "Commentary: Digging into the DNS foundation," obtained at internet address, http://news.cnet.com/news/0-1005-202-2080091.html, Jun. 15, 2000.
Rainbow Technologies Products, "CryptoSwift eCommerce Accelerator," obtained at internet address, http://isq.rainbow.com/products/cs_html, Aug. 5, 2000.
FlowWise Networks, Inc., "AutoRoute™ Automatic Configuration of Layer 3 Routing," www.flowwise.com.
FlowWise, "Router Accelerator—RA 7000 from FlowWise," obtained at internet address http://www.flowise.com/products/ra7000.htm.
Intel® IXP1200 Network Processor, obtained at internet address, http://developer.intel.com/design/network/ixp1200.htm.
Marshall Brain, How Stuff Works, "How Web Servers and the Internet Work," obtained at internet address http://www.howstuffworks.com/web-server.htm.
Marshall Brain, How Stuff Works, "How Domain Name Servers Work," obtained at internet address http://www.howstuffworks.com/dns.htm.
Curt Franklin, How Stuff Works, "How Routers Work," obtained at internet address http:/www.howstuffworks.com/router.htm.
Microsoft Corporation, Sep. 1998 "Introduction to TCP/IP," obtained at internet address http://msdn.microsoft.com/library/backgrnd/html/tcpipintro.htm.
Robert Stone, "CenterTrack: An IP Overlay Network for Tracking DoS Floods," Article Oct. 1, 1999, pp. 1-9.
Chapter 1 TCP/IP Fundamentals, obtained at internet address http://webdocs.sequent.com/docs/tcpoac01/ch_1.htm, pp. 1-28.
Cheng Wu, "Web Switching: A New Generation of Networking," pp. 1-3.
ArrowPoint Communications™ Article, "A Comparative Analysis of Web Switching Architectures," pp. 1-11.
ArrowPoint Communications™, Brochure, "The Top 12 Benefits of Content Intelligence."
L. Peter Deutsch, "Deflate Compressed Data Format Specification," May 1996.
Antaeus Feldspar, Article, "An Explanation of the Deflate Algorithm," Sep. 11, 1997.
ArrowPoint Communications™ CDDCenter Vendor Listing, "ArrowPoint CS-50 Highlights" obtained at internet address http://www.cddcenter.com/arrowpoint.htm, May 21, 2000.
Peter Christy, Analyst Commentary, "When to Distribute Content—The Peters' Principles," obtained at internet address http://www.cddcenter.com/index.html, May 21, 2000.
Content Delivery 101: An Introduction to Content Distribution & Delivery.
CDDCenter, "How Do Caching and Content Delivery Really Differ?" obtained at internet address http://www.cddcenter.com/cachingvcontent.htm, pp. 1-4, May 21, 2000.

Internet Research Group "Infrastructure Application Service Providers," Feb. 2000, pp. 1-7.
Peter Christy, Internet Research Group, "Content Delivery Architectures: Why Doesn't One Size Fit All?" pp. 1-12.
Steven Vonder Haar, Inter@ctive Week, Feb. 14, 2000, "Content Delivery Shifts to Edge of Net," obtained at internet address http://www.zdnet.com/intweek/stories/news/0,4164,2436865,00.html, Dated May 22, 2000.
David Willis, Network Computing, "The Content-Delivery Edge," obtained at internet address http://www.networkcomputing.com/1103/1103colwillis.html, Dated May 22, 2000.
Phrack Magazine, "IP-spoofing Demystified (Trust-Relationship Exploitation)" vol. Seven, Issue Forty-Eight, File 14 of 18. pp. 1-9, obtained at internet address http://www.fc.net/phrack/files/p48/p48-14.html, Dated Jun. 5, 2000.
Eddie Mission, "What is Eddie?", obtained at internet address http://www.eddieware.org/what.html, Dated Apr. 21, 2000.
Cisco Enterprise Solutions, "Quality of Service," obtained at internet address http://www.cisco.com/warp/public/779/largeent/learn/technologies/qos/.
Cisco White Paper, "Delivering End-to-End Security in Policy-Based Networks," obtained at internet address, http://www.cisco.com/warp/public/cc/pd/nemnsw/cap/tech/deesp_wp.htm.
Technology Packeteer, obtained at internet address, http://www.packeteer.com/technology/index.cfm.
Overview Cisco Content Networking, obtained at internet address http://www.cisco.com/warp/public/cc/co/neso/ienesv/cxne/ccnov_ov.htm.
Overview Cisco Secure Policy Manager 2.0, obtained at internet address http://www.cisco.com/warp/public/cc/pd/sqsw/sqppmn/prodlit/secmn_ov.htm.
Alteon Web Systems, White Paper "Optimizing ISP Networks and Services with DNS Redirection," Aug. 1999.
Alteon Web Systems, White Paper "Virtual Matrix Architecture Scaling Web Services for Performance and Capacity," Apr. 2000.
Alteon Web Systems, White Paper, Questions and Answers, pp. 1-3.
3Com Technical Papers, Layer 3 Switching, May 1998.
Web Cache Communication Protocol Version 2, pp. C-1 to C-54.
RFC2267 Working Group—Denial of Service Counter Measures, Tele-conference Meeting Aug. 25, 2000, Moderator, Henry Teng of eBay.
Track-back Architecture General Requirements Version 0.1, Initial Draft submitted to Counter-DoS Solutions Working Group, Jul. 31, 2000, Edited by Bob Geiger, Recourse Technologies.
SwitchOn Networks, Inc., ClassiPI™ At-a-Glance.
C-Port™ A Motorola Company, C-5™ Digital Communications Processor, Product Brief, pp. 1-8, May 4, 2000.
Peder Jungck, "Building a Faster Cache Server" A Theoretical Whitepaper, Silicon Valley Internet Capital, pp. 1-19.
IXF1002 Dual Port Gigabit Ethernet MAC, Product Brief, Level One™ an Intel Company.
NetLogic Microsystems Product Overview.
Agere, Inc. "The Challenge for Next Generation Network Processors", Sep. 10, 1999.
Philips "VMS747 Security Processor," Overview and Features, pp. 1-3, date of release Jan. 2000, © Philips Electronics N.V. 1999.
Cisco Systems, Cisco 12000 Series GSR, "Performing Internet Routing and Switching at Gigabit Speeds," obtained at internet address, http://www.cisco.com/warp/public/cc/pd/rt/12000/.
Cisco Systems, "Cisco 10000 Edge Service Router," obtained at internet address, http://www.cisco.com/warp/public/cc/pd/rt/10000/.
Nortel Networks™ "Passport 8600 Routing Switch," obtained at internet address, http://www.nortelnetworks.com/products/01/passport/8600/index.html.
Lucent Technologies, "InterNetworking Systems," obtained at internet address, http://www.lucent.corn/ins/products/grf/.
Lucent Technologies, "InterNetworking Systems," obtained at internet address, http://www.lucent.com/ins/products/grf/grf1600.html.
Juniper Networks, "M20 Internet Backbone Router," Datasheet, obtained at internet address, http://www.juniper.net/products/dsheet/100009.html.

(56) References Cited

OTHER PUBLICATIONS

Juniper Networks, "M40 Internet Backbone Router," Datasheet, obtained at internet address, http://www.juniper.net/products/dsheet/100001.html.
Juniper Networks, Inc., "M160 Internet Backbone Router" Datasheet, obtained at internet address, http://www.juniper.net/products/dsheet/10012.
Rajeev Kumar, Intel Confidential, "IXP1200 Overview".
Intel "IXP1200 Network Processor," Datasheet, pp. 1-109 (out of 146 pages), May 2000.
Cisco 7500 Series Routers, pp. 1-2, obtained at internet address http://www.cisco.com/warp/public/cc/pd/rt/7500/.
Philips Semiconductors—I2C-bus, News and Events, obtained at internet address, http://www.semiconductors.philips.com/i2c/, Jul. 28, 2001.
Comnet Booth #4421 "VHB Technologies Introduces Breakthrough Appliance for High-Bandwidth Networks at Comnet" News Release, Jan. 29, 2001, VHB Technologies, Inc., Richardson, Texas.
VHB Technologies, Inc. presents "The VIPRE™ NPU."
VHB Technologies News & Views, "Pioneering Gigabit-Speed Content-Intelligent Appliances".
VHB Technologies, A Security Technology Paper, Defending Against Denial-of-Service Attacks with the . . . VHB-2000 Network Security Appliance.
Netlogic Microsystems™ Product Brief, obtained at internet address, http://www.netlogicmicro.com/html/datasheets/nse3128.html, pp. 1-2, May 11, 2001.
Switch On Networks, Inc. "ClassiPI" Content Co-Processor, general content and features brochure, pp. 1-5.
C-Port, "C-5™ Digital Communications Processor" Product Brief, pp. 1-8, © 1999-2000 C-Port Corporation, May 4, 2000.
NetLogic Microsystems™ "Policy Co-Processor™" applications and features sheet, p. 1.
NetLogic Microsystems™ "CIDR Co-Processor™" applications and features sheet, p. 1.
NetLogic Microsystems™ "IPCAM® Ternary CAM" application and features sheets, pp. 1-2.
NetLogic Microsystems™ "SynCAM® Binary Cam" application and features sheet, p. 1.
NetLogic Microsystems™ "NCAM Binary CAM" application and features sheet, p. 1.
NetLogic Microsystems™ product overview, pp. 1-2.
Level One™ An Intel Company "IXF1002 Dual Port Gigabit Ethernet MAC," product brief, pp. 1-2, Copyright ©2000 Level One Communications, Inc.
Agere, Inc., Agere White Paper, "Building Next Generation Network Processors," Sep. 10, 1999, pp. 1-8.
Eric J. Rothfus, Agere, Inc., Agere White Paper, "The Case for a Classification Language," Sep. 10, 1999, pp. 1-7.
Web Cache Communication Protocol Version 2, Appendix C, Cisco Cache Engine User Guide, Version 2.0.0, pp. C1-C54.
CloudShield Technologies, Inc., White Paper, "Security at Optical Speed," pp. 1-10, Jan. 21, 2001.
NetLogic Microsystems™ Product Brief "NSE3128 Network Search Engine," obtained at internet address http://209.10.226.214/html/datasheets/nse3128.html pp. 1-2, May 11, 2001.
Listing of Well Known Port Numbers assigned by the Internet Assigned Numbers Authority, obtained at the internet address , http:www.iana.org/assignments/port-numbers pp. 1-55, Aug. 5, 2000.
PM2329 PMC-Sierra, "ClassiPI™ Network Classification Processor," Overview and Features sheet pp. 1-2, 2001 Copyright PMC-Sierra, Inc. Jan. 2001.
3com Virtual Lan Tutorial, obtained from http://munshi.sonoma.edu/s97/bus420.vlan.html, Jul. 21, 2003, pp. 1-21.
Przygienda and Droz, Abstract "Proxy PNNI Augmented Routing (Proxy PAR)", pp. 371-377, © 1998 IEEE.
Stevenson and Julin, Abstract, "Client-Server Interactions in Multi-Server Operating," Sep. 1994, 16 pages.
JISC JTAP Report "Network Delivery of High Quality MPEG-2 Digital Video," Oct. 1998, 58 pages.
Integrating Java-based Mobile Agents into Web Servers under . . . —Fünfrocken (1998); www.isa.informatik.tu-darmstadt.de/VS/Publikationen/Fuenfrocken/papers/hicss98-wasp.ps.
Adaptive Scheduling with Client Resources to Improve WWW . . . —Andresen, Yang (1996); www.cs.ucsb.edu/TRs/techreports/TRCS96-27.ps.
Enabling the Internet to Deliver Content-Oriented Services—Beck, Hofmann (2001); www.cs.bu.edu/techreports/2001-017-wcw01-proceedings/107_beck.pdf.
Corpus-Based Leaning of Compound Noun Indexing—Ung-Kwan Kwak Jee-Hyub (2000) www.ai.mit.edu/people/jimmylin/papers/Kwak00.pdf.
The Role of Test Cases in Automated Knowledge Refinement—Palmer, Craw (1996) www.scms.rgu.ac.uk/publications/96/96_4.ps.gz.
The Policy Obstacle Course: The Realisation of Low-Level . . . —Schema York July www.cs.york.ac.uk/~jdm/pubs/polobstc.ps.Z.
Data Filter Architecture Pattern Robert Flanders and Eduardo . . . —Dept of Computer jerry.cs.uiuc.edu/~plop/plop99/proceedings/Fernandez5/Flanders 3.PDF.
System Design Issues for Internet Middleware Services: Deductions . . . —Gribble (1997) http.cs.berkeley.edu/~gribble/papers/msc_thesis.ps.gz.
Implementing a Secure rlogin Environment: A Case Study of . . . —Kim, Orman, O'Malley (1995) ftp.cs.arizona.edu/xkernel/Papers/rlogin.ps.
A Hierarchical Mobility Management Scheme for Ipv6—Claude Castelluccia ballesta.inrialpes.fr/Infos/Personnes/Claude.Castelluccia/iscc98.ps.gz.

* cited by examiner

TRANSPARENT PROVISIONING OF NETWORK ACCESS TO AN APPLICATION

RELATED APPLICATIONS

This application is a continuation-in-part under 37 C.F.R. §1.53(b) of U.S. patent application Ser. No. 12/493,312, filed Jun. 29, 2009 now U.S. Pat. No. 8,204,082, the entire disclosure of which is hereby incorporated by reference.

U.S. patent application Ser. No. 12/493,312 is a continuation-in-part under 37 C.F.R. §1.53(b) of U.S. patent application Ser. No. 11/189,172, filed Jul. 25, 2005 now U.S. Pat. No. 7,570,663, the entire disclosure of which is hereby incorporated by reference, which is a continuation under 37 C.F.R. §1.53(b) of U.S. patent application Ser. No. 09/858,309, filed May 15, 2001 now U.S. Pat. No. 7,032,031, the entire disclosure of which is hereby incorporated by reference, which claims priority as a continuation-in-part under 37 C.F.R. §1.53(b) of U.S. patent application Ser. No. 09/602,129, filed Jun. 23, 2000 now U.S. Pat. No. 6,829,654, the entire disclosure of which is hereby incorporated by reference.

BACKGROUND

The Internet is growing by leaps and bounds. Everyday, more and more users log on to the Internet for the first time and these, and existing users are finding more and more content being made available to them. The Internet has become a universal medium for communications, commerce and information gathering.

Unfortunately, the growing user base along with the growing content provider base is causing ever increasing congestion and strain on the Internet infrastructure, the network hardware and software plus the communications links that link it all together. While the acronym "WWW" is defined as "World Wide Web", many users of the Internet have come to refer to it as the "World Wide Wait."

These problems are not limited to the Internet either. Many companies provide internal networks, known as intranets, which are essentially private Internets for use by their employees. These intranets can become overloaded as well. Especially, when a company's intranet also provides connectivity to the Internet. In this situation, the intranet is not only carrying internally generated traffic but also Internet traffic generated by the employees.

The growth of the Internet has also resulted in more and more malicious programmer activity. These "hackers" spread virus programs or attempt to hack into Web sites in order to steal valuable information such as credit card numbers. Further, there have been an increasing number of "Denial of Service" attacks where a hacker infiltrates multiple innocent computers connected to the Internet and coordinates them, without their owners' knowledge, to bombard a particular Web site with an immense volume of traffic. This flood of traffic overwhelms the target's servers and literally shuts the Web site down.

Accordingly, there is a need for an enhanced Internet infrastructure to more efficiently deliver content and services from providers to users and provide additional network throughput, reliability, security and fault tolerance.

DETAILED DESCRIPTION OF THE PRESENTLY PREFERRED EMBODIMENTS

Figure 1:
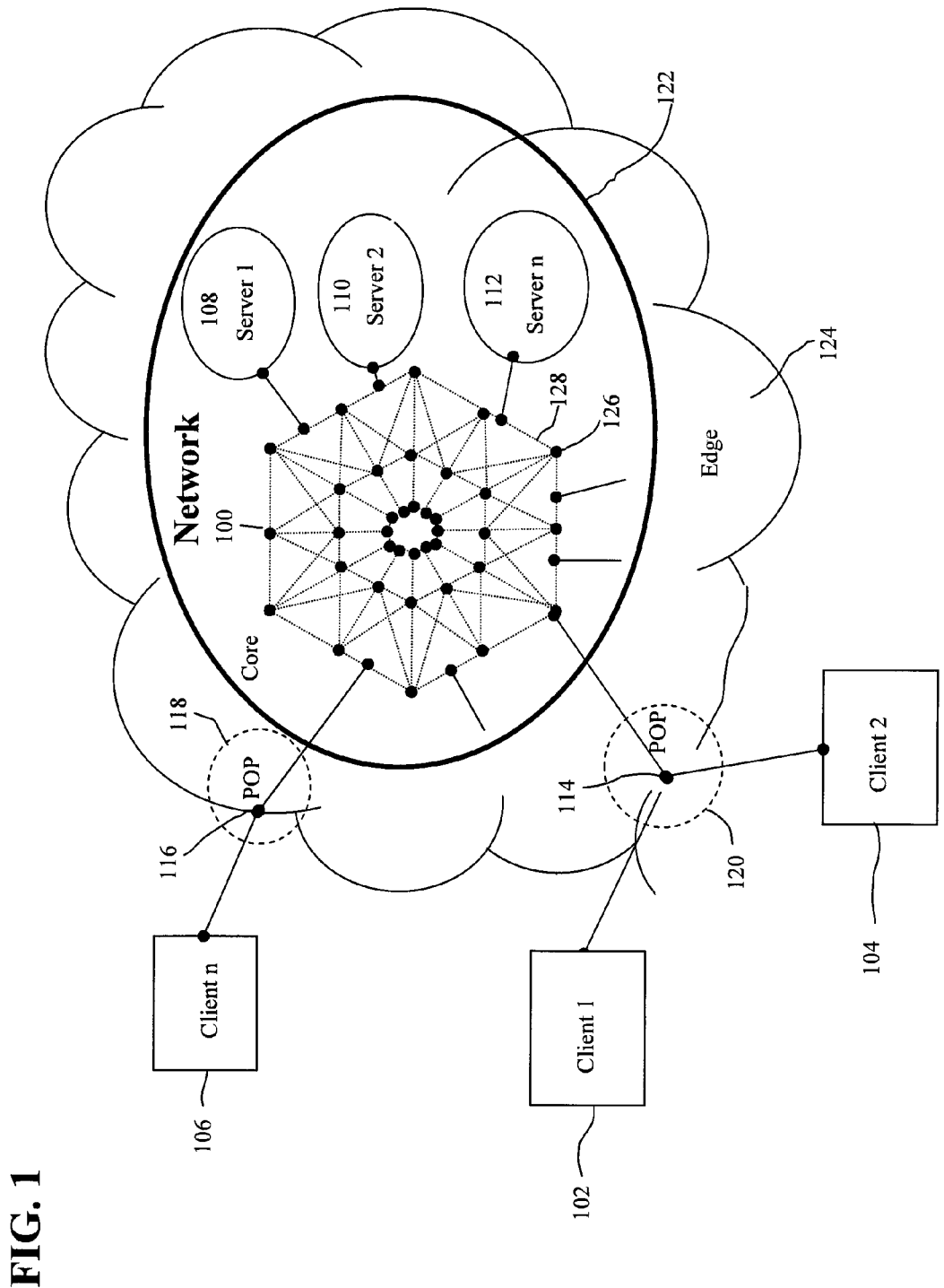
FIG. 1 depicts an exemplary network for use with the disclosed embodiments.

FIG. 1 shows an exemplary network 100 for use with the disclosed embodiments. In one embodiment, the network 100 is a publicly accessible network, and in particular, the Internet. While, for the purposes of this disclosure, the disclosed embodiments will be described in relation to the Internet, one of ordinary skill in the art will appreciate that the disclosed embodiments are not limited to the Internet and are applicable to other types of public networks as well as private networks, and combinations thereof, and all such networks are contemplated.

I. Introduction

As an introduction, a network interconnects one or more computers so that they may communicate with one another, whether they are in the same room or building (such as a Local Area Network or LAN) or across the country from each other (such as a Wide Area Network or WAN). A network is a series of points or nodes 126 interconnected by communications paths 128. Networks can interconnect with other networks and can contain sub-networks. A node 126 is a connection point, either a redistribution point or an end point, for data transmissions generated between the computers which are connected to the network. In general, a node 126 has a programmed or engineered capability to recognize and process or forward transmissions to other nodes 126. The nodes 126 can be computer workstations, servers, bridges or other devices but typically, these nodes 126 are routers or switches.

A router is a device or, in some cases, software in a computer, that determines the next network node 126 to which a piece of data (also referred to as a "packet" in the Internet context) should be forwarded toward its destination. The router is connected to at least two networks or sub-networks and decides which way to send each information packet based on its current understanding of the state of the networks to which it is connected. A router is located at any juncture of two networks, sub-networks or gateways, including each Internet point-of-presence (described in more detail below). A router is often included as part of a network switch. A router typically creates or maintains a table of the available routes and their conditions and uses this information along with distance and cost algorithms to determine the best route for a given packet. Typically, a packet may travel through a number of network points, each containing additional routers, before arriving at its destination.

The communications paths 128 of a network 100, such as the Internet, can be coaxial cable, fiber optic cable, telephone cable, leased telephone lines such as T1 lines, satellite links, microwave links or other communications technology as is known in the art. The hardware and software which allows the network to function is known as the "infrastructure." A network 100 can also be characterized by the type of data it carries (voice, data, or both) or by the network protocol used to facilitate communications over the network's 100 physical infrastructure.

The Internet, in particular, is a publicly accessible worldwide network 100 which primarily uses the Transport Control Protocol and Internet Protocol ("TCP/IP") to permit the exchange of information. At a higher level, the Internet supports several applications protocols including the Hypertext Transfer Protocol ("HTTP") for facilitating the exchange of HTML/World Wide Web ("WWW") content, File Transfer Protocol ("FTP") for the exchange of data files, electronic mail exchange protocols, Telnet for remote computer access and Usenet ("NNTP" or Network News Transfer Protocol) for the collaborative sharing and distribution of information. It will be appreciated that the disclosed embodiments are applicable to many different applications protocols both now and later developed.

Logically, the Internet can be thought of as a web of intermediate network nodes 126 and communications paths 128 interconnecting those network nodes 126 which provide multiple data transmission routes from any given point to any other given point on the network 100 (i.e. between any two computers connected to the network 100). Physically, the Internet can also be thought of as a collection of interconnected sub-networks wherein each sub-network contains a portion of the intermediate network nodes 126 and communications paths 128. The division of the Internet into sub-networks is typically geographically based, but can also be based on other factors such as resource limitations and resource demands. For example, a particular city may be serviced by one or more Internet sub-networks provided and maintained by competing Internet Service Providers ("ISPs") (discussed in more detail below) to support the service and bandwidth demands of the residents.

Contrasting the Internet with an intranet, an intranet is a private network contained within an enterprise, such as a corporation, which uses the TCP/IP and other Internet protocols, such as the World Wide Web, to facilitate communications and enhance the business concern. An intranet may contain its own Domain Name Server ("DNS") and may be connected to the Internet via a gateway, i.e., an intra-network connection, or gateway in combination with a proxy server or firewall, as are known in the art.

Referring back to FIG. 1, clients 102, 104, 106 and servers 108, 110, 112 are shown coupled with the network 100. Herein, the phrase "coupled with" is defined to mean directly connected to or indirectly connected with, through one or more intermediate components. Such intermediate components may include both hardware and software based components. The network 100 facilitates communications and interaction between one or more of the clients 102, 104, 106 and one or more of the servers 108, 110, 112 (described in more detail below). Alternatively, the network 100 also facilitates communications and interaction among one or more of the clients 102, 104, 106, e.g. between one client 102, 104, 106 and another client 102, 104, 106 or among one or more of the servers 108, 110, 112, e.g. between one server 108, 110, 112 and another server 108, 110, 112.

A client 102, 104, 106 may include a personal computer workstation, mobile or otherwise, wireless device such as a personal digital assistant or cellular telephone, an enterprise scale computing platform such as a mainframe computer or server or may include an entire intranet or other private network which is coupled with the network 100. Typically, a client 102, 104, 106 initiates data interchanges with other computers, such as servers 108, 110, 112 coupled with the network 100. These data interchanges most often involve the client requesting data or content from the other computer and the other computer providing that data or content in response to the request. Alternatively, the other computer coupled with the network can "push" data or content to the client 102, 104, 106 without it first being requested. For example, an electronic mail server 108, 110, 112 may automatically push newly received electronic mail over the network 100 to the client 102, 104, 106 as the new electronic mail arrives, alleviating the client 102, 104, 106 from first requesting that new mail be sent. It will be apparent to one of ordinary skill in the art that there can be many clients 102, 104, 106 coupled with the network 100.

A server 108, 110, 112 may include a personal computer workstation, an enterprise scale computing platform or other computer system as are known in the art. A server 108, 110, 112 typically responds to requests from clients 102, 104, 106 over the network 100. In response to the request, the server 108, 110, 112 provides the requested data or content to the client 102, 104, 106 which may or may not require some sort of processing by the server 108, 110, 112 or another computer to produce the requested response. It will be apparent to one of ordinary skill in the art that a client 102, 104, 106 may also be a server 108, 110, 112 and vice versa depending upon the nature of the data interchange taking place, e.g. peer-to-peer architectures. For purposes of this disclosure, during any given communication exchange, a client 102, 104, 106 requests or receives content and is separate from the server 108, 110, 112 which provides the content (whether requested or not, i.e. pushed). Servers 108, 110, 112 may be World Wide Web servers serving Web pages and/or Web content to the clients 102, 104, 106 (described in more detail below). It will be apparent to one of ordinary skill in the art that there can be many servers 108, 110, 112 coupled with the network 100.

Clients 102, 104, 106 are each coupled with the network 100 at a point of presence ("POP") 114, 116. The POP 114, 116 is the connecting point which separates the client 102, 104, 106 from the network 100. In a public network 100, such as the Internet, the POP 114, 116 is the logical (and possibly physical) point where the public network 100 ends, after which comes the private (leased or owned) hardware or private (leased or owned) network of the client 102, 104, 106. A POP 114, 116 is typically provided by a service provider 118, 120, such as an Internet Service Provider ("ISP") 118, 120, which provides connectivity to the network 100 on a fee for service basis. A POP 114, 116 may actually reside in rented space owned by telecommunications carrier such as AT&T or Sprint to which the ISP 118, 120 is connected. A POP 114, 116 may be coupled with routers, digital/analog call aggregators, servers 108, 110, 112, and frequently frame relay or ATM switches. As will be discussed below, a POP 114, 116 may also contain cache servers and other content delivery devices.

A typical ISP 118, 120 may provide multiple POP's 114, 116 to simultaneously support many different clients 102, 104, 106 connecting with the network 100 at any given time. A POP 114, 116 is typically implemented as a piece of hardware such as a modem or router but may also include software and/or other hardware such as computer hardware to couple the client 102, 104, 106 with the network 100 both physically/electrically and logically (as will be discussed below). The client 102, 104, 106 connects to the POP 114,116 over a telephone line or other transient or dedicated connection. For example, where a client 102, 104, 106 is a personal computer workstation with a modem, the ISP 118, 120 provides a modem as the POP 114, 116 to which the client 102, 104, 106 can dial in and connect to via a standard telephone line. Where the client 102, 104, 106 is a private intranet, the POP 114, 116 may include a gateway router which is connected to an internal gateway router within the client 102, 104, 106 by a high speed dedicated communication link such as T1 line or a fiber optic cable.

A service provider 118, 120 will generally provide POP's 114, 116 which are geographically proximate to the clients 102, 104, 106 being serviced. For dial up clients 102, 104, 106, this means that the telephone calls can be local calls. For any client 102, 104, 106, a POP which is geographically proximate typically results in a faster and more reliable connection with the network 100. Servers 108, 110, 112 are also connected to the network 100 by POP's 114, 116. These POP's 114, 116 typically provide a dedicated, higher capacity and more reliable connection to facilitate the data transfer and availability needs of the server 108, 110, 112. Where a client 102, 104, 106 is a wireless device, the service provider 118, 120 may provide many geographically dispersed POP's 114, 116 to facilitate connecting with the network 100 from wherever the client 102, 104, 106 may roam or alternatively have agreements with other service providers 118, 120 to allow access by each other's customers. Each service provider 118, 120, along with its POP's 114, 116 and the clients 102, 104, 106 effectively forms a sub-network of the network 100.

Note that there may be other service providers 118, 120 "upstream" which provide network 100 connectivity to the service providers 118, 120 which provide the POP's 114, 116. Each upstream service provider 118, 120 along with its downstream service providers 118, 120 again forms a sub-network of the network 100. Peering is the term used to describe the arrangement of traffic exchange between Internet service providers (ISPs) 118, 120. Generally, peering is the agreement to interconnect and exchange routing information. More specifically, larger ISP's 118, 120 with their own backbone networks (high speed, high capacity network connections which interconnect sub-networks located in disparate geographic regions) agree to allow traffic from other large ISP's 118, 120 in exchange for traffic on their backbones. They also exchange traffic with smaller service providers 118, 120 so that they can reach regional end points where the POP's 114, 116 are located. Essentially, this is how a number of individual sub-network owners compose the Internet. To do this, network owners and service providers 118, 120, work out agreements to carry each other's network traffic. Peering requires the exchange and updating of router information between the peered ISP's 118, 120, typically using the Border Gateway Protocol (BGP). Peering parties interconnect at network focal points such as the network access points (NAPs) in the United States and at regional switching points. Private peering is peering between parties that are bypassing part of the publicly accessible backbone network through which most Internet traffic passes. In a regional area, some service providers 118, 120 have local peering arrangements instead of, or in addition to, peering with a backbone service provider 118, 120.

A network access point (NAP) is one of several major Internet interconnection points that serve to tie all of the service providers 118, 120 together so that, for example, an AT&T user in Portland, Oreg. can reach the Web site of a Bell South customer in Miami, Fla. The NAPs provide major switching facilities that serve the public in general. Service providers 118, 120 apply to use the NAP facilities and make their own inter-company peering arrangements. Much Internet traffic is handled without involving NAPs, using peering arrangements and interconnections within geographic regions.

For purposes of later discussions, the network 100 can be further logically described to comprise a core 122 and an edge 124. The core 122 of the network 100 includes the servers 108, 110, 112 and the bulk of the network 100 infrastructure, as described above, including larger upstream service providers 118, 120, and backbone communications links, etc. Effectively, the core 122 includes everything within the network 100 up to the POP's 114, 116. The POP's 114, 116 and their associated hardware lie at the edge 124 of the network 100. The edge 124 of the network 100 is the point where clients 102, 104, 106, whether single devices, computer workstations or entire corporate internal networks, couple with the network 100. As defined herein, the edge 124 of the network 100 may include additional hardware and software such as Domain Name Servers, cache servers, proxy servers and reverse proxy servers as will be described in more detail below. Typically, as the network 100 spreads out from the core 122 to the edge 124, the total available bandwidth of the network 100 is diluted over more and more lower cost and lower bandwidth communications paths. At the core 122, bandwidth over the higher capacity backbone interconnections tends to be more costly than bandwidth at the edge 124 of the network 100. As with all economies of scale, high bandwidth interconnections are more difficult to implement and therefore rarer and more expensive than low bandwidth connections. It will be appreciated, that even as technology progresses, newer and higher bandwidth technologies will remain more costly than lower bandwidth technologies.

Interception of packets off the network and subsequent processing thereof to determine of a course of action to be taken with those intercepted packets is described in more detail below and in U.S. patent application Ser. No. 12/493,312, now U.S. Pat. No. 8,204,082, captioned above, and herein incorporated by reference. This may include selective interception of packets, selective modification of those intercepted packets and the subsequent release/reinsertion of the packets, modified or unmodified and/or release of new packets, back into the general stream of network traffic. Selective interception includes the temporary interception of all packets presented on the inputs of the edge device and performing an initial evaluation to determine whether the packet should be immediately released or held/intercepted for further processing. The determination of whether or not a particular packet should be held/intercepted and the further processing/modification and/or subsequent release of the temporarily held packet are discussed in more detail below. It will be appreciated that there may be other methods of evaluating packets for possible interception which may utilize mechanisms other than temporarily buffering packets, in whole or in part, for the purpose of the evaluation, such as applying pattern matching as the packet moves through the packet processor, etc., and all such mechanisms are contemplated.

The embodiments disclosed herein may be implemented by coupling, logically and/or physically, an edge server or similar device, such as the CloudShield CS-2000 DPPM or IBM BladeCenter having a CloudShield DPI or PN 41 blade as will be described in more detail below, with the routing equipment of a telecommunications carrier and/or Internet service provider to facilitate packet interception at a point as close to the POP's as possible or otherwise at a point where services, described in more detail below, may be provisioned. This allows for early and reliable packet interception and further ensures some measure of reliability in determining the origination of a particular packet, the advantages of which are described above. Alternatively, the interception of packets may also take place at other upstream locations. It will be appreciated that the optimal logical and/or physical placement of the disclosed embodiments is at any point within the network traffic flow which is most likely to see all of the relevant packets that are to be intercepted flow through. For example, in carrier-class implementations, as will be described below, optimal placement may be at the logical and/or physical location from which services are provisioned to a customer base, such as a central office, peering point, metro node, etc., though the disclosed embodiments may actually permit the relocation/distribution of service provisioning to more optimal physical and/or logical locations depending on the implementation.

In addition to the above embodiments, many other solutions to the Internet's problems may involve the use of such edge devices to provide services which process, route and/or deliver packets. Examples of such services include switching, server load balancing, DNS enhancement, quality of service enhancement, and content delivery enhancement such as caching and mirroring applications. Other examples include application specific devices which provide particular services such as intrusion protection devices, e.g. the IBM ISS Preventia appliance manufactured by IBM Corporation, firewall devices, e.g. the Checkpoint Firewall-1 manufactured by Check Point Software Technologies, Inc., located in Redwood City, Calif., anomaly or Distributed Denial of Service detection appliances such as devices manufactured by Arbor Networks, Inc., located in Lexington, Mass., or virus protection appliances. One exemplary device is the WebSwitch, manufactured by Alteon Web Systems, located in San Jose, Calif., which looks for packets with a port address of 53 indicating a DNS request. The WebSwitch intercepts and re-directs all DNS requests to alternate DNS servers. In contrast to application/service specific devices, the CS 2000 Deep Packet Processing Module ("DPPM"), manufactured by CloudShield Technologies, Inc., located in San Jose, Calif. (and described in more detail above) is a general purpose selective packet interception device which, in one application, may also intercept DNS requests but performs its interception selectively by analyzing the application data layer of the packets in addition to the header data layer. Any portion of the packet may be analyzed. Implementing these applications and enhancements requires intercepting packets as they flow over the network prior to their receipt by their intended destination, e.g. the destination to which the packets are addressed, processing the packet contents to determine a course of action and then performing that course of action, as was described.

As described above, it is optimal, in most Internet enhancement applications, to intercept and process packets close to their source before they enter the general stream of Internet traffic and diverge or alternatively, at one or more "choke points" through which all of the relevant packets must flow, such as a service provisioning point. For many of the above applications/services, it is desirable to intercept packets before they are routed beyond the edge of the Internet. However, as more and more of these solutions are developed, there will be more and more demand to intercept and process packets at the edge of the Internet or at critical packet switching choke points, such as Network Access Points ("NAP's"), or service provisioning points, such as those implemented by telecommunications carriers. In reality, this means that carriers, Internet Service Providers or NAP providers may want to provide more and more services, or more and more solution providers will want access to the equipment of the carriers, Internet Service Providers or NAP providers, at the edge of the Internet or in control of the desired choke points, to install their packet interception devices and provide their services, causing new problems in the process.

As will be appreciated, in order to intercept a packet flowing from one point to another, an intercepting device must be logically and/or physically installed in series with the packet flow so that all packets of interest must flow through the device. The intercepting device then intercepts the packets as they flow from point to point and determines what actions it will take with the packets. The costs of introducing an intercepting device include the reconfiguration required of the network to physically and/or logically integrate the device, the latency added by the processing time that it takes the device to perform its function, e.g. to determine the course of action, as well as the decrease in system-wide reliability/increased risk of failure introduced by the device and its interconnection. The latency can be quantified by the degradation in packet throughput, from the ideal "wire speed" throughput, that is caused by the processing time of the device. As can be seen, as more and more intercepting devices are introduced, each device must be connected in series with the others and each adds additional processing latency to the overall packet flow. Further, if the processing performed by such devices cannot match or exceed the speed at which data is flowing, the wire speed, network performance will suffer. Carriers or Internet service providers may be unwilling to introduce such additional overhead within their sub-networks and therefore may refuse to allow edge devices to be installed. Further, even if the benefits outweigh the additional latencies introduced, each additional device adds additional configuration complexities and an additional possible failure point which can bring down the service providers entire network, a risk Carriers or Internet service providers may be unwilling to take. In addition, since each intercepting device is connected in series with the others, each device (except for the first device in the chain) must wait for the upstream devices to process a given packet before processing the packet itself. This may cause contention for the service provider when determining which device to place ahead of another in the packet flow. Finally, the physical and/or electrical limitations of the service provider's hardware or environment may discourage or prevent the installation of multiple edge/intercepting devices.

As can be seen from the above embodiments, edge devices generally perform the basic functions of intercepting packets from the general flow of network traffic, processing the intercepted packets and potentially releasing the original packets and/or reinserting new or modified packets back into the general flow of network traffic. In general, it is the choice of which packets to intercept and the subsequent processing performed by each edge/packet intercepting device on the intercepted packets, e.g. the application, which distinguishes each device.

Figure 7:
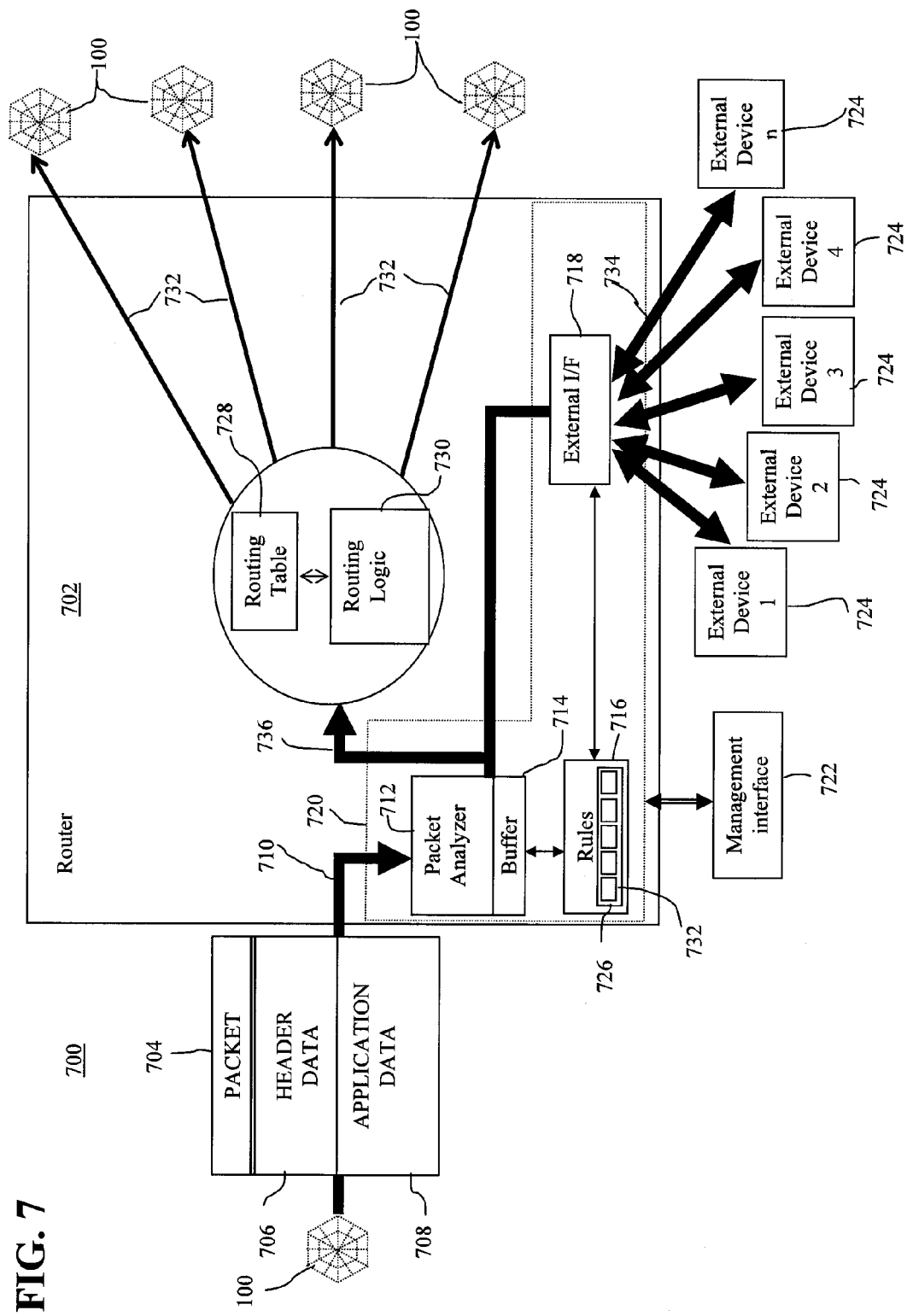
FIG. 7 depicts an edge adapter and packet interceptor according a one embodiment.

Referring now to FIG. 7, there is shown one embodiment of an edge adapter/packet interceptor system 700 which provides a scalable and reliable connection for multiple edge/packet interception devices to the routing equipment of the Internet Service Provider without introducing additional network latency or potential failure points to the packet flow with the addition of each such edge/packet interception device. It will be understood that each device may be implemented in hardware, software or a combination thereof. The edge adapter/packet interceptor system 700 decouples the interception of packets from the processing of those intercepted packets and provides a generic packet interception and pre-processing engine which can be utilized in parallel by multiple edge devices to implement their respective functionality/applications. As was noted above, the previously described embodiments can alternatively process packets which are forwarded to them by the ISP's or Carrier's routing equipment. The edge adapter/packet interceptor system 700 provides this interception and forwarding service. Further, the system 700 provides a standardized interface to a network such as the Internet for the connection of edge type or packet intercepting devices making it easier for an ISP or Carrier to offer the services/enhancements of many different providers, referred to as "managed services." In addition, the system 700 is capable of processing packets at, or in excess, of wire speed so as not to degrade network performance from the optimal. In one embodiment, the system 700 is selectively transparent to the network. Where the device is to be visible, it can be addressed just like any other device coupled with the network. However, this addressability may be disabled to make the device invisible to other network devices.

The system 700 may include a router 702 and a packet interceptor adapter 720 coupled with the router. The router 702 may be located within an ISP located at the edge of a network 100, such as the Internet 100 as described above, or in a central office, peering point or metro node operated by a telecommunications carrier. Alternatively, the network 100 can be a private intranet or extranet as described above. Further, the network 100 may be an optical based network 100 or electrical, or combinations thereof. Exemplary routers 702 include: the Cisco 12000 Series GSR Internet router, manufactured by Cisco Systems, Inc., located in San Jose, Calif.; the Cisco 10000 Edge Services Router, manufactured by Cisco Systems, Inc., located in San Jose, Calif.; the Cisco 7500 Series router, manufactured by Cisco Systems, Inc., located in San Jose, Calif.; the Passport 8600 Routing Switch, manufactured by Nortel Networks, Inc., located in Saint John, Canada; the GRF MultiGigabit Router GRF 1600, manufactured by Lucent Technologies, Inc., located in Murray Hill, N.J.; and the M20, M40, and M160 Internet Backbone Routers, manufactured by Juniper Networks, Inc., located in Sunnyvale, Calif.

In the one embodiment, the adapter 720 may comprise a standalone device or an adapter card (also known as a "board" or "blade") inserted into the router's 702 expansion slot backplane or separate blade enclosure, as will be described In one embodiment, the adapter 720 implements the Intelligent Packet Architecture™ developed by CloudShield Technologies, Inc., located in San Jose, Calif. In one embodiment, the adapter 720 comprises the CS 2000 DPPM manufactured by CloudShield Technologies. Alternatively, the adapter 720 comprises the CS-2000 DPPM blade, also referred to as a DPI or PN 41 blade, developed by CloudShield Technologies for use with the IBM Blade Center enclosure, manufactured by IBM. The adapter 720 is coupled with the router 702 so as to be able to intercept packets 704 before they are routed by the router 702 over the network 100. In alternative embodiments, the adapter 720 may comprise a stand alone device either coupled with the router 702 or coupled in line with the router 702 on the network 100. In the latter case, the adapter 720 is capable of interfacing with the network 100, whether optical or electrical.

The router 702 further includes a network interface 710, a routing table 728 and routing logic 730. As is known, and described above, packets 704 enter the router 702 from the network 100 via the network interface 710. In normal operation, where there is no edge adapter 720 installed, the packet 704 would be routed to the next network 100 node by the routing table 728 and routing logic 730 which analyze the destination internet protocol address of the packet 704 and determine where the packet 704 should be sent next within the network 100. It will be appreciated that the routing logic 730 and routing table 728 can further implement policy based routing and quality of service protocols as are known in the art.

In one embodiment, the logical architecture of the packet interceptor adapter 720 includes a packet analyzer 712, a buffer 714, a rules processor 716 and an external device interface 718. The edge adapter 720 may further include a management interface 722 and interfaces 734 for external devices 724. The packet analyzer 712 is coupled with the network interface 710 of the router 702 so as to be able to intercept packets 704 before they can be routed by the routing logic 730 and routing table 728, e.g. sent along to their intended destination. Further, the adapter 720 includes an interface 736 with the routing table 728 and routing logic 730 of the router 702 to send packets to be routed. This arrangement logically places the edge adapter 720 between the network interface 100 and the routing table 728 and routing logic 730. In alternative embodiments, the routing table 728 and routing logic 730 of the router 702 can be configured to automatically forward all incoming packets out to the edge adapter 720 first and then route packets received from the edge adapter 720 as normal over the network 100.

As packets 704 enter the router 702, they are temporarily diverted to the packet analyzer 712 which determines whether or not the packet is to be intercepted. This determination is made in conjunction with the rules processor 716 by analyzing the header data 706 and application data 707 contained with the packet 704 according to pre-defined rules contained within the rules processor. As will be described in more detail below, if it is determined that the packet 704 is not to be intercepted, it is released to the routing logic 730 of the router 702 for normal routing. If the packet 704 is to be intercepted, it is stored in the buffer 714 for further processing and analysis by the rules processor 716 and interceptor/analyzer 712 or one or more of the external devices 724.

Interception and subsequent processing of packets 704 is based on the application of rules to any of the various layers of data contained with the packet 704. As is known in the art, the Internet utilizes the Transport Control Protocol/Internet Protocol ("TCP/IP") protocols to exchange information among connected clients and server computer systems. Further, it is known that the Internet supports several application protocols such as hypertext transfer protocol ("HTTP") or file transfer protocol ("FTP"). The ability of the Internet to support different application uses is based the concept of protocol "layering", also referred to as the layered protocol stack. Layering is the idea of designing several individual pieces of software, where each one performs one out of a set of functions, instead of designing one piece of software which performs all of the functions. Layering simplifies software development and reduces complexity.

In a layered software architecture, many different software components interface with one another to achieve the desired functionality, e.g. allowing a user to communicate over a network. A well known layered network software architecture has the following five layers:

Layer 5: Application Layer
Layer 4: Transport Layer
Layer 3: Routing Layer
Layer 2: Switching Layer
Layer 1: Interface Layer The application layer or layer 5 comprises the particular application program that the user is running on their computer such as a web browser or a web server. The application layer can be thought of as interfacing between the transport layer and a sixth layer which is the end user. Users communicate with the application layer which in turn delivers/receives data to/from the transport layer. Many different applications can be operating at any given time. Particular applications are assigned port numbers or addresses which the transport layer uses to uniquely identify and communicate with the applications. Well known applications have fixed port addresses known as "well known ports." These ports are assigned by the Internet Assigned Numbers Authority (IANA).

The transport layer, layer 4, interfaces the user applications to the network infrastructure and structures the data for transmission by the routing layer. An exemplary transport layer is the Transport Control Protocol ("TCP") described above. TCP is a connection oriented protocol requiring the establishment of parameters for transmission prior to the exchange of data. For more information on the TCP protocol, see TRANSMISSION CONTROL PROTOCOL, DARPA INTERNET PROGRAM, PROTOCOL SPECIFICATION, September 1981, prepared for Defense Advanced Research Projects Agency, Information Processing Techniques Office by Information Sciences Institute, University of Southern California. As described above, the transport layer interfaces with particular applications using a port number or address.

The routing layer, layer 3, facilitates the delivery of data over the network and provides the logical network infrastructure which allows for network partitions or sub-networks, scalability, security and quality of service ("QoS"). An exemplary layer 3 protocol is the Internet Protocol ("IP") discussed above. The IP layer 3 protocol relies on IP addresses to route and deliver packets from their source to their destination.

The switching layer, layer 2, allows end station addressing and attachment. Layer 2 relies on unique Media Access Control ("MAC") addresses assigned to each computer connected to the network. The interface layer, layer 1, is responsible for device connectivity and usually refers to physical hardware/firmware which is used to build the physical network. Layers 1 and 2 are usually integrated and operate together. An exemplary layer 1 is provided by Ethernet type networks. Other layer 1 network hardware includes token ring or fiber optic based networks. The layer 1 physical network hardware provides a unique MAC address for use by layer 2. For example, every Ethernet interface card includes a unique Ethernet address built into it.

The software which implements each layer only has to know how to interface with its adjacent layers, i.e. the application layer only has to know how to interact with the user and the transport layer. This, for example, alleviates the need for a web browser to know how to communicate over all of the various types of physical network hardware (layers 1 and 2) that could be attached to the particular computer. For example, the web browser program, Internet Explorer™, manufactured by Microsoft Corporation, located in Redmond, Wash., does not need to know whether a user is connected to the Internet via local area network or a modem. The routing, switching and interface layers handle this.

In practice, the user communicates with the application layer which generates application data to be sent to a destination. For example, the user enters a Uniform Resource Locator ("URL") into his web browser. The URL identifies a particular world wide web page to be retrieved from a particular web server computer. The web browser then generates a request to that web server for the desired web page, known as a "GET" request. This application data, in this case the URL and the request command, is passed to the transport layer. The transport layer breaks the data down into one or more packets which can be sent over the network. A packet is the unit of data which can be transferred over the network infrastructure and is discussed in more detail below. The transport layer figures out how many packets are needed, and organizes and identifies them so they can be reassembled at the destination. In the case of a URL, only one packet may be necessary to contain the data. The transport layer then passes each packet to the routing layer. The routing layer adds a source and destination address to each packet and hands the packet off to the switching layer. The switching layer in combination with the interface layer transmits the packet onto the network. Once on the network, network hardware such as routers and switches route and direct the packet to the proper destination based on the IP and MAC addresses.

At the destination, as each packet is received, the interface and switching layers pull them off the network hardware based on the MAC address and hand them up to the routing layer. The routing layer ensures that the particular packet has reached the right IP address and then passes the packet up to the transport layer. The transport layer receives and assembles all of the packets. If any packets are missing (due to a network error for example), the transport layer re-requests the missing packet from the source by generating a special request packet. Once the application data has been received and assembled, it is passed up to the application layer. For example, the destination may be a web server, within or external to the device, which receives the URL and request command for further processing.

Notice that the routing, switching and interface layers, as used with the IP protocol, implement a connectionless protocol. These three layers do not guarantee delivery of a packet or set of packets or guarantee how (i.e., over what route or in what order) or when those packets will arrive. They perform a specific function of attempting to deliver a given packet to its intended destination. It is up to the transport layer to make sure that the overall communication is successful.

Another layered architecture which defines seven different layers is the Open Systems Interconnect ("OSI") model. These layers include the application layer, the presentation layer, the session layer, the transport layer, the network layer, the data-link layer and the physical later. For more information on layered network architectures, see Layer 3 Switching, An Introduction, 3-Com Technical Papers, published by 3-Com Corporation, Santa Clara, Calif.

As mentioned above, the transport layer breaks the application data down into packets. The routing layer then attempts to deliver each packet to its destination. A packet is the unit of data upon which the routing layer, layer 3, operates. Packet switching is the scheme by which the packets are routed and delivered to their destination. A packet also logically comprises layers which correspond to the layers of the software architecture described above. In reality, each layer of the packet is really the pieces of information added by each of the software layers as the packet is passed along.

A packet can also logically be thought of as having two distinct layers or parts, the application data and the header data. The application data is the data provided by the application layer, layer 5, as broken down by the transport layer, layer 4, for transmission. This may also be referred to as the "payload". This may be a URL, part of a web page, part of an email, part of a telnet terminal communications, part of a FTP file transfer, etc. The header layer comprises all of the other addressing information provided by layers 1-4 which is used to get the packet from its source application to its destination application. This includes the TCP port address (layer 4), packet sequencing data (layer 4), IP addresses of the source and destination computers (layer 3) and the MAC address (layers 2 and 1). While the above layering architecture and packet structure are more prevalent, one of ordinary skill in the art will appreciate that there are many different known network architectures and software models which can be used with the disclosed embodiments, such as the User Datagram Protocol ("UDP") which is similar to TCP and transmits datagrams.

Packets are delivered to their destination over the network by routers and switches. These devices access the different layers within the packet to determine where to send the packet. A switch is usually associated with layer 2. A switch reads the layer 2, MAC address, from the packet and delivers the packet directly to the correct device. If the switch determines that the device with the correct MAC address is not connected to it, then the switch delivers the packet to another switch and so on until the packet is delivered to its intended destination.

A router is usually associated with layer 3. A router reads the layer 3 IP address of the destination from the packet and, as described above, determines the route, and specifically the next adjacent network point to which the packet should be sent. Routers typically require routing logic which is programmed with knowledge of the network and knows how to determine the route over which to send a particular packet. This routing logic typically includes a routing table which identifies the routes for particular IP addresses. Many routers also factor in network usage information so as to route packets over less congested routes. A router ultimately delivers the packet to a switch which delivers the packet to its final destination. In some cases, a router and switch may be combined. A router may also be used as a firewall or proxy server (reverse or forward), blocking and/or re-routing packets based on their source and/or destination IP addresses.

Referring back to FIG. 7, all packets 704 which are flowing through the particular network node implemented by the router 702 first flow through the packet analyzer 720. Each packet 704 is stored in the buffer 714 for processing by the rules processor 716 and packet analyzer 720. While the processing of a single packet 704 is generally described, it will be appreciated that multiple packets 704 may be buffered and processed substantially simultaneously as described below, such as to improve throughput. The rules processor 716 contains one or more rule sets 726 which are used by the packet analyzer 720. Each rule set 726 contains one or more rules 732 which are applied by the packet analyzer to the buffered packet(s) 704. Essentially, each rule 732, described in more detail below, consists of a function and an action to be taken based on the results of the evaluation of the function. The function may involve analysis or examination of one or more portions of the packet(s) 704, and typically comprises a comparison operation which compares one or more portions of the packet(s) 704 with one or more pre-defined values to determine whether or not the associated action should be taken. The packet analyzer 720 is capable of analyzing or examining any part of the packet(s) 704, including any data from the header data layer 706 or application data layer 708 (including all 5 or 7 layers as described above). For example, one rule 732 may be to compare the port address from the header data layer 706 to a value of 80 to determine if this is an HTTP packet. Further, the rule set 726 may contain several rules which compare different parts of the packet(s) 704 to different values, in effect creating a compound function. An example would be to determine not only that a particular packet 704 is an HTTP packet but also to then determine the URL contained within the application data layer 708. In addition, a function of a rule 732 may also use the result of another rule 732 in its rule set 726 or another rule set 726 as an input to be evaluated. In addition, state information representing the analysis of past packets may be stored and used by rules 732 to analyze future packets. This functionality, for example, may be used to monitor for sequences of particular packets 704 flowing over the network 100.

Once the function of a rule 732 has been processed/evaluated, the packet analyzer 720 will take the desired course of action or actions as dictated by the rule 732. The packer analyzer 720 is capable of taking several basic actions independently or in combination. Further, these actions may be implemented as part of a rule or separately implemented and triggered via an external command from the management interface 722 or from one or more of the external devices 724. The basic actions that the packet analyzer 720 can take include: capturing a packet to the buffer 714 for further operation; releasing the buffered packet 704 to the routing logic 730; forwarding a copy of the buffered packet 704 to one or more of the external devices 724 (described in more detail below); deleting the buffered packet 704 from the buffer 714; modifying the buffered packet 704; and replacing the buffered packet 704 with a new packet(s), which may be received from one of the external devices 724. In addition to or, alternatively, instead of taking these basic actions, the packet analyzer 720 may log or otherwise store information about the packet, including storing a copy of the packet itself. This log may be used for subsequent processing/analysis of other packets or for reporting purposes. As can be seen, one or more of these basic actions can be combined with others to create compound actions to be taken on a given packet 704. For example, a compound action could include capturing a given packet 704 which satisfied the operation of a particular rule 732, forwarding a copy of the captured packet 704 to one of the external devices 724 for further processing, and in response to a command received from that external device 724 (as determined by its own processing of the copy of the packet 704), modifying the IP address and payload of the captured packet 704 and releasing the modified packet 704 to the routing logic 730 of the router 702. It will be appreciated that such complex actions and compound operations can be directly implemented as opposed to being implemented via a combination of basic actions.

In addition, data about the packet 704 may be stored in a memory for use by other rules, for processing the current or future packets 704. This allows stateful processing, i.e. state based rules, of packets 704 as they flow through the packet analyzer 720. By storing information about past packet 704 activity that the packet analyzer 720 has processed, rules 732 may be implemented which take into account historical packet activity. An additional basic operation of the packet analyzer 720 is provided for storing a one or more attributes, or an entire copy, of the captured packet(s) in a state memory. For example, a rule 732 may defined to watch for multiple malformed packets 704. Where a single malformed packet 704 is received, the rule 732 will take no action as this may be due to a random network error. However, data regarding that malformed packet, or the entire packet itself, will be stored. If another malformed packet 704, similar to the first malformed packet 704, is subsequently received, the rule 732 may determine that some malicious activity is underway and delete the second packet 704. Other state information may also be recorded such as a time stamp. This allows the memory to be periodically purged, or alternatively, allows the rule 732 to take into account the frequency of occurrence, etc.

The packet analyzer 720 is fully programmable and rules 732 must be defined for each desired action and contingency. If no rules are defined for a particular contingency, the packet analyzer 720 will take the default action of releasing the packet. In this way, an unprogrammed device will not impede network traffic. For example, where a given packet 704 fails to trigger any rules 732, that packet 704 can be automatically released to the routing logic 730 of the router 702 through the operation of a default action. In one embodiment, the default action is part of a default rule 732, such as a rule 732 which has an evaluation function which always triggers the associated action. In this way, packets 704, for which the packet analyzer 720 or no external device 724 wishes to intercept are simply released to the routing logic 703 for routing as normal. In an alternate embodiment, an unprogrammed packet analyzer 720 will take no action including not releasing the packet 704.

Note that depending upon the implementation of the adapter 720, the basic operations may be implemented in a different fashion. For example, if the packet analyzer 720 automatically captures every packet 704 which flows through the device 720 to the buffer 714, then a capture packet operation may not be necessary. However, in this situation, a release packet operation may be necessary to actively release unwanted packets 704. In alternative embodiments, the packet analyzer 720 may implement an in-line filtering function which eliminates the need to capture a given packet 704 to the buffer 714 for initial analysis. In this case, a capture packet action may be required to tell the packet analyzer 720 to capture the packet 704 to the buffer 714 for subsequent analysis and processing. Further, then, the packet analyzer 720 does not need to actively release unwanted packets 704. However, a release packet action may still be necessary to release those packets 704 which are captured to the buffer 714.

As described above, the rules processor 716 may comprises multiple rule sets 726 and rules 732. Some rule sets 726 and their rules 732 may be defined by the external devices 724 coupled with the edge/packet interception device 720. For example, one external device 724 may want to intercept DNS packets and will define a rule set 726 to implement that function. Another external device may want to monitor and copy all HTTP requests to a particular IP address and will define a rule set 726 to implement that function. Other rules sets 726 may be standardized and provided as standard functions, such as in a library. Still other rule sets 726 may be defined by an external device 724 but can be entirely processed by the rules processor 716. These rule sets 726 and rules 732 may be redefined or reset dynamically by the rules processor 716 or the external devices 724, as needed, to implement their desired functionality. Further, the rule sets 726 and rules 732 may be re-defined or reset via the management interface 722. Rule sets 726 may also implement security or authentication to prevent one external device 724 from interfering with the operation or security of another external device 724. The rules processor 716 interfaces with the external devices 724 and the management interface to enable definition and modification/re-definition of rules 732 and rule sets 726 both statically and dynamically.

The external device interface 718 couples the adapter 720 with one or more external devices 724. The interface 718 provides the hardware and software connection to pass data back and forth between the packet analyzer 712 and rules processor 716 and the external devices 724. This data includes commands to the adapter 720, such as to release a buffered packet 704, modify a buffered packet 704 or to redefine one or more of the rules 732 or rule sets 726 in the rules processor 716. In addition, the data includes packets to be delivered to the routing logic 730 of the router 702 for routing onto the network 100, in addition to, or to replace, the packet presently held in the buffer 714. Further the data can include copies of buffered packets 704 from the packet analyzer 712 sent to one or more of the external devices 724 in response to the action of one or more rules 732. The interface 718 further implements the parallel connection of multiple external devices 724 to the network 100 so that each device 724 does not increase the overall network 100 latency. The interface 718 may also implement arbitration schemes so that each external device 724 can implement its particular application in an efficient manner and without interference from the other external devices 724. In one embodiment, up to eight external devices may be coupled with the adapter 720 via the interface 718, although alternative embodiments may support fewer or more devices. In one embodiment, all packet processing is handled within the adapter 720 and no external device interface 718 is provided.

Figure 8:
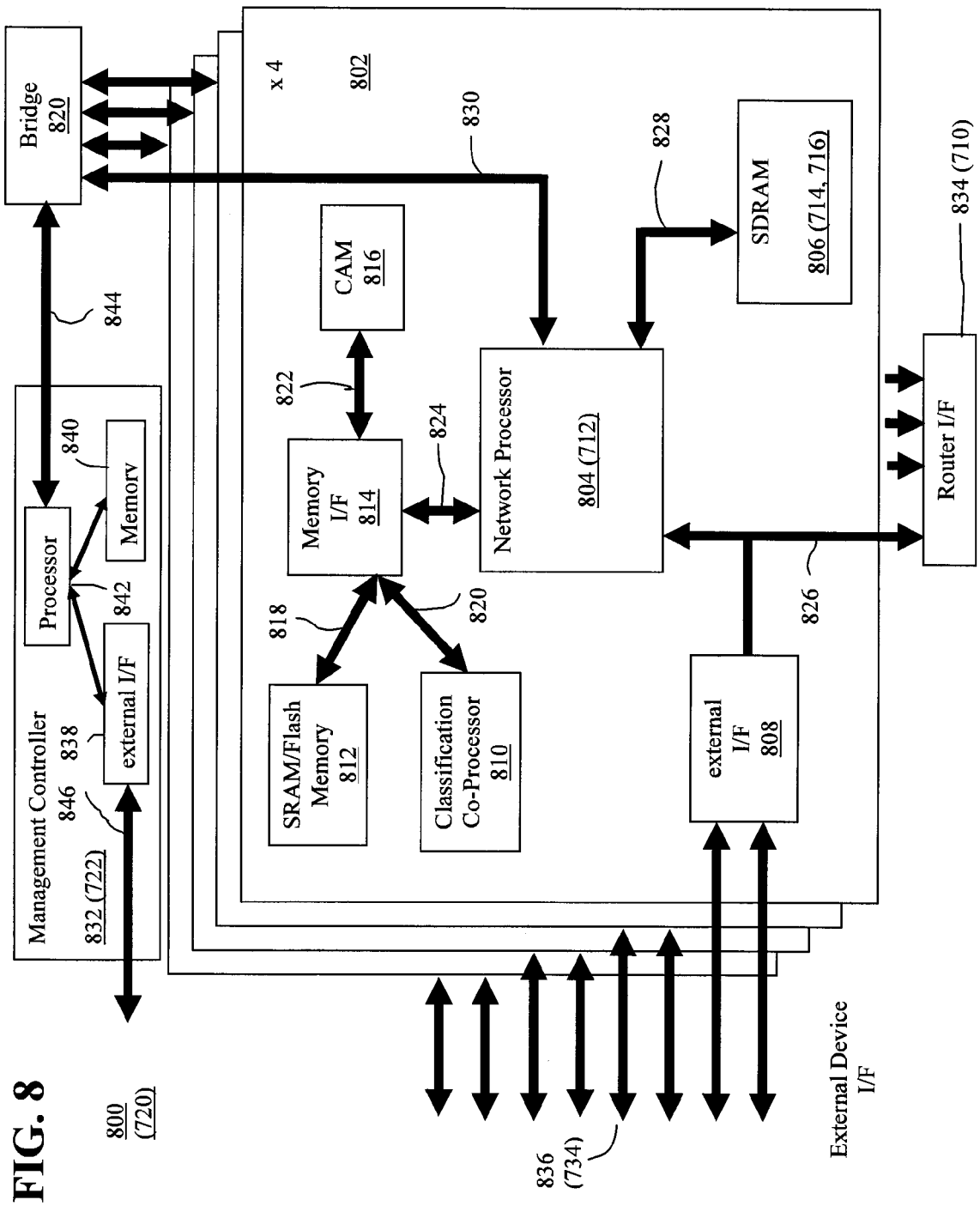
FIG. 8 depicts a block diagram of the packet analyzer/adapter of FIG. 7.

Referring now to FIG. 8, there is shown a more detailed block diagram 800 of the adapter 720 from FIG. 7. As described above, the adapter 720 may be implemented as a standalone device, an adapter card/board/blade which is inserted into a router's 702 backplane interface or an adapter card/board/blade which is inserted into blade enclosure and coupled with the ISP or Carrier's routing mechanism. Further, in one embodiment the adapter card comprises a management controller 832 and four adapter daughter cards 802, each daughter card providing, for example, two external device 724 interfaces 836. Further, a bridge device 820 may be provided to interface each of the daughter cards 802 with the management controller 832 and a router interface 834 which couples each of the daughter cards 802 with the router 702 backplane.

The management controller 832 may comprise an external interface 838 coupled with a processor 842 and memory 840. The external interface 838 may be an 82559 100 megabit Ethernet interface, manufactured by Intel Corporation, located in Santa Clara, Calif. It will be appreciated that other external interface technologies may also be used such as serial, parallel, coaxial and fiber optic based interfaces. The external interface 838 further comprises a VMS747 Security/Cryptographic Processor, manufactured by Philips Semiconductors, Inc., located in the Netherlands for security. The external interface 838 interfaces the management controller 832 with an external management device (not shown) for controlling and managing the adapter 720 via interface 846 which may be a 100 megabit Ethernet interface. The external management device may be a 808x compatible desktop computer including a Pentium Class processor such as a Pentium III processor manufactured by Intel Corporation in Santa Clara, Calif., 32 megabytes of RAM, 6 gigabytes of hard disk space and an Ethernet interface. It will be appreciated that such desktop computer systems are well known. In alternative embodiments, the external management device can be locally or remotely located with respect to the adapter 720. The processor 842 may be a StrongArm™ control processor manufactured by Intel Corporation located Santa Clara, Calif. The processor 842 is coupled with memory 840 which may comprise both 16 megabytes of Synchronous Dynamic Random Access Memory as working storage and 32 megabytes of non-volatile (Flash or Static RAM) storage for firmware and back-up storage. The processor 742 interfaces the management controller 732 with the four daughter cards 802 using a standard Personal Computer Interface ("PCI") compliant bus 844 and bridge logic 820. Alternatively, the Compact Personal Computer Interface ("CPCI") may be used.

Each daughter card 802 includes a network processor 804, bulk data storage 806, an external device 724 interface controller 808, a memory interface 814, a classification co-processor 810, non-volatile storage 812, and a content addressable memory 816. The network processor 804 may be an IXP1200 Network Processor, manufactured by Intel Corporation, located in Santa Clara, Calif. The network processor 804 includes six micro-engines (not shown) which handle buffering and processing packets as will be described. The network processor 804 is coupled with the PCI bus 830 which interfaces the daughter card 802 with the PCI bridge logic 820 which in turn links all of the daughter cards 802 together and with the management controller 832. The network processor is also coupled with the bulk data storage 806, which is which may include 8 megabytes of Synchronous Dynamic Random Access Memory (SDRAM), via a 64 bit. 83 MHz bi-directional (166 MHz total) SDRAM bus. The bulk data storage 806 is used to store the operating software for the network processor 804, the buffered packets undergoing processing as well as the rules and rule sets as will be described below.

The network processor 804 is further coupled with the external device 724 interface controller via a 64 bit. 66 MHz bi-directional (132 MHz total) IX bus 826. The external device 724 interface controller may be an IXF1002 Dual Port Gigabit Ethernet MAC, manufactured by Level One™, Inc., located in Sacramento, Calif., a subsidiary of Intel Corp., located in Santa Clara, Calif. The external device 724 interface controller interfaces with the external devices 724 using gigabit optical transceiver interfaces 836.

In addition, the IX bus 826 also interconnects the four daughter cards 802 with the router backplane (not shown) via the router interface 834. The interface 834 may comprise a Quad IXA field programmable gate array, manufactured by Xilinx located in San Jose, Calif., which controls cross communications between the daughter cards 802 and the traffic gating to the router backplane. Further, the router interface 834 may include the router switch fabric interface to interconnect the adapter 720 with the router backplane.

The classification co-processor 810 may comprise a ClassiPI™ Classification Co-processor, manufactured by SwitchON Networks, Inc., located in Milpitas, Calif. The non-volatile storage 812 may comprise 32 megabytes of Flash memory or Static RAM or other non-volatile storage as is known in the art. The content addressable memory 816 may comprise a NetLogic IPCAM® Ternary CAM Ternary Content Addressable Memory, manufactured by NetLogic Microsystems, Inc., located in Mountain View, Calif. The classification co-processor 810, the non-volatile storage 812 and the content addressable memory 816 are all coupled with the memory interface 814 via memory busses 818, 820 and 822. The memory interface 814 may be a field programmable gate array device implementing glue logic and clocking signals for the non-volatile memory 812. The memory interface 814 further couples the classification co-processor 810, the non-volatile storage 812 and the content addressable memory 816 with the network processor 804 via a 32 bit 83 MHz bi-directional (166 MHz) Static RAM memory bus 824.

The non-volatile memory 812 is used to store the operating software, including the operating system and custom microcode, for the adapter 800. Upon boot up of the adapter 800, this operating code is loaded into the bulk storage memory 806 from which it is executed. The non-volatile memory 812 is further used to store rules 832 and state level information used to restore previous system operation parameters when powering on. The classification co-processor 810 and content addressable memory 816 are used by the network processor 804 to offload specific rule processing tasks when it is more efficient to do so. In particular, processing of rules which involves table look ups or matching values to table entries is best handled by the content addressable memory 816. Establishing packet type or other classifying operations are best handled by the classification co-processor 810. As will be described below in more detail, the operating code of the network processor 804 is pre-programmed to cause the network processor 804 to offload certain processing functions to the classification co-processor 810 or the content addressable memory 816 when those devices can perform the particular function more quickly and efficiently than the network processor 804 can. It will be appreciated that other application or function specific processing devices may be included to more efficiently process particular functions of the adapter 800. Such devices may include: a CryptoSwift™ cryptographic processor, manufactured by Rainbow Technologies Products, Inc. located in Irvine, Calif.; a C-5™ Digital Communications Processor, manufactured by C-Port, Inc., located in North Andover, Mass., a subsidiary of Motorola, Inc., located in Schaumburg, Ill.; a NetLogic Policy Co-Processor™ Packet Classification Engine, manufactured by NetLogic Microsystems, Inc., located in Mountain View, Calif.; a NetLogic CIDR Co-Processor™ Longest Prefix Match Engine, manufactured by NetLogic Microsystems, Inc., located in Mountain View, Calif.; a NetLogic IPCAM® Ternary CAM Ternary Content Addressable Memory, manufactured by NetLogic Microsystems, Inc., located in Mountain View, Calif.; a NetLogic SyncCAM® Binary CAM Binary Content Addressable Memory, manufactured by NetLogic Microsystems, Inc., located in Mountain View, Calif.; or a NetLogic NCAM™ Binary CAM Binary Content Addressable Memory, manufactured by NetLogic Microsystems, Inc., located in Mountain View, Calif.

It will be appreciated that the preferred components are known in the art and that suitable substitutes which implement the same functionality may be used. Further, the disclosed packet interceptor adapter may also be embodied in an alternative physical architecture such as a single board design, or an adapter box external to the router.

Generic operation of the packet interceptor adapter 720 is as follows: A packet is intercepted by the packet analyzer 712/804. Framers on the router interface 834 capture the packet and forward it to the network processor 804. Framers are protocol specific devices which understand the network protocol in use, such as Ethernet or Asynchronous Transfer Mode ("ATM"), and which are capable of isolating packets from the raw communications stream and extracting the actual packet contents.

The packet is buffered in buffer 714/806. The network processor 804 places the intercepted packet into the bulk data storage 806 and creates and stores a packet information block ("PIB") which contains parameters of the packet for efficient reference. These parameters include the source and destination addresses, length and other packet specific data as well as the address within the SDRAM 806 where the packet is buffered/stored. The network processor 804 further creates a pointer to the packet information block in a queue which lists packets ready for further processing. In one embodiment, the network processor 804 includes six micro-engines as described above. Two of these micro-engines are designated masters and the remaining four are designated as slaves. As packets enter the adapter 800, one of the two master micro-engines, depending upon availability, buffers the packet to the SDRAM 806 and creates the PIB and pointer.

First level rules/sets are executed against the buffered packets. In one embodiment, the slave micro-engines, described above, when idle, continually check the queue of packets ready for further processing. When there is a pointer in the queue of a packet that is ready, the idle slave micro-engine dequeues the pointer entry for the packet and begins processing that packet according to the rules and rule sets programmed into the adapter 800. In one embodiment, each rule set consist of a hierarchical tree of nodes which are logically linked together, where one or more nodes form a rule. Each tree begins with a root entry node where processing begins. Each node may be one of three types, data gathering, decision or action. Data gathering nodes retrieve data or other information about the current packet, about the current operating environment or about other packets which may be relevant to the current packet being processed and which have been stored for such reference. Data gathering nodes gather information to be used by decision nodes. Decision nodes perform a function utilizing the data gathered by the data gathering nodes such as a comparison function, an equality function, an inequality function, or some other mathematical and/or Boolean operation. An action node uses the result of the decision node to perform some operation on the packet. In one embodiment of the adapter 800, the possible actions include releasing the current packet, copying the current packet and sending the copy to an external device via the external device interface 808, or alternatively, sending the PIB or pointer, deleting the packet or modifying some or all of the packet and releasing it, or combination thereof. Each node specifies another node to which processing should continue when processing of the current node is complete. It will be appreciated that the node and tree structure is a logical data organization which may be implemented as a table of pointers or other construct as is known.

When processing a data gathering, decision or action node, the slave micro-engine may offload the processing to a co-processing element such as the classification co-processor 810 or the content addressable memory 816. The operating code of the slave micro-engine is pre-programmed to cause the micro-engine offload processing of specific node functions when that processing can be more efficiently completed with the other device. In this case, while the co-processing device is processing the particular node, the slave micro-engine either waits for processing to complete or begins processing another packet. In the latter case, when the co-processing device finishes its processing of the particular node, it can indicate that the packet requires further processing, for example by adding a pointer back to the ready for processing queue, so that a slave micro-engine will finish processing the packet.

Once a slave micro-engine has begun processing a packet, it must determine which rule set to enact upon the packet. In one embodiment, each rule set defines a set of one or more packet parameters which indicate to the slave micro-engine that the rule set is to be applied to the current packet. The slave micro-engine references the packet information block using the pointer to determine that the one or more packet parameters meet the rule set requirements. If so, then the slave micro-engine executes that rule set starting with the root node in the tree. If a particular packet triggers application of more than one rule set, the slave micro-engine processes the rule sets in a prioritized order. Alternatively, other execution schemes may be used such as round robin. In one embodiment, the slave micro-engine determines which rule set to execute based upon packet type, wherein only a single rule set is stored for each type of packet that may be intercepted. For example, FTP packets may trigger application of one rule set while HTTP packets may trigger application of a second rule set.

Each rule set/tree of nodes then consists of a set of data gathering, decision and action nodes which process the packet and take a particular course of action. In one embodiment, each rule set is constructed so as to make a quick initial determination on whether to hold or release the packet from the buffer. In this way, processing latency is reduced. Once the particular course of action has been taken with the packet, the slave micro-engine other rule sets, if any, on that packet or returns to polling the queue of packets ready for processing to pick up another packet for processing.

When an action node results in sending a copy of a packet out to an external device, no further action is taken on that packet until a response is received from the external device. In one embodiment, the slave micro-engine waits for a response from that external device before continuing processing. In an alternate embodiment, the slave micro-engine processes other packets while waiting. The response from the external device instructs the slave micro-engine on what further actions to take with the packet. Such further action includes deleting the packet, releasing the packet, or modifying the packet, or combinations thereof. In one embodiment, the external device may provide a substitute packet for the buffered packet to release, with the buffered packet being deleted. This substitute packet may be provided directly to the buffer 806 to overwrite the buffered packet. In yet another alternative embodiment, once the copy of the packet, the PIB or the pointer has been sent to the external device, the slave micro-engine is free to begin processing another packet. The external device then signals that it has completed its processing, such as by writing a packet pointer to the queue of packets ready for processing or some other flag indicating the further processing can take place on the buffered packet to complete the processing thereof.

Where a particular packet fails to trigger the application of any of the rule sets, default rules or actions may be provided for processing the packet, as discussed above. In the disclosed embodiments, the default rule/action consists only of the action of releasing the packet. In this way, packets which are not of interest are immediately released for normal routing.

In addition, the adapter 800 may receive commands from either one more of the external devices 836, or the management interface 832. In one embodiment, the adapter 800 authenticates any commands received to ensure they are from valid sources. Such commands include commands for adding, modifying or deleting a rule set, commands for providing an externally generated packet for release, or commands to delete, modify or release a packet currently in the buffer.

The specific operation of the packet interceptor adapter 720 executing denial of service protection application for malformed Internet Control Message Protocol ("ICMP") packets is as follows: Framers on the router interface 834 captures a packet and forwards to network processor 804. An idle master micro-engine on the Network processor 804 stores packet in buffer/SDRAM 806 and creates PIB and pointer. The pointer put on the queue of packets ready for processing. An idle slave micro-engine checks the queue for packets to be processes and dequeues the packet pointer. The slave micro-engine executes a default application specific rule set. The first rule in the set checks the source IP address of the packet against a list of blocked IP addresses. This processing takes place in the content addressable memory 816 which is more efficient at processing this type of look-up function.

If the source IP address matches a blocked IP address stored in the content addressable memory 816, the slave micro-engine deletes the packet from the buffer and processing ends for this packet. If the source IP address does not match a blocked IP address, the slave micro-engine determines the packet type by analyzing the packet header. If this packet is not an ICMP packet, the packet is released.

If the packet is an ICMP packet, the packet is sent to the classification co-processor 810 to check for proper packet construction. The classification co-processor 810 compares the construction of the buffered packet against a reference stored in the non-volatile memory 812.

If the packet is determined to be malformed, the slave micro-engine is instructed to delete the packet and processing ends for this packet. In one embodiment, the IP address of malformed packet is added to a block list. In an alternate embodiment, the IP address is added to the block list only after the number of malformed packets received from this IP address exceeds a particular threshold. In still another embodiment, the receipt of one or more malformed packets raises an alert to a user for manual intervention to add the source IP address to the block list.

It will be appreciated that any device which intercepts and processes packets can utilize the packet interceptor adapter 720. For example, devices which utilize the transport layer or layer 4 data to route packets to their destination or redirect them to alternate destinations are known. These devices attempt to learn the type of application data being carried by the packet based on the transport layer port address. As described above, well know applications utilize "well known ports." For example, HTTP data uses port 80, Telnet use port 23, FTP uses port 21 and domain name server requests use port 53. This information can be used to redirect a particular packet to a server which can more optimally handle the packet. Utilizing the packet interceptor adapter 720, such devices could define a rule to have the adapter intercept packets destined for a particular port number of a particular IP address. For those packets which are intercepted, the action taken could be to modify the destination IP address to an alternate destination and release the packet. This functionality could be completely implemented on the adapter 720 itself or the adapter 720 could forward copies of intercepted packets out to an external device which dynamically determines the modified IP destination address.

Another exemplary application of the packet interceptor adapter 720 is as web switch. A web switch is used to balance the load across multiple mirror servers at a particular web site. The adapter 720 is programmed with a rule to intercept packets directed to transport layer port 80 of the particular web site (based on the IP address). Knowing that these packets contain HTTP requests, the adapter can re-route the packet from an overloaded server to a server which has excess capacity, thereby balancing the load distribution. Again, this functionality can be implemented directly on the adapter 720 or in combination with an external device 724 which is monitoring and controlling the load distribution across the servers.

In one alternative embodiment, the adapter 800 provides no external interface 836 for external devices. In this embodiment, the adapter 800 intercepts packets and executes rule sets as described above. The rule sets may be developed and provided by third party developers for particular applications. The adapter then comprises a generic packet interceptor and processor.

In still another alternative embodiment, the adapter is configured as an application specific device with a defined rule set for implementing a specific application or set of applications. For example, the adapter is specifically configured to act as an anti-denial of service security device.

In an alternate implementation, the disclosed embodiments may themselves be implemented in a standardized environment to bridge between external devices 724, as described above, and a common or standardized interface to the provider's infrastructure, e.g. the provider's router or routing logic, and thereby, the network 100. This results in the decoupling of the interception of packets from the processing of those intercepted packets thereby providing a generic packet interception and pre-processing engine which can be utilized in parallel by multiple edge devices to transparently implement their respective functionality/applications.

In particular, the disclosed embodiments may be physically implemented as a "blade" or "blade server," as was described above, and connected via a rack mount arrangement referred to as a blade enclosure, such as the IBM Blade Center, manufactured by IBM Corporation, Sorrens, N.Y., which provides standardized power, cooling and connectivity for blade-implemented devices, such as blade servers, etc. The external devices 724 may also be implemented as blades inserted into the same, or a different, blade enclosure and interconnected thereby as will be described. Blade servers are self-contained computer servers, designed for high density deployment. Whereas a standard rack-mount server can exist with (at least) a power cord and network cable, blade servers have many components removed for space, power and other considerations while still having all the functional components to be considered a computer. A blade enclosure provides services such as power, cooling, networking, various interconnects and management— though different blade providers have differing principles around what should and should not be included in the blade itself (and sometimes in the enclosure altogether). Together these form the blade system.

In an exemplary standard server-rack configuration, 1U (one rack unit, 19" wide and 1.75" tall) is the minimum possible size of any equipment. One principal benefit of, and the reason behind the push towards, blade computing is that components are no longer restricted to these minimum size requirements. The most common computer rack form-factor being 42U high, this limits the number of discrete computer devices directly mounted in a rack to 42 components. Blades do not have this limitation; densities of 100 computers per rack and more may be achievable with current blade systems.

The exemplary implementation using the IBM BladeCenter system provides services delivery within the IBM BladeCenter HT Chassis leveraging adapters 800, referred to as Deep Packet Processing Modules (DPPM), developed by CloudShield Technologies, such as the CloudShield Deep Packet Inspection ("DPI") Blade, also referred as the IBM PN41 Deep Packet Inspection ("DPI") Blade Server, which may include one or more DPPM's, available from the IBM Corporation. The identification of customer network traffic and coordination of services being applied to the traffic is one role of the DPI blade as a network processor. Other server blades may host the applications/services that will be served up to the customers on an as-provisioned basis, referred to as application servers. In an alternate embodiment, the DPI blade may host applications/services in addition to or in lieu of other server blades. These applications/services include, for example, firewall (e.g. Checkpoint Firewall-1), virtual private network, denial of service protection (e.g. Arbor TMS), intrusion prevention (e.g. IBM ISS Preventia IPS), anti-spam and/or anti-spyware applications. A DPI blade or server blade may also play the role of a content processor whose functionality is more limited to heavy lifting and deep inspection of traffic often as a co-processor or subordinate role to an application server or network processor.

The implementation provides a resilient, scalable framework to add new services via a software provisioning event, i.e. transparently without requiring reconfiguration of the providers physical or logical infrastructure, while also enabling customer based provisioning to have a dynamic impact on the per customer and/or per device service delivery. From a transport perspective the system may be transparent on both ends, the service provider infrastructure as well as to the application servers providing the services. This allows a service provider to insert the chassis, or cluster of chassis', into the network without impacting the Layer 2 or 3 delivery structure as if the services were transparent or not even present. Application servers are further able to leverage existing products in their native form without modification. For example, an enterprise firewall may be deployed in a carrier environment on an application server without change as the disclosed embodiments make it transparent to the network yet allow the firewall to act as a gateway as it normally would. To enable increased features for enterprise class applications, virtual machine technology can be introduced to provide simplified migration, high availability and maximize resource utilization.

The CloudShield DPI blade acts as a network processing line card and together or separately as a deep packet inspection content processing blade. These blades look at all traffic that arrives at the chassis, determine which was for customers or services within the chassis and which are for other systems. Traffic for a specific customer being serviced would be sent to the appropriate customer's applications housed on an application server. Network layer transport manipulation would be utilized to appropriately deliver a customer's traffic to their associated processing element, customer specific rule set as well as support high-availability and fault tolerant fail-over scenarios. When multiple services are applied, coordination of the order of services is manages such that response traffic goes through services in the opposite order of requests.

As scalability demands increase, greater amounts of processing time or multiple server blades can be leveraged for a given customer's traffic. When virtualization technology is used on the application servers, as a failure occurs, virtual machines can be migrated to alternative server blades and the network devices can dynamically re-route traffic to the new customer processing location. As more customers are provisioned to the system, the traffic can be selected based upon newly provisioned policies to be sent to the appropriate processing element. Leveraging the ability to identify traffic as belonging to a customer at the application layer and performing modification of the packets within the chassis to provide internal BladeCenter address translation, applications can be deployed without unique tailoring for each customer beyond what they wish to configure. This mechanism provides for mobility, fault tolerance and resiliency as well as scalability.

As was described above, the DPI blade, provides multi-gigabit, multi-function, programmable, deep packet inspection. Inspecting, processing, and modifying packet contents at high speeds without noticeable latency provides capabilities for handling application layer threats, and the text-based protocols of Voice, Video and Data services. Coupled with packet operations scripting language, the DPI blade enables network operators to deploy traffic treatment algorithms of their own design allowing them to differentiate service offerings, or develop classified solutions for protecting national infrastructures. These capabilities further enable content monitoring and control, and security applications to be performed on even small packet sizes, and enable entirely new classes of applications and services.

The DPI blade, having one or more DPPM's, may scale in clusters as well as individual systems processing from 2 Gbps up to 5 Gbps per DPPM, and offer, for example, 10/100 Ethernet, Gigabit Ethernet and OC-3/12/OC-48 SONET/SDH interfaces. 10 Gbps Interfaces and enhanced clustering capabilities (referred to as Traffic Control System in this document) may be further provided to enable scalable processing in the 10's of Gigabits per second ranges without change to existing applications. Future processor sub-systems may increase the layer 7 processing ability in similar form factors.

As described above, the DPPM is architected to feed input rates up to 10 Gbps to Packet Buffer Memory for content analysis. Analysis occurs in place (a zero copy architecture) based upon flexible logic (RAVE™ code) provisioned to the system that leverages content analysis functions to assess and maintain state information in a relational database implemented in silicon (Silicon Database). The system can operate at a packet level as well as session level with stream re-assembly capabilities (Stream Processing Accelerator) in the data plane.

In one embodiment, the DPPM includes, for example, a combination of Network Processors (Intel IXP28xx or Netronome NFP 32xx manufactured by Netronome Inc., Cranberry Twp, Pa.), CloudShield Processors (Xilinx Virtex II Pro, Virtex 5 or Virtex 6 FPGAs), Content Processors (IDT PAX.Port 2500 or LSI T1000 processor manufactured by LSI Corp., located in Milpitas, Calif.), Silicon Database Memory (Netlogic 18 Mb T-CAM, 512 MB DRAM) plus Stream and Packet Memory (768 MB RDRAM). In addition a slew of support chips such as Intel Framers, Health Management & SONET Overhead Controllers (FPGA/CPLD), General Purpose Memory (QDRSRAM, ZBTSRAM) and Management Network GigE Switches among other devices are utilized to create the motherboard for a network content processing architecture. An operating system software, such as the CloudShield Packet Operating System ("CPOS™"), may be provided, such as a run-time operating system that orchestrates DPPM platform data plane resources to perform the packet operations (packet read, table lookup, string search, variable update, packet capture, packet write, etc.) called within applications, such as RAVE™ applications.

With respect to operations, there are at least two aspects of a DPPM, such as the adapter 800 described above, which may be considered. First is the streaming side of the device which includes the data path of packets in and out of the DPPM as well as to content processors and packet storage areas. In one embodiment, these pathways may be designed using 12.8 Gbps bus technology (SPI-4.2) to move traffic from network interfaces in and to a packet buffer storage. These packet buffers may use three RDRAM banks each operating at 12.8 Gbps as a single large striped memory array. On top of this high speed foundation is overlayed the network intelligence. Network intelligence may come in several flavors to map to the types of processing required. At the baseline, there is layer 2 through 7 packet dissection, checksum validation & recalculation and switching which occurs at bus rates (packet analysis at >10 Gbps all packet sizes). The second layer is packet buffering and delivery to content analysis engines. Stream buffers (where multiple packets can be assembled into an application layer message) reside in the RDRAM as well and are able to maintain storage of packets, copying of packets to and from stream buffers plus transmission external at line rate. In addition, unstructured content analysis (e.g. POSIX Regular Expression Analysis—REGEX) is done by streaming selected data from packet or stream buffers to pattern analysis engines accessible on the SPI-4.2 bus. REGEX is able to sustain between 4 and 5 Gbps per blade with custom response processor removing the overhead of return traffic on the SPI-4.2 bus. The usage of these of these buses and access rates per packet is controlled by the application. The last level of processing is the logical application processing. Systems may be currently tuned for a balance of processing and analysis such that a sustained 2 to 4 Gbps is generally achieved in the layer 7 analysis by combining algorithms and application logic, unstructured content analysis, state management and statistics storage. RAVE™ is one example of a network processing language, developed by CloudShield Technologies, Inc., designed for developing applications (or policies) that operate in the data plane. It is abstracted from the hardware, however, tuned for high speed content analysis. Generally engines are developed in RAVE™ with data driven user based provisioning of features coming from out of band OSS systems.

The disclosed embodiments may be used for extreme processing cases where every packet is interrogated at layer 7. This generally includes inspection, analysis and manipulation. This has focused processing around driving all traffic to deep packet processing logic developed in RAVE™ with tuning to maximize the amount of packets processed per blade at layer 7.

In 10 Gbps market scenarios where a given network interface is 10 Gbps and possibly heavily utilized, processing can become difficult to achieve without negatively impacting the network. In this environment, it becomes important that a system can analyze all traffic at wire speed, for example, categorizing the traffic into one of three buckets, namely traffic not of interest, traffic that may be of interest and traffic known to require specific processing. Traffic not of interest can be redirected (directly or indirectly switched), traffic potentially of interest can be passed along for further layer 2 through 7 analysis in a RAVE™ subsystem of a DPPM and traffic known to be of interest can be processed on a DPPM or other device (such as a server blade) awaiting the traffic. Of importance in this scenario is to make sure that traffic can be directed at each level in accordance with the processing ability of the next stage of processing.

In one embodiment, flow control may be implemented using a RAVE™ application. Upon ingress of packets to the RAVE™ flow control application, the application analyzes the traffic for customer identification and determination of interest in the flow, identifies services to apply and performs header storage and transformation, and tabulates billing metrics and services tracking data for reporting systems. Coordination of re-routing for failover situations may also be implemented.

The packets then may be routed to the application server via a fabric interface controller which may remove or envelope internal headers and transmit traffic onto the appropriate 10 GbE backplane switch fabric. Once the application servers finish processing, the packets may be received therefrom via the fabric interface controller which receives traffic from the 10 GbE backplane switch fabric interface, inspects the traffic and sends it to the appropriate next destination.

Traffic may then egress the Rave™ flow control application whereby the application restores the customer's packet headers and frees storage as appropriate, analyzes custom packets for table management and generates and maintains per-subscriber and per-service Billing/Reporting counters.

Figure 10:
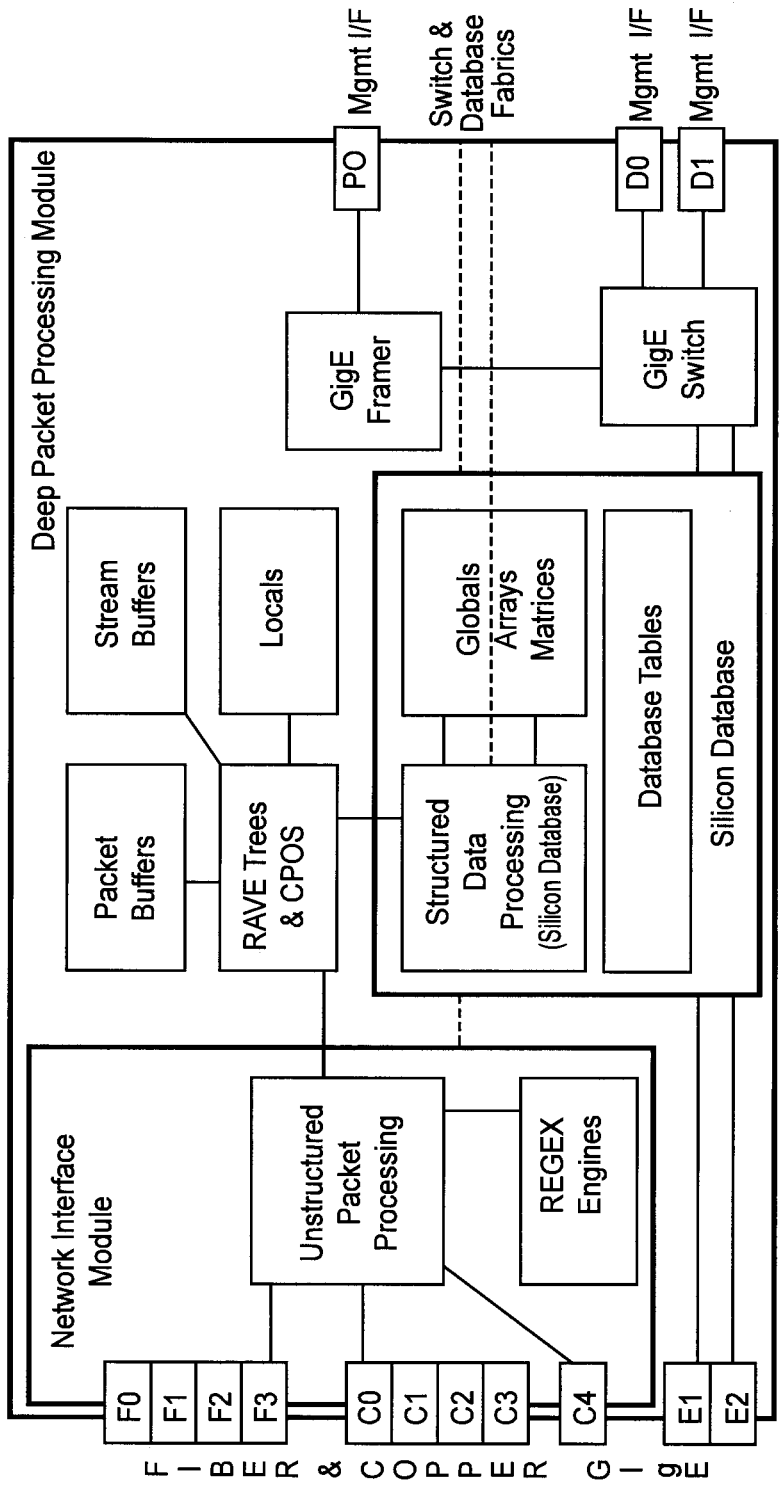
FIGS. 10 and 11 depict the logical and physical implementation of a deep packet processing module according to one embodiment.
Figure 11:
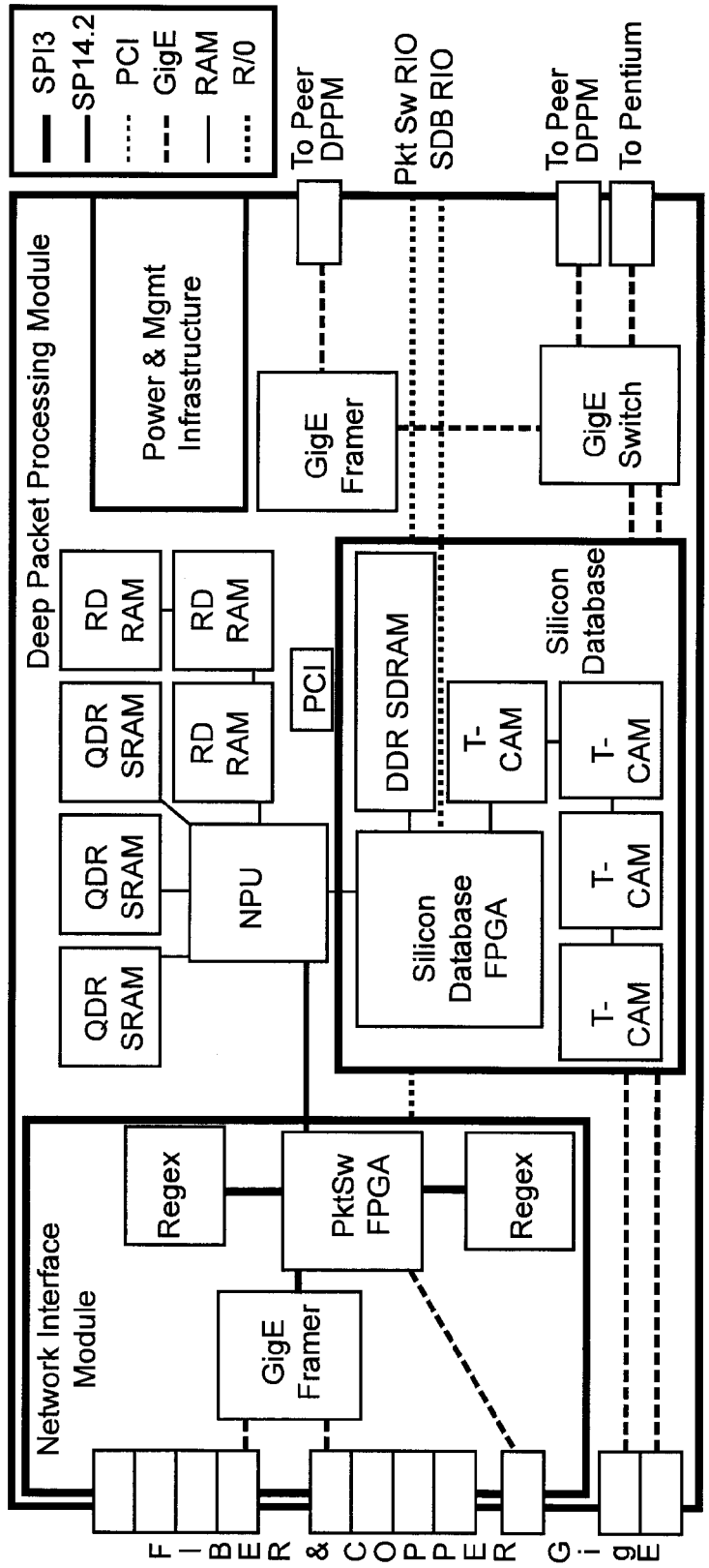

Solution deployments come down to picking the appropriate traffic to process at layer 7 within the device. FIGS. 10 and 11 show the logical and physical breakout of an exemplary Gigabit Ethernet DPPM. In this standard configuration, the focus is to bring all traffic from the interfaces (up to 5 GigE) into Packet Buffers and then apply layer 2 through 7 processing. The exemplary DPPM, performing wirespeed 10 Gbps layer 2 through 7 classifications, may be capable of making decisions on which traffic to send locally for processing, distribute to other DPPMs for processing or pass directly on to an alternate processing devices. In the exemplary 10 Gbps DPPM design, a line rate Traffic Control System is integrated into the Network Interface Module allowing full 10 Gbps classification to occur and appropriately determine and direct where to process. This enables either direct load balancing to external devices (optically or via fabric), content based routing and selective application layer processing within a 10 Gbps stream and clustering of layer 2 through 7 processing for intensive applications where both data rate and number of applications must be scaled. Line rate 10 Gbps is able to be sustained and scaling of processing is separated from network rate and content distribution within the traffic streams, assuming that at some point more applications will be applied to a given stream than can be processed within a single resource module thereby requiring scalability and clustering.

Figure 12:
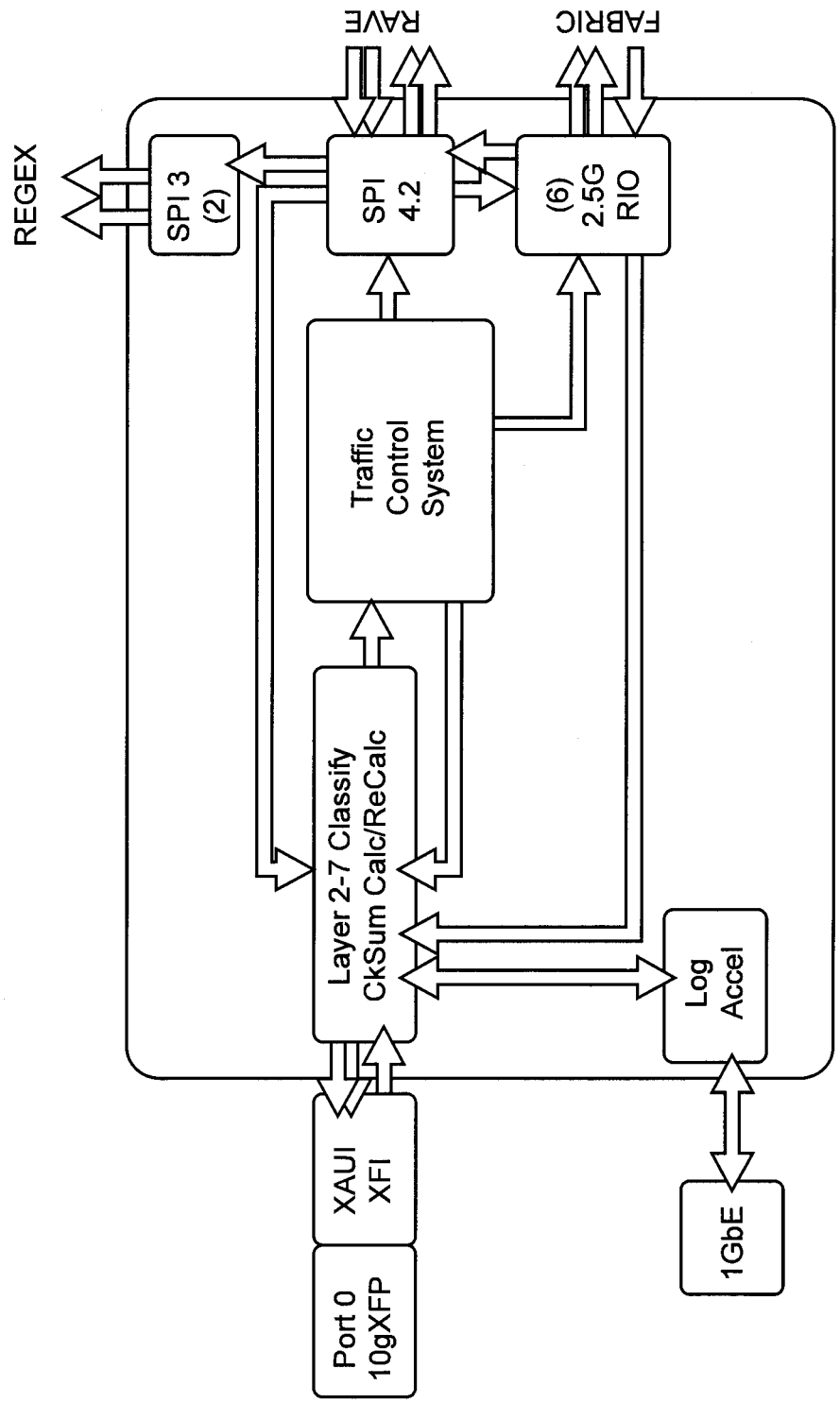
FIGS. 12 and 13 depict a logical architecture of an exemplary traffic control system according to one embodiment.
Figure 13:
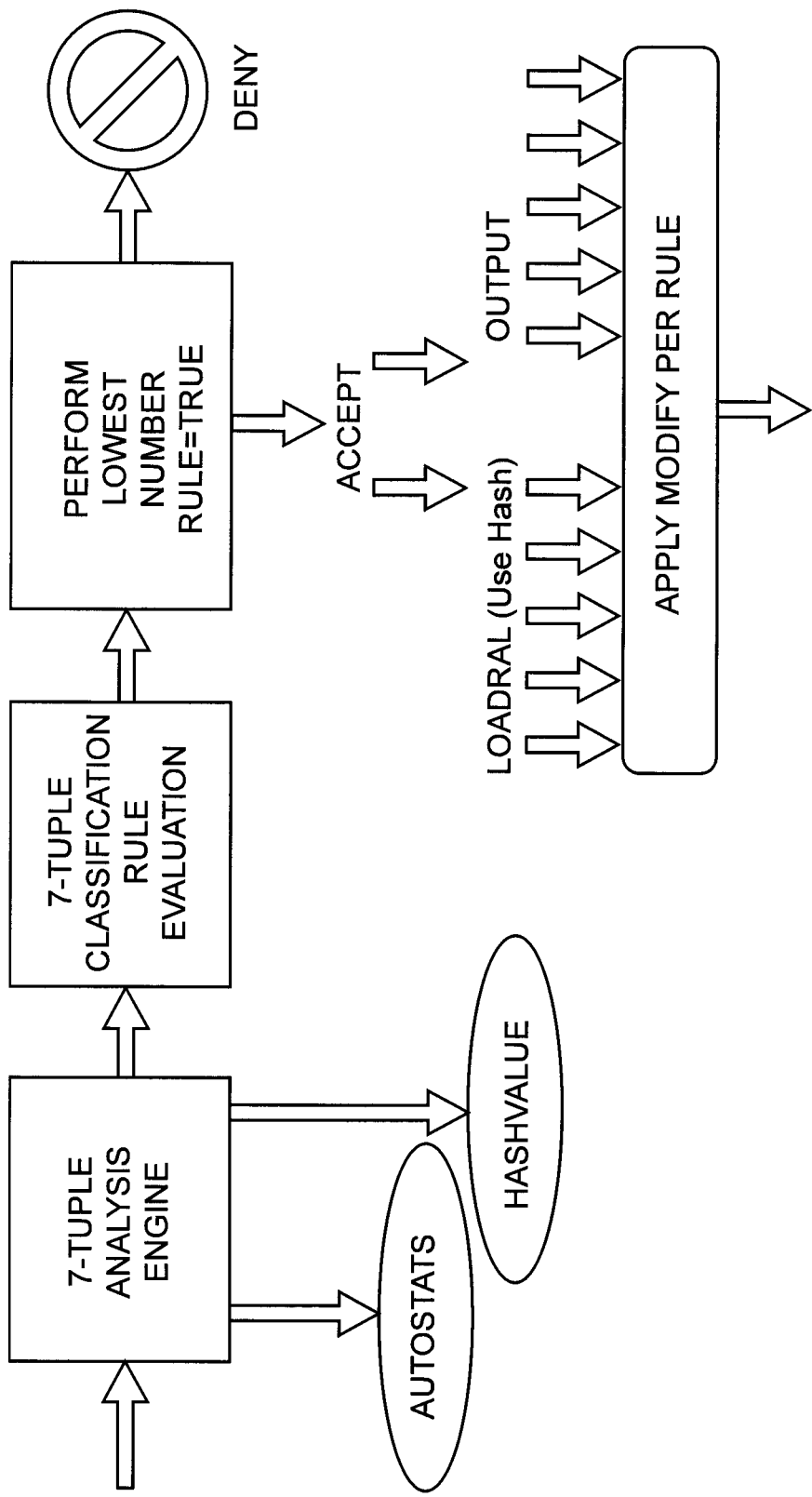

FIGS. 12 and 13 show the logical architecture of an exemplary Traffic Control System integrated with the 10 Gbps Network Interface Module (NIM) of the exemplary DPPM 800. A single 10 GbE XFP plus a single RJ-45 GbE interface comes into the DPPM to the device. In both cases the Framer is instantiated within the Virtex II Pro FPGA. The Layer 2 through 7 classification and checksum management system remains as implemented in other disclosed Gigabit Ethernet DPPM modules operating at 10 Gbps input and output. FIG. 13 shows the logical architecture of the Traffic Control System (TCS). The TCS analyzes the 7-tuple described later in the appendices. Important to note is that since some traffic may not go to the local RAVE™ processing subsystem, the layer 2 through 4 traffic statistics are tracked within the TCS and forwarded to the Silicon Database automatically by the system. Traffic analysis can result in filtering, switching as well as layer 2 re-writing for indirect switching. Locally the TCS may direct traffic to the local 10G or 1G interface, local RAVE™ processor or destinations across the Fabric interface which may be a remote RAVE™ processor or any physical or Ethernet destination remote to the Fabric. In a CS-2000 with (2) DPPM blades the fabric connects each DPPM direct to the peer DPPM. In an IBM BladeCenter implementation, a fabric switch on the DPPM may be implemented that ties to the DPPM Rocket 10 interfaces, as shown FIGS. 12 and 13, and to the (4) 10 GbE interfaces on the backplane.

Figure 14:
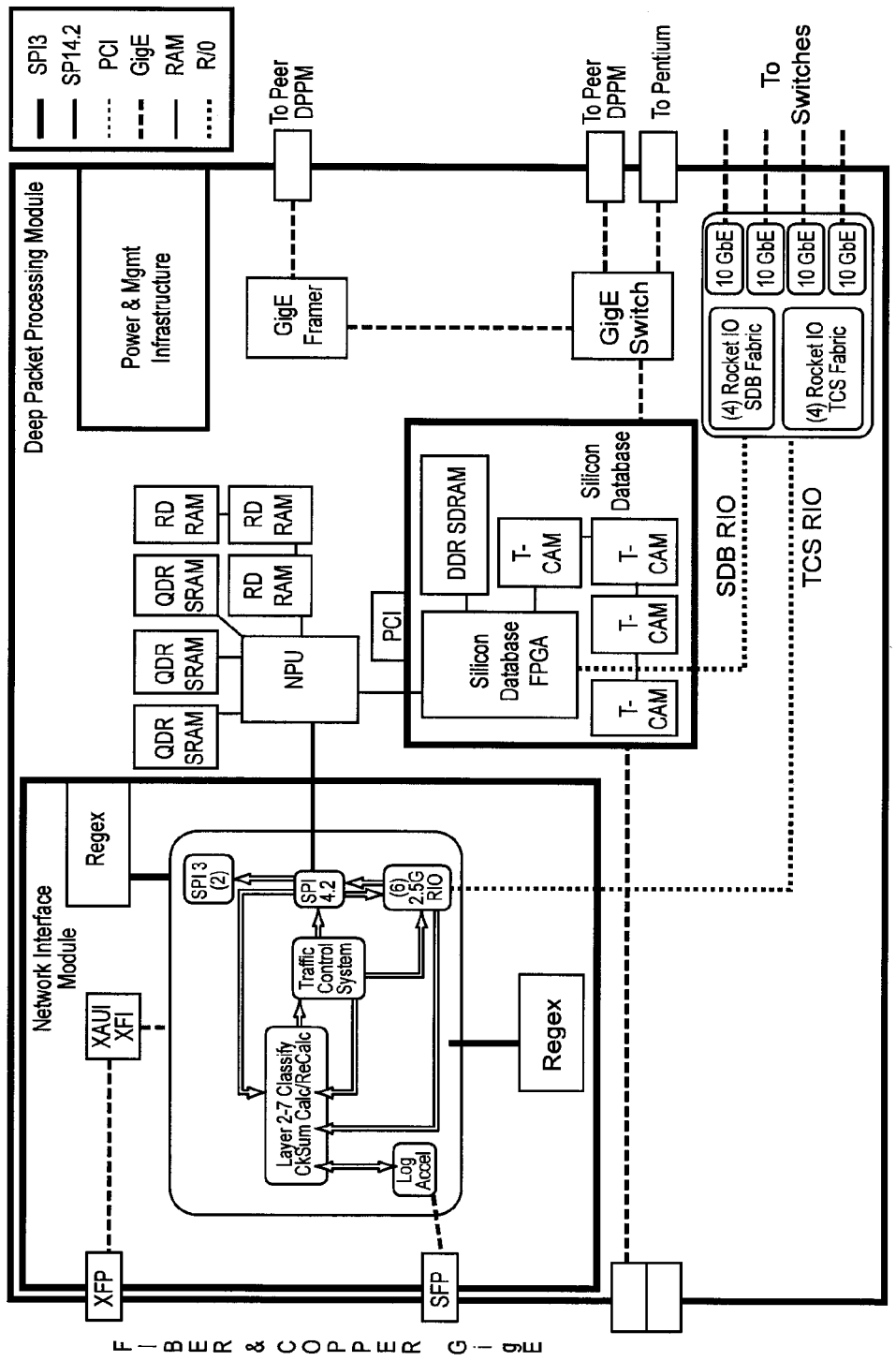
FIG. 14 depicts a representation of one embodiment of a packet analyzer/adapter implemented for use with a blade enclosure.

FIG. 14 shows a block diagram of the IBM BladeCenter variant of the exemplary DPPM. In one embodiment, the DPPM will be integrated within the IBM BladeCenter chassis as a processor blade, fitting into the same slots where blade servers will occupy. DPPM's shall be interchangeable with blade servers fitting in any of the 14 slots on an H chassis or 12 slots on an HT chassis. The functionality of CloudShield CS-2000's application server module ("ASM") may be ported to operate on an existing IBM blade server. The hardware management functionality built onto ASM and DPPM blades may be integrated with the existing IBM BladeCenter chassis management systems such that DPPMs can be managed as if they were a blade server for traditional information and via IBM's IPMI interfaces for DPPM specific information. The DPPM blades will have one XFP based 10 GbE interface and on RJ-45 GigE interface on the front faceplate. Standard Gigabit Ethernet pathways will be used internally for management and high speed 10 GbE interfaces internally will be used for fabrics interconnect. There may be four high speed fabric interfaces on the backplane of a blade. There may be up to four high speed switches able to be inserted into the chassis. The intent is that traffic will come into a DPPM and initially be processed at 10 Gbps by the Traffic Control System. Packets may immediately exit the chassis or be directed either to other DPPM blades or blade servers. To separate data plane processing from server processing, high speed switch fabrics may be separated between those that are used to interconnect the DPPMs and those that are used to connect the DPPMs to the blade servers. This architecture may remove traffic not being processed from the chassis from the high speed switch as well as provide secure separation of network processing from application layer processing since a CloudShield DPPM could be the bridge between two high speed switching domains.

In one embodiment, a CloudShield DPPM may be embedded within the IBM BladeCenter with 10 Gigabit Ethernet switch fabric connectivity built into the BladeCenter.

The CloudShield DPPM is connected to the ingress and egress interfaces for the network and may be responsible for processing all network traffic arriving or leaving the chassis to and from the service provider network. An application, written in CloudShield's in-networking computing data plane programming language, known as "RAVE™," may be responsible for determining the customer and directing the traffic to the application server(s) using network layer modifications, generally comprising Layer 2 and Layer 3 Ethernet.

As was described above, application software may be loaded onto blades servers such that they can operate as applications server that provide revenue bearing services on behalf of a service provider's customer, such as antivirus services, anti-spam services, intrusion protection services, etc. This software may be of an enterprise application type which takes over an entire blade and has no notion of customers, or may be one that stores a different policy per customer. In some cases this software may be transparently bridging network interfaces of the blade server while other software may act as gateways or responding targets on a single interface. Furthermore, tools such as VMWare may be loaded on these application servers such that different services or different instances per customer may be loaded in each virtual machine ("VM").

An example implementation of the architecture may leverage the VMWare ESX Server provisioned onto a blade server. For example, the application may perform Malicious Packet Scrubbing with a tool such as SNORT using its inline functionality. 10 Virtual Machines may be configured on a blade server, each with their own unique MAC ID on assigned to each VM for each interface (Eth0 and Eth1 which are 10 Gbps NIC interfaces). Services may be provisioned based on classifications of customers as gold, silver or bronze, reflecting the level of service to which a customer has subscribed or is otherwise being provided. Virtual Machine #1 is assigned to Gold Customers where 5,000 signatures are loaded into a system that at 100% processor load sustains 200 Mbps at an Internet Traffic Mix. Virtual Machine #2 contains a reduced rule set, 1,000 signatures, for Silver Customers where 100% processor load sustains 500 Mbps at an Internet Traffic Mix. Virtual Machine #3 would be setup for Bronze Customers with 100 signatures looking for the top "in the wild" exploits of interest to home users. At 100% processor load, this mix maintains 800 Mbps with an Internet Traffic Mix. The remaining 7 Virtual Machines may be assigned to business customers with dedicated packet scrubbing. The intent would be to service T-1/E-1 customers (1.5 Mbps service) with extensive rule sets, similar to a Gold Service but with personalized rule sets. At 100% load each of these would be presumed to have similar to Gold Service performance at 200 Mbps with an Internet Traffic Mix. At 5% CPU for each Platinum VM, they should sustain bursts to 10 Mbps, while occupying 35% of total CPU time. The remaining three services might each get 20% CPU providing Gold with 40 Mbps for sale, Silver with 100 Mbps for sale and Bronze with 160 Mbps for sale. Separate from oversubscription, using bandwidth rates this can be equated to customers served and % of an application server and software to identify pricing. This may also be used to measure when load becomes too high.

The VMWare based configuration allows the network processing blades to direct traffic using Ethernet Address (MAC ID) to the physical server blade. Should the virtual machine need to be re-hosted on another blade for performance or availability reasons, traffic redirection can seamlessly migrate as it would be seen as a simple layer 2 switching re-route. Given a static configuration of rules, as in the Bronze, Silver and Gold exemplary embodiment, subscribers would see no loss due to such migration and potentially could be applied to another already running backup without waiting for a switch-over at the VMWare level.

In one embodiment, the DPPM with 10 Gigabit Ethernet Interfaces may act as a line card, interfacing the telecommunication lines coming from the subscribers (such as copper wire or optical fibers) to the rest of the carrier's access network. In this embodiment, the ingress to the BladeCenter may be connected to an upstream router facing the Internet which carries traffic that has not yet been processed.

In a simple implementation, a server blade may be configured to receive traffic using layer 2 delivery and may respond back to the requesting Layer 2 device with the resultant data after processing. In this method, a service may require only one backplane port, may live within a single switch domain and may easily scale to 2 ports and switches for redundancy. This model may require modification of applications, however, a dual 10 Gbps NIC enables an application server to have a primary and secondary should a switch fail. Traffic of interest flows into the DPPM and is inspected to determine which subset requires processing. Traffic not of interest may be immediately sent out of the chassis while traffic to process is sent to the appropriate blade server. The blade server will receive the traffic and, if virtual machine technology is in use, the traffic may be analyzed by the virtual machine to direct it to the virtual interface with the configured soft MAC address of the particular application running thereon. The application will process the traffic according to the service being provided. If, according to the service, the traffic, or a subset thereof, is to be allowed to continue to a destination or over the network, the traffic is provided back to a DPPM. The receiving DPPM will then adapt the traffic to make it appropriate to place back into the service provider network.

Figure 15:
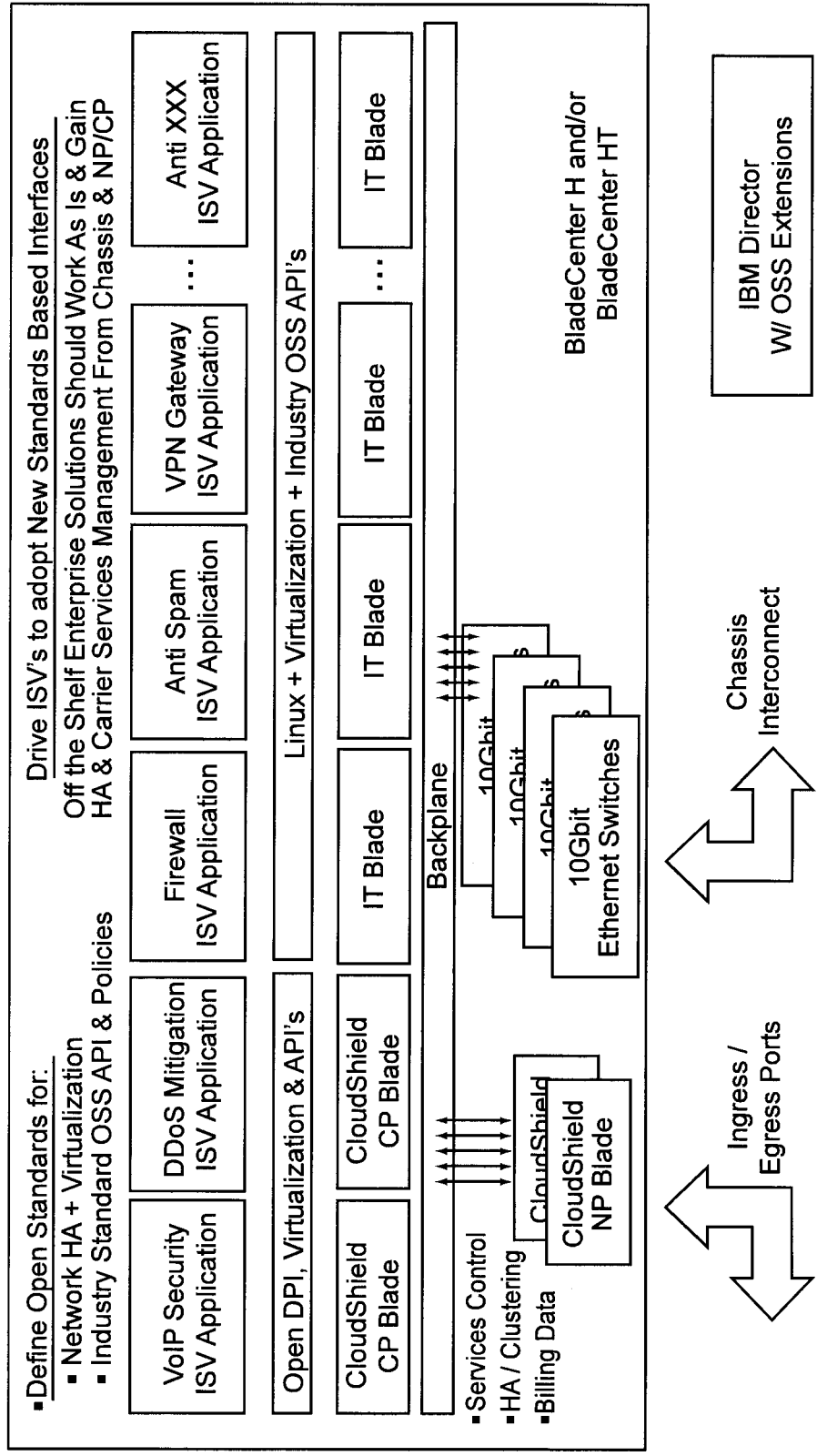
FIG. 15 depicts another representation of a blade implementation of the packet analyzer/adapter according to one embodiment.

FIG. 15 shows a solutions oriented view of the IBM BladeCenter according to one embodiment. Along the bottom are the primary interface blades to the chassis, namely the CloudShield DPPM acting as an NP Blade and one or more Blade Network Technologies (BNT) 10 Gigabit Ethernet Switch Modules. The transport links connected to the service provider may tie into the NP Blades while chassis to chassis interconnect may tie into the BNT Switches. In the figure, a green horizontal bar represents the backplane and the logical separation of CloudShield blades and Server blades provide application level support. In this role, CloudShield DPPM blades may be referred to as Content Processors while the IBM BladeCenter server blades (e.g. HS21 IT Blade) are running Application Servers. As part of the role of an open platform, API's for CP blades and IT blades are identified and may include the RAVE™ migration to PacketC and Cloudshield's Northbound application program interfaces ("APIs") such as SSH and Web Services. This embodiment may be deployed into regional or metropolitan aggregation nodes, e.g. metro-nodes, where high bandwidth ingest and processing may be required.

In one embodiment, 10 Gigabit Ethernet may be the basis for connectivity of the solution. Internal to the chassis, short point to point signaling may be used while chassis to chassis signaling may utilize fiber based connectivity with features such as link aggregation becoming important on a switch to switch link. Internally and between chassis, virtual local area network ("VLAN") tags of multiple varieties may be added to the packets and the switches should ensure that they operate in L2 switching mode, not performing any specific operations based upon higher layer packet constructs such as VLANs. Static MAC to interface addressing must be supported in the switches. Externally, the ingress and egress traffic may have VLAN tags, 802.1q in q, multiprotocol label switching ("MPLS"), point to point protocol over Ethernet ("PPPoE") and non-IP traffic signaling between routers that must be understood and preserved such that no link issues occur.

In some embodiments, a router may be north and south of the transport interfaces to a cabinet. Further, primary and secondary interfaces to the routers may be provided for redundancy. Considering a single 10 Gigabit pathway, with upstream and downstream connectivity, that brings (4) 10 Gigabit Interfaces to the system that must be monitored for that circuit. Redundant DPPM pairs may be utilized for the primary/secondary fiber pathways in an active/active mode such that with 4 interfaces only 4 blades are required and should any link fail the traffic can adapt to the other pathways. Internally, high speed switch fabrics will be able to hand-off traffic between NP blades. In one implementation, 2 BNT Switches may be leveraged for customer application servers while another 2 BNT Switches may be leveraged for Inter-NP Blade traffic. Customer traffic asymmetry should be considered. Given that application solutions, such as Firewalls, are being introduced as a service, if traffic appears upstream on one given set of NP blades and the response downstream appears in a different chassis in the cabinet, that upstream and downstream traffic may have to be coordinated to arrive at the appropriate application server so that the firewall application sees the expected bidirectional traffic stream. In addition, depending on a provider's core network, upstream and downstream traffic may be divided among metro nodes.

As traffic rates increase, e.g. the percentage of traffic desiring value added services and number of available services, the disclosed embodiments should be able to gracefully scale to tens of 10 Gigabit circuits with a hundred thousand customers and dozens of available services in a given metro node.

Service Traffic Manipulation refers to the re-writing of traffic in order to transform it from the service provider network form ("SPNF") to the internal application server form ("IASF"). Note that there may be many forms in which traffic will arrive at the chassis (MPLS, VLAN, Q in Q, PPPoE, etc.) and those protocols may have no relationship with how an application server may expect to have traffic delivered to it. For example, enterprise class applications or application servers may expect to receive traffic formatted in standard enterprise class protocols, such as Ethernet, as opposed to the protocols used by carriers. The modification of traffic from SPNF to IASF and back to SPNF may be a critical role of the NP Blade. In addition, there may be multiple services applied to a packet for which the NP Blade may need to do multiple IASF to IASF manipulations based upon the application servers requirements for a given service.

Figure 16:
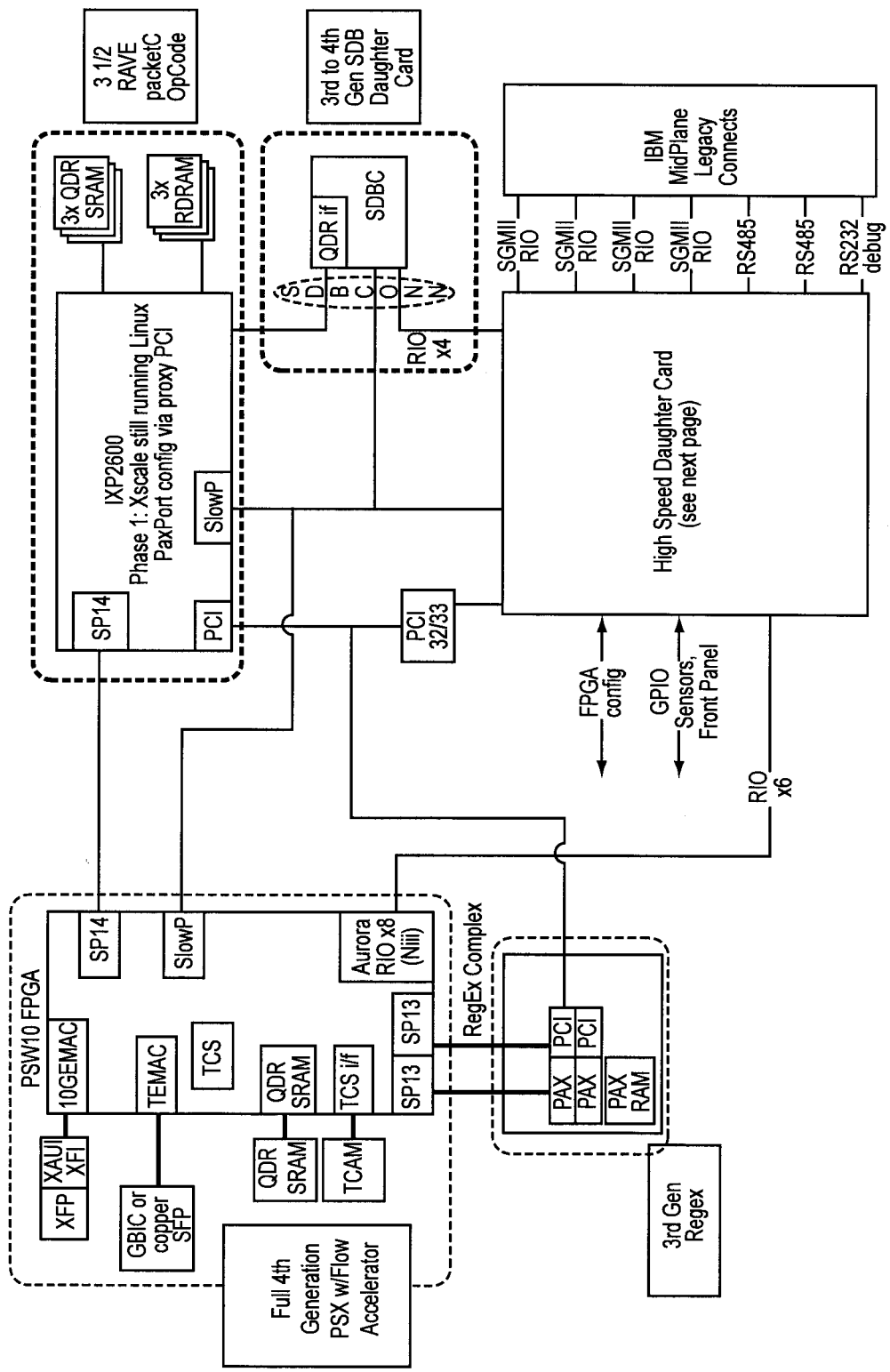
FIG. 16 depicts another representation of a blade implementation of the packet analyzer/adapter according to one embodiment.

FIG. 16 shows a block diagram of one embodiment of the DPPM base card for the IBM BladeCenter. In this embodiment, the network interface module ("NIM") is condensed onto the base board and there is a ternary content addressable memory ("TCAM") added to the content switching system ("PSX") to support the migration from traffic control system ("TCS") to the flow acceleration subsystem ("FAST"). The silicon database ("SDB") may be implemented as a daughter card as shown along the right edge of the figure. Support logic, such as PCI Bridge, Dual GigE MAC, CMX and other elements have either been removed or integrated into the High Speed Daughter Card ("HSDC"), shown in FIG. 17 and described in more detail below. Rocket IO signaling from the SDB and PSX communicate with the HSDC. The FAST identifies bulk traffic not identified for the provisioning of services by leveraging customer identification lookups in a content addressable memory and user based routing in the chassis. A page index table ("PIT") indicates which action set is to be executed for a given matched customer identity and a flow action table ("FAT") specifies the action and action modifiers. Rule actions include forwarding the packet to the network processing using ("NP"), forwarding the packet to a port with no modification, forwarding the packet to a port with header modification, such as DMAC/SMAC/other), or forwarding the packet to a port with VLAN header modification.

Figure 17A:
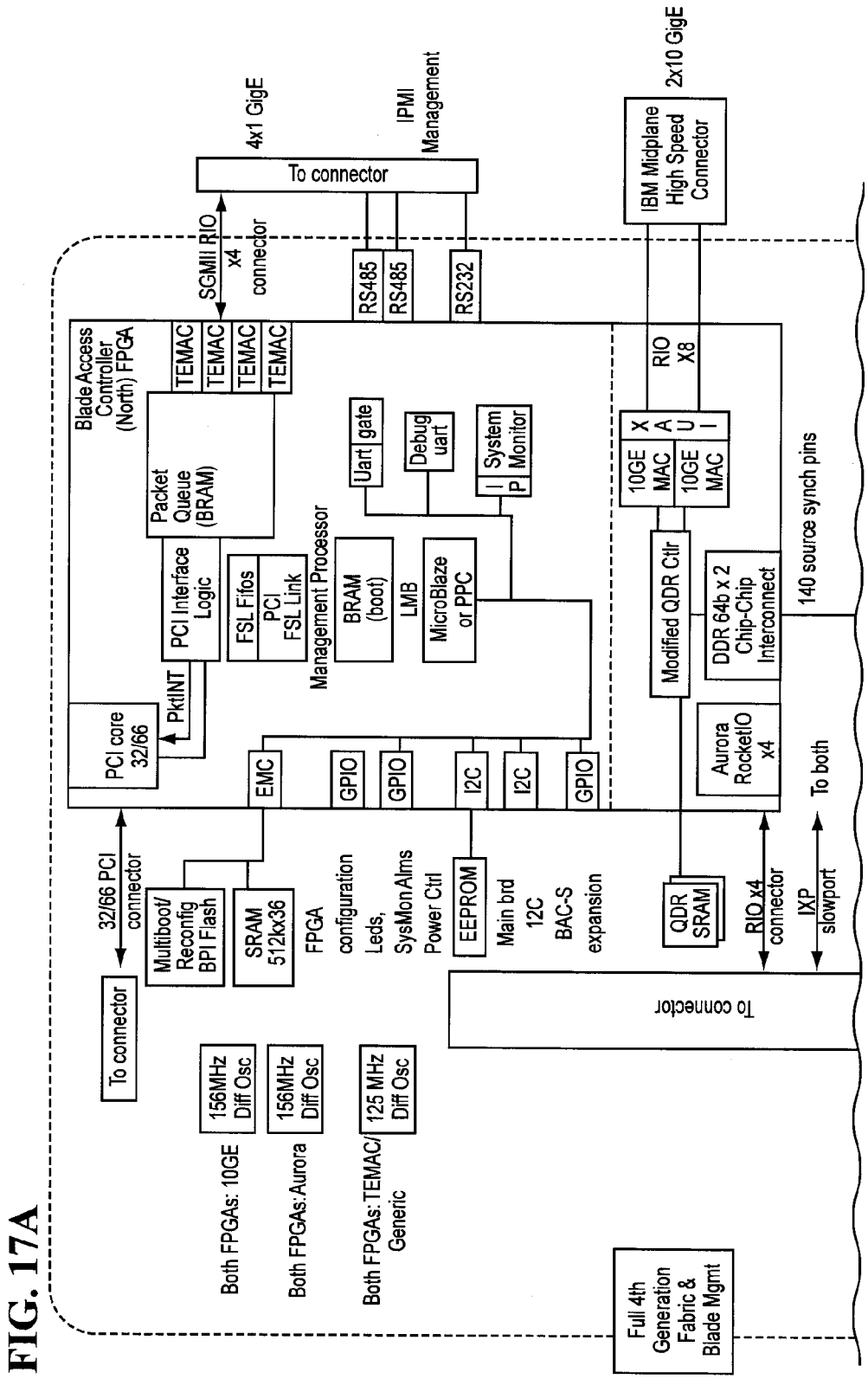
FIG. 17 depicts another representation of a blade implementation of the packet analyzer/adapter according to one embodiment.
Figure 17B:
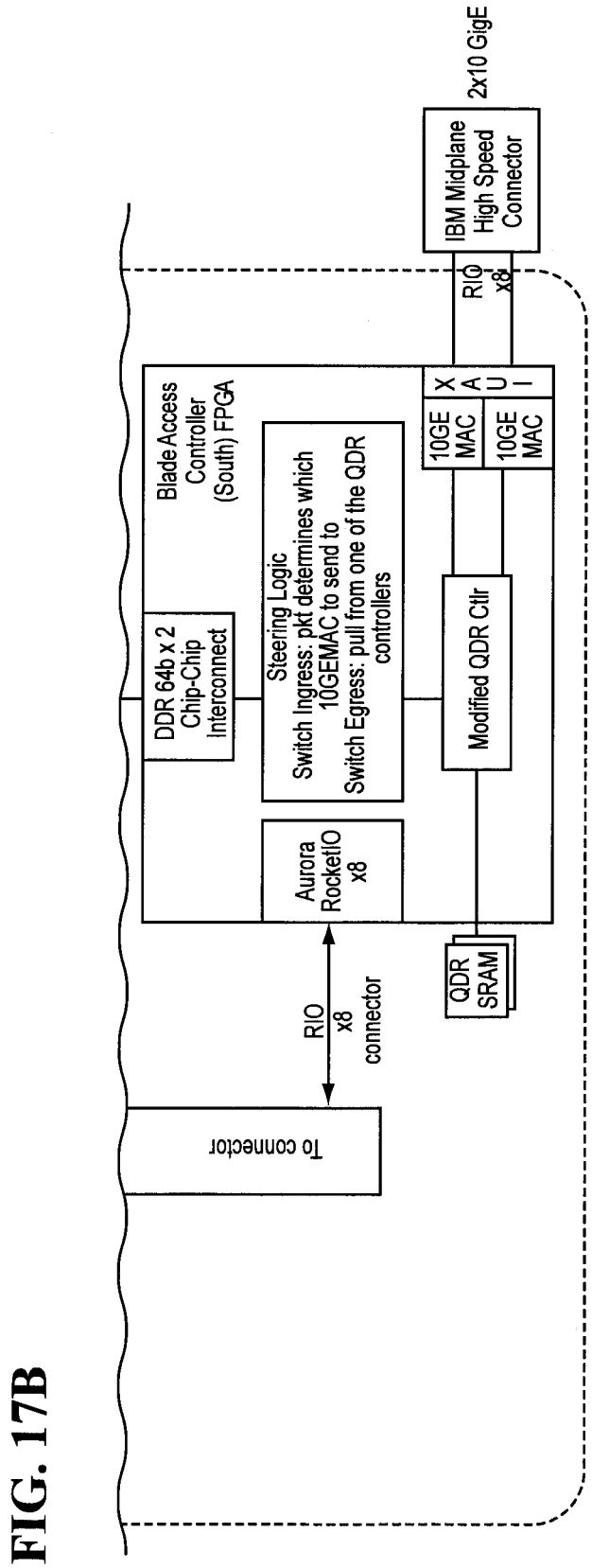

FIG. 17 shows a representation of one embodiment of the High Speed Daughter Card for use in the IBM BladeCenter. In this embodiment, the north chip (Blade Access Controller) is a Virtex 5T that embeds the PCI Bridge, GigE MACs and CMX into an intelligent platform management interface ("IPMI") based management controller. The IXP2805 or NFP-3200 communicates with this device using PCI, Slow Port and a diagnostics The Blade Access Controller ("BAC") and the Fabric Interface Controller (south chip, also Virtex 5T) each manage two of the 10 Gigabit Ethernet backplane interfaces along with Rocket 10 support to the SDB and PSX. The BAC has 4 lanes to the SDB while the FIC has 8 lanes to the PSX. Each of these also has limited queuing ability for flow control using an associated QDR SRAM. There is also a high speed interconnect for packets that need to cross connect between the devices.

In one embodiment, the first action a Service Director must perform is inspecting all traffic to determine whether it is for a customer whom has paid for services. Any traffic which is not for a paying customer must be prioritized to egress immediately on the appropriate link. Depending on the service provider's network, determination of which packets are from a paying customer may be accomplished by multiple means, such as:

IPv4 Address
IPv6 Simple Address
IPv6 Embedded Routing Address
802.1q VLAN Tag
802.1q in q Embedded Tag
802.1q in q Combined Tags
MPLS Label Stack Entry or Pseudo Wire
PPPoE (PPPoEoE per Cisco/Juniper)

In one embodiment, traffic embedded in transport headers which is non-IP within the metro nodes may be considered to be not customer related as non-IP traffic should have not made it from the edge past routers to this point in the network. As such, all non-IP traffic may be considered not for customers and passed through the architecture. For a given deployment, the Service Provider Network Form (SPNF) should be consistent. In other words the format of traffic coming into the transport interfaces of the DPPM should be of one type from the list above and have only one identification mechanism for customers for a given Service Director blade, though the software may provide options in this regard.

Traffic received on the transport interfaces may be decoded and then the appropriate fields may be interrogated to determine whether the traffic is applicable to a customer and how it should be serviced. For example, if the identification method is IPv4 Address, the source and destination IP addresses will be read and a look up will be performed against the packet. Should a match be found, this may identify that the traffic is to be processed for a particular service. The appropriate action is read and the traffic is directed appropriately. These steps are performed within the FAST and the action may be to pass the packet on to the RAVE™ logic portion of the Services Director for applications.

IPv4 Customer Traffic Identification refers to a method of traffic identification whereby the packets arrive in standard Ethernet II form with IPv4 headers and the IP addresses are utilized to identify the customer. IPv4 traffic identification involves reading the source and destination IP addresses. Traffic flowing from the customer to the destination will utilize the source IP address. In the above described embodiments having dual DPPM's, one DPPM may be responsible for this identification practice. The other DPPM may be responsible for inspecting traffic returning from the destination to the customer and would utilize the destination IP address for identification.

Some networks, especially mobile networks and networks used in Asia, may require IPv6 addressing for identification of customers. IPv6 Simple Addresses refers to the condition where IPv6 is presented with a single header in the packets and the Source and Destination IP addresses can be utilized similar to IPv4 Customer Identification. Note that in IPv6 networks, the applicability of some applications as services may be limited or need further DPI processing in order to present them in a fashion that the application services blades can accept. This may include IPv4 to IPv6 gateways or more detailed flow proxies.

IPv6 Embedded Routing Address Customer Traffic Identification is a similar use case to the IPv6 Simple Address identification, however, in this case more complex routing headers are anticipated on the network and decoded to find a final destination which will be utilized.

Figure 18:
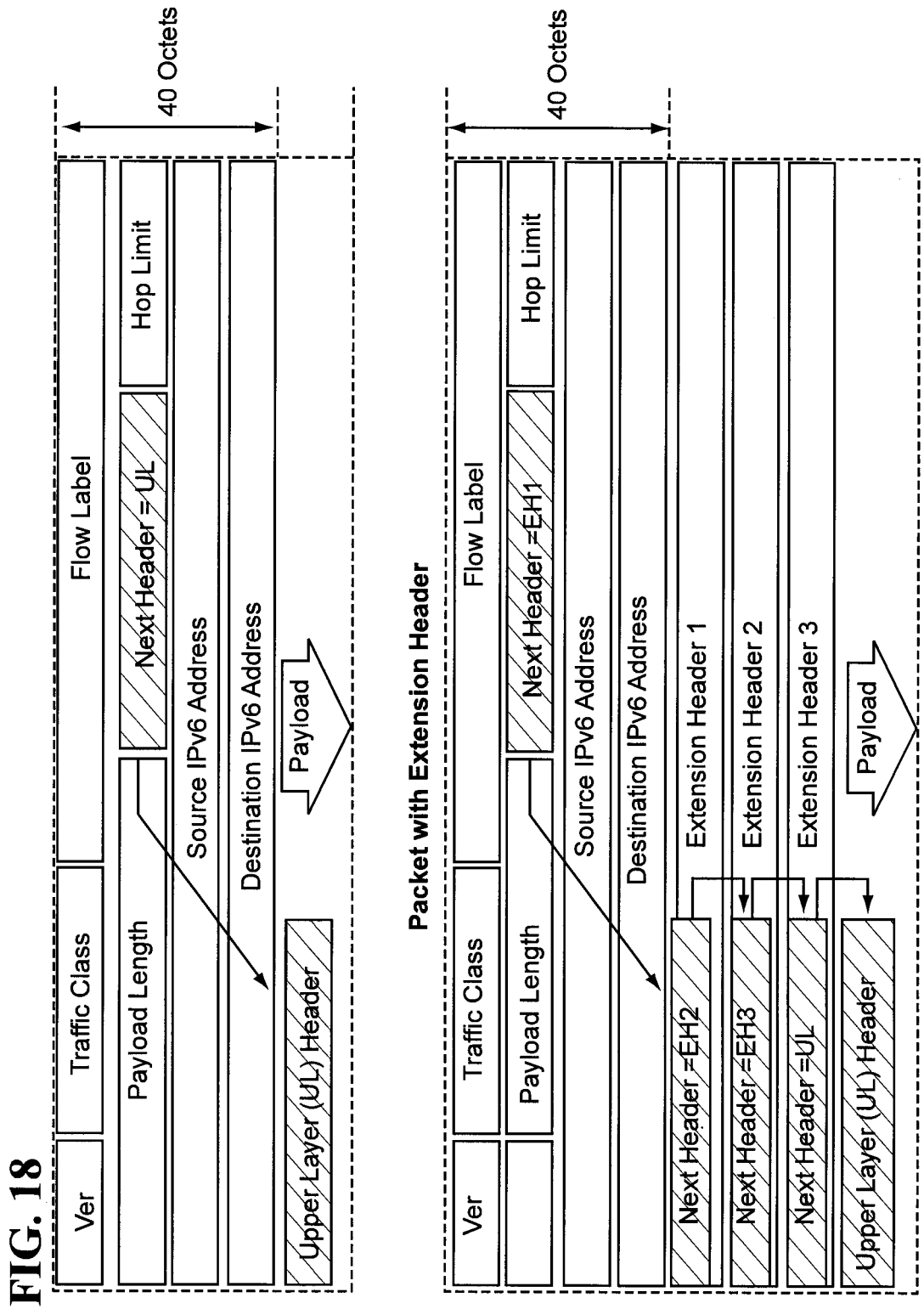
FIG. 18 depicts a logical representation of an IPv6 packet header for use with the disclosed embodiments.

FIG. 18 shows a logical representation of an IPv6 packet header with multiple headers and extension headers. In this method of customer identification, it may be the embedded (bottom) routing header that is required to be processed in order to find customer identity.

With respect to 802.1q VLAN Tag Customer Traffic Identification, some networks utilize VLAN tags within the Ethernet header to separate customer for private LAN service or for identification of the customer traffic at layer 2. Based upon deployment location, this may be seen as a one or two labels (Q in Q).

Figure 19:
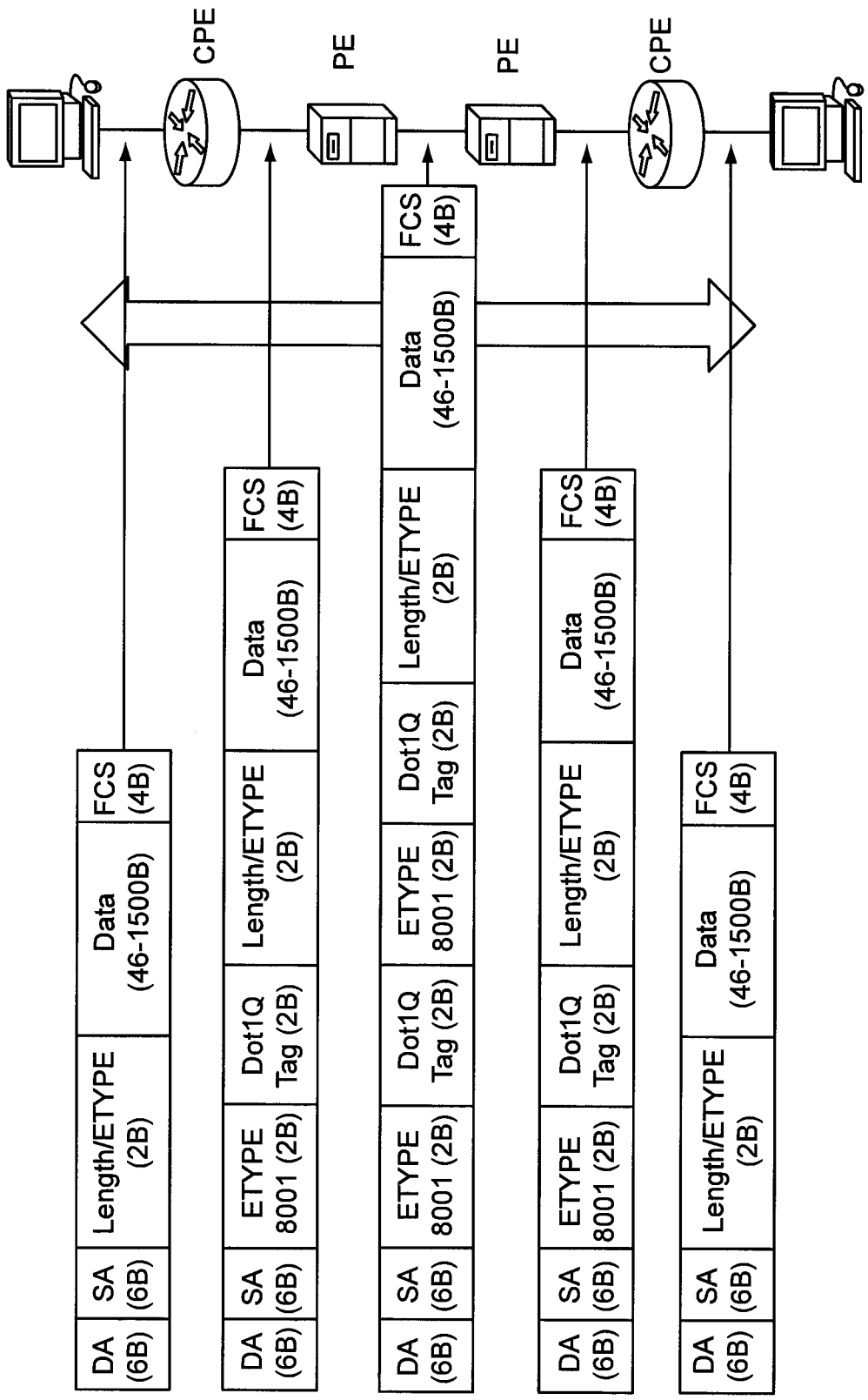
FIG. 19 depicts how the labels can be added to and removed from packets by routers as they flow through a network.

FIG. 19 shows how the labels can be added and removed as they flow through the network by the routers. The 802.1q VLAN Tag Customer Identification works by inspecting the case where a single VLAN Tag (present when EtherType=0x8001) is present. There can be 4096 unique values (12 bits within the 2 bytes following the EtherType) of which 0 is generally no tag used for 802.1p prioritization only yielding at most 4095 customers.

802.1q in q Embedded Tag Customer Traffic Identification is similar to the previous section, however, two tags are present and the inner tag is utilized rather than the outer/first tag.

With respect to 802.1q in q Combined Tags Customer Traffic Identification, when two tags are present, this is referred to as 802.1q in q (Q-in-Q). As the two tags together offer over 16 million possible combinations, this is often utilized to identify a unique customer as it moves into the metro from the access circuits. This mechanism involves reading the 2 tags (24 bits in total) and leveraging them for determining the customer and the appropriate services to apply. The form is shown in the diagram in the previous section.

MPLS Label Stack Entry Customer Traffic Identification leverages the MPLS label stack as the targeting and identification means of the customer. The entries within the label stack identify the customer for whom processing should be applied. One or more headers are present in order to enable the MPLS Label Switch Routers (LSR) to determine the next hop in a simple review of the labels.

From inspecting the labels, a destination can be identified that may be a useful method for some business customers to be identified for services. Other techniques may simply be focused on a method such as IPv4 identification but must work around the presence of MPLS based Psuedo-wires properly removing and re-applying.

PPPoE Customer Traffic Identification refers to the framing on the Ethernet to be PPP as a point to point transfer pathway while IP headers and content ride above this layer. This is generally found closer to the access point, however, this may be present in the traffic being analyzed for customer identification. Generally, PPP will not be utilized as a mechanism for detection, however, the protocol must be addressed as a carrier for other methods described above. Cisco and Juniper often refer to PPPoE as PPPoEoE (extra of is over Ethernet again) in order to separate this from PPPoEoA which is DSLAM northbound ATM transport of these types of packets.

The suggested software configuration of the server blades is a fairly typical virtual machine based server, in this case based upon VMWare ESX Server. The VMWare ESX Server software is loaded onto each of the server blades containing a different customer, or group of customer applications within each virtual machine. In this case a single customer might be represented by a large enterprise with a Platinum Service Offering while a group of customers might represent small businesses that purchased a Bronze Service Offering for Malicious Packet Scrubbing. In either case, the representative software application is loaded as a typical virtual machine instance on the server. It may be important, in the configuration of the VMWare ESX Server, to ensure that there is a unique MAC address associated with each Virtual Machine instance that is separate from the physical blade hardware address. This would allow the network processing blades to direct traffic using Ethernet Address (MAC ID) to the physical server blade and should the virtual machine need to be re-hosted on another blade for performance or availability reasons, traffic redirection can seamlessly migrate as it would be seen as a simple layer 2 switching re-route. As more complex services farms are developed, there may be needs to support more fine-grained traffic segmentation and virtual machines may be configured using VLAN Tag support, 802.1q in the Ethernet Header, to do further segmentation. In other embodiments, tag support in the switch fabrics may used for traffic segmentation instead of using a Layer 2 Ethernet MAC delivery model for the blades.

Figure 20:
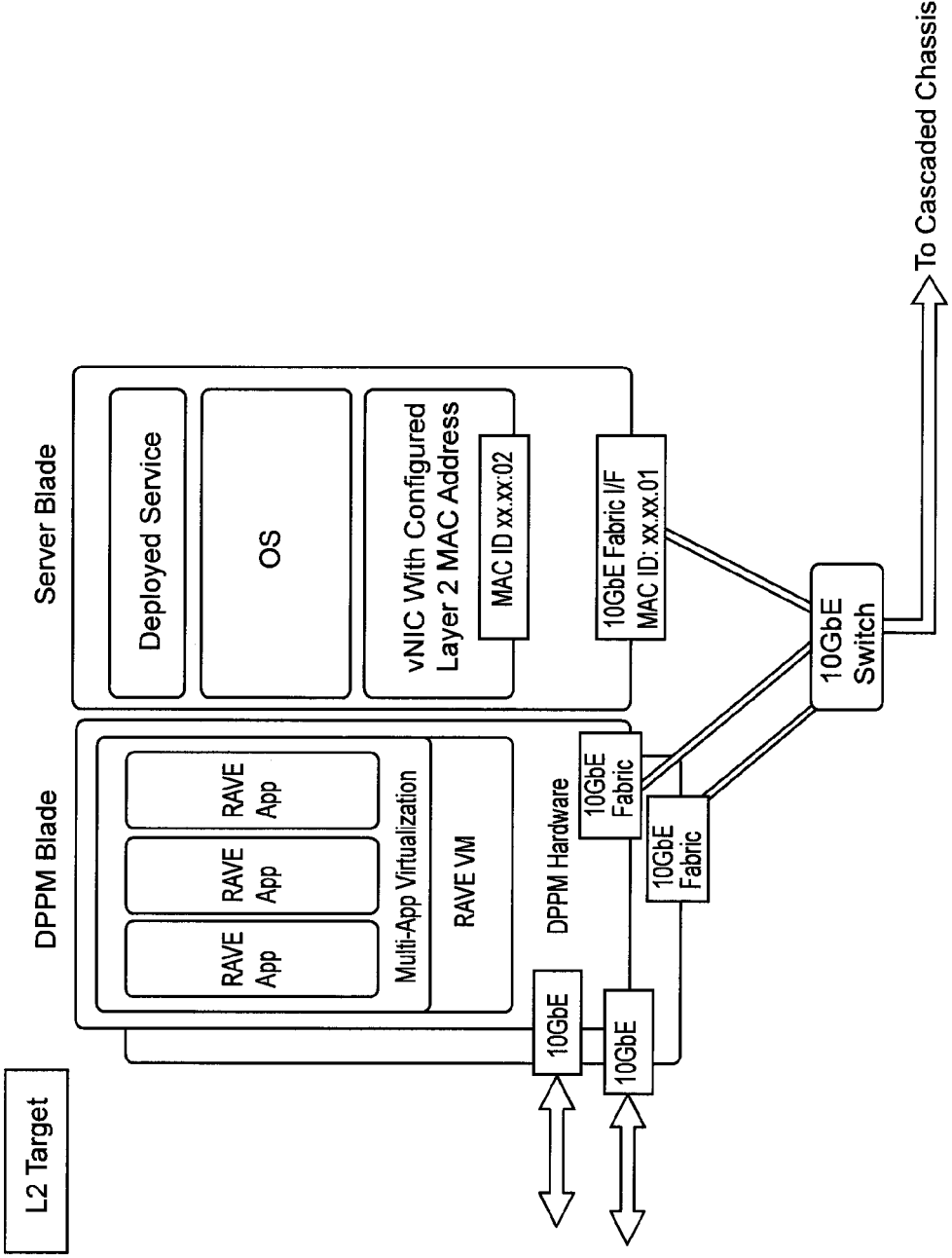
FIG. 20 depicts a dual packet analyzer/adapter configuration according to one embodiment.
Figure 21:
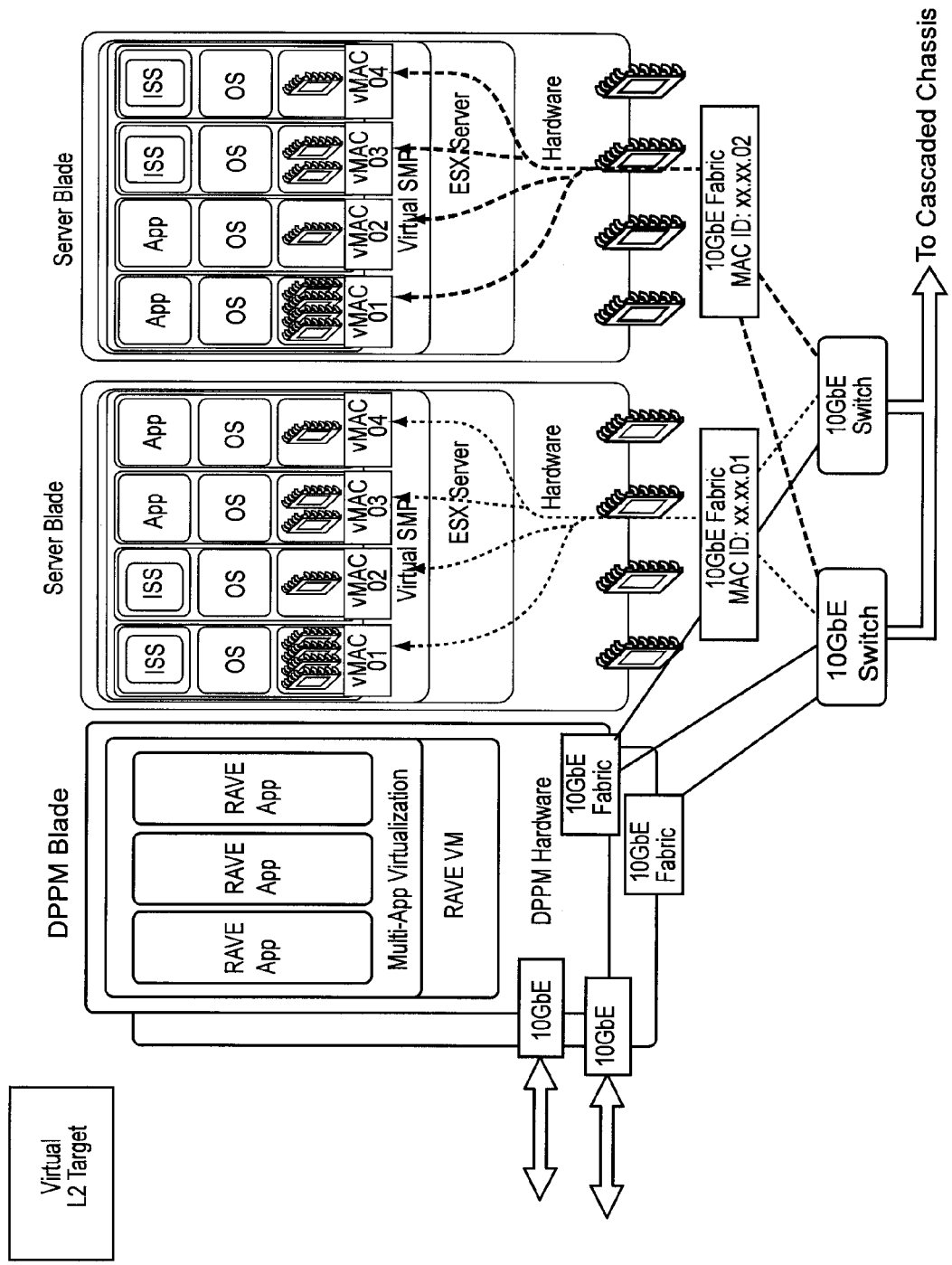
FIG. 21 depicts another alternate implementation of a dual packet analyzer/adapter configuration according to one embodiment.

FIGS. 20 and 21 show the dual-DPPM configuration at left providing an ingress and egress 10 Gbps path as would be deployed in an inline service using one or more server blades executing one or more services. Some situations may not require multiple external links for providing an inline model but rather a single target acting as an MPLS switch path location or a routed-to destination and redundancy may be for processing or network interface redundancy issues.

As traffic arrives on the 10 Gigabit Ethernet interface on a CloudShield DPPM it will be inspected to determine whether the traffic is to be processed within the current chassis or passed along. For traffic destined to this chassis, Deep Packet Inspection technology will be utilized to classify flows and associate with a given customer. If this is a new conversation, this information will be recorded in a Silicon Database for future reference. The database will be referenced to determine the appropriate virtual machine to navigate the traffic to. At this point Ethernet MAC addresses will be modified to navigate traffic appropriately within the chassis and the Ethernet header will be converted to an 802.1q header to include a VLAN tag which will be specified by the DPPM Blade. Traffic will be sent out of the DPPM onto the switch fabric where the destination MAC address will be utilized to direct the packet to the appropriate server blade. VMWare ESX will receive the packet and inspect the VLAN Tag to send it to the appropriate virtual machine. Upon completion of processing returned traffic will have a VLAN Tag applied by the ESX Server and transmission to either the original source MAC address or a prescribed destination will cause the packet to be directed to the appropriate DPPM for egress of the chassis.

Figure 22:
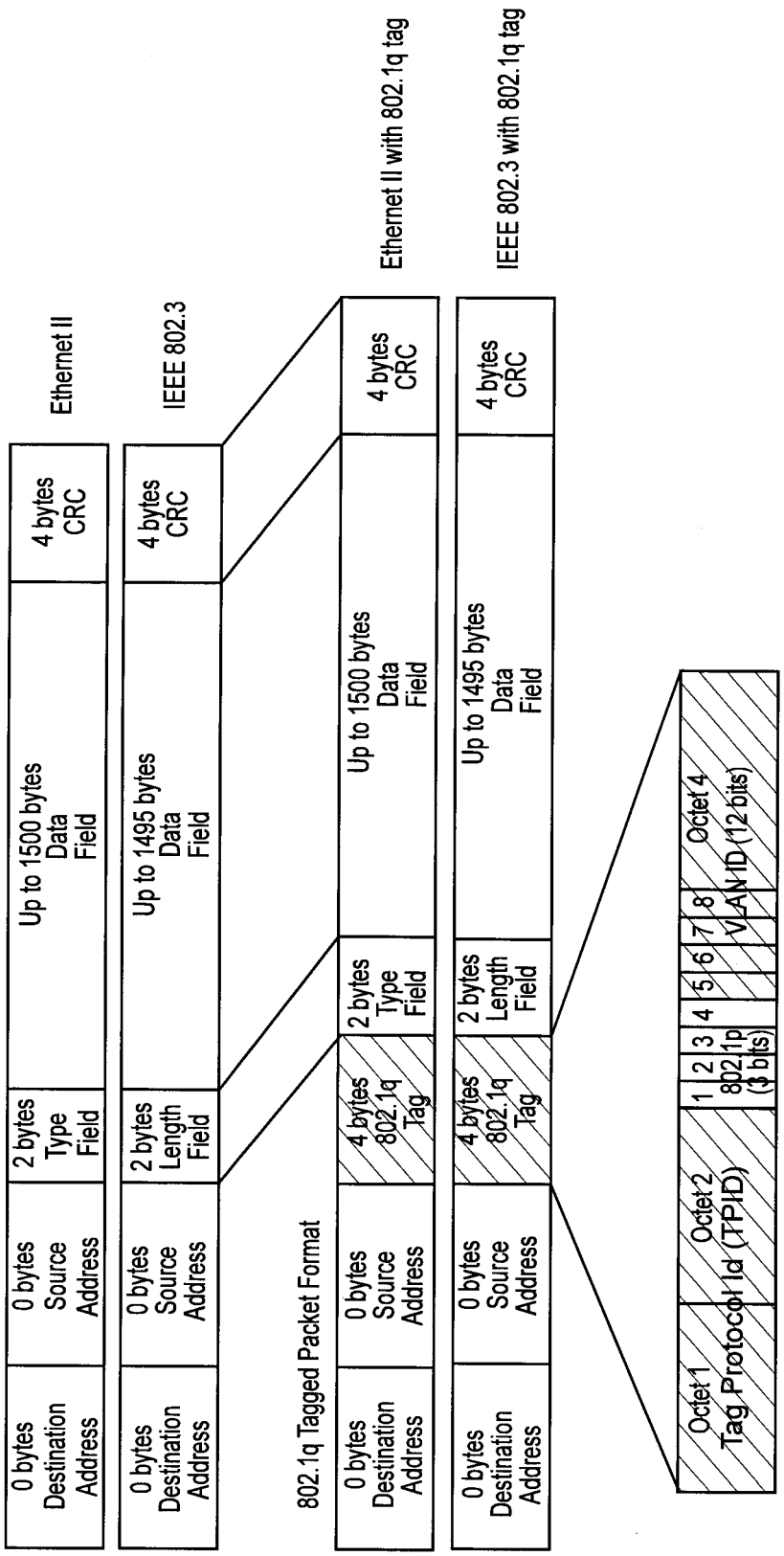
FIG. 22 depicts an exemplary untagged Ethernet frame.

FIG. 22 shows a normal untagged Ethernet frame as it would be received by the chassis and its difference with regards to the packet that would be sent within the chassis containing a VLAN tag. Note that the Up to 1500 bytes Data Field represents the TCP/IP datagram delivered over Ethernet. It is through the modification of the first 16 bytes of the packet (Destination MAC ID, Source MAC ID and VLAN Tag) that internal chassis navigation to specific blades and virtual machines are accomplished.

In alternative embodiments, there are cases where load balancing of multiple server blades associated with a single customer application is required. In these cases, the network element could monitor load, health and appropriate distribute traffic in a manner that works for the application such as flow based or protocol based load balancing.

In the above examples, MAC and VLAN tags are leveraged as the mechanism for identifying virtual machines. In some scenarios it may be preferred to have a unique MAC ID per virtual server. There is no reason why destination MAC re-writing cannot be leveraged as the sole mechanism for the mapping should that be preferred or the only mechanism for delivery. Of importance in this scenario is ensuring that the switches cannot be overwhelmed and can learn all MAC IDs for the chassis.

Given that it may take many more server blades than can even fit within a chassis to attain 10 Gbps of Services Processing, in an alternative embodiment, the chassis may be cascaded at the switch fabric level instead of on the front side DPPM based connections. Since layer 2 switching is maintained across multiple chassis' in this configuration, a DPPM can look at traffic and change the MAC ID and VLAN Tags to associate with a virtual machine and by delivering that packet to the switch fabric locally, layer 2 switching will deliver and return the packets appropriate across a cascaded collection of chassis'. It is envisioned that with multiple chassis' switches will be managed in pairs for redundancy but otherwise kept separated to manage traffic and security within the switch.

In implementations where more than one service is sold to a given customer, the DPPM may be responsible for moving traffic from one VM to another until all services have been applied to a given packet. In addition, logic can be applied such that traffic leaving an application in a specific way may dictate which or if any other applications should process the traffic.

For some applications, especially as DoD or Wireless Carrier Markets are addressed, issues such as IPv6 or MPLS come up. The DPPM technology can adapt these packets in a variety of ways such as removing MPLS labels during transmission to the Virtual Machine and re-assigning upon egress or adapting IPv6 addressed packets into private IP based IPv4 ranges for processing by tools within the chassis in an IPv4 space while keeping packets IPv6 as the come in and out of the chassis.

In most cases, traffic sent to a server blade will be expected to be returned to the same DPI blade for finishing up traffic processing. In some cases, however, the traffic may be desired to egress another blade. If traffic flow is set up such that packets are forwarded to a server and then the packet is returned to the requesting source, the DPPM can choose to insert the source MAC address of the desired egress blade before forwarding to virtual machine. Switches will need to be configured with static MAC entries so as to not misinterpret the spoofed source as being the destination to send future packets to the MAC ID, however, in high traffic rate scenarios this can dramatically provide benefits to switch fabric traffic engineering.

Service Providers often would like to provide an enterprise class product embodied in a virtual machine as a multi-user service offering such as a Bronze Firewall Service for small businesses. Unfortunately, most enterprise class products do not have the notion of separately provisioned policy sets per customer nor a notion of reporting to multiple management systems. This is a case where Deep Packet Control can really come into play.

For example, an enterprise firewall may implement a single provisioned rule set and report alerts and logs to a central station via methods such as syslog or SNMP. In a virtual machine scenario as described in this white paper, not only can Layer 2 Ethernet be re-written to appropriately address a given blade server and virtual machine but so too can layer 3 IP information. Within the Blade Center each customer could be given an RFC 1918 private address such as 10.0.0.1 for customer 1, 10.0.0.2 for customer 2 and so on. As traffic comes in from a given customer, the layer 3 information is stored in the DPI devices and re-written to a prescribed private addressed before being forwarded to the firewall. Each customer's policies are adapted to a refined set of address that constrain them to the specific private IP block versus any style rules. As the traffic egresses the firewall, the original addresses are replaced in the packets and sent along their way. In this fashion the rule sets of 1000's of customers can be intelligently merged into a single rule set.

As alerts come out of the system, the contents of the SNMP Trap or Syslog can be inspected to identify the customer (by the private IP), the IP Address content can be replaced in the alert and the packet can be directed to the customer's alert manager as opposed to the singularly configured one in the enterprise firewall. The net result is each customer receives their alerts on their management console (which may be yet another virtual machine) reflecting their traffic only.

Figure 23:
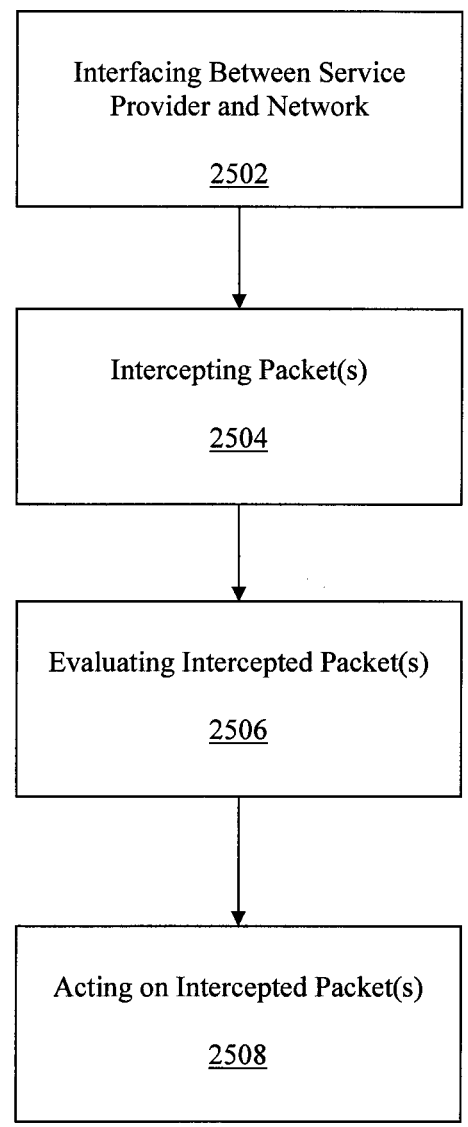
FIG. 23 depicts a flow chart showing exemplary operation of one embodiment.

Referring to FIG. 23, as described, the disclosed embodiments may implement a method of transparently provisioning one or more services to a network, such as a firewall service, content control service, malicious content detection service, anti-denial-of-service service, intrusion detection and/or prevention service, interne protocol (IPv4 to IPv6) gateway service, lawful intercept service, URL filtering service, or combinations thereof, etc., the network carrying a plurality of packets each being transmitted by an associated source, .e.g. an end user or client device or router, proxy server, web server, etc., to at least one associated intended destination intended by the source, e.g. the destination(s) to which the packet(s) are specifically addressed, routed or otherwise directed by the source. Each of the plurality of packets includes routing data, such as Layer 2 or Layer 3 data, which is operative to cause the forwarding of the packet via the network towards the at least one intended destination, e.g. data which is used by the various routers and switches on the network to forward the packet along a route which should convey the packet to its ultimate destination. This data includes inter-network data, such as Layer 2 data or other data, such as a MAC address, which may be used to route the packet among devices within a network, as well as intra-network data, such as Layer 3 data or other data, such as an IP address, which may be used to route the packet among devices which are connected to different networks. The source and destination may include any combination of inter and intra network devices. Accordingly, for example, the source and destination may include inter-network entities, e.g. within a particular network hop, such as client devices and firewalls and/or proxy servers, or ingress and egress routers of a network, the ingress router receiving external communications and forwarding them, based on the layer 2 or 3 data, to the egress router. Alternatively, the source and destination may include intra-network entities, such as a client web browser and web server communicating using Layer 3 data. The service(s) may be provided by one or more application service providers via one or more applications. The service(s) may be provisioned such that the application service provider(s), at least one of the associated source, at least one associated intended destination, or a combination thereof, are unaware of the provisioning of the service(s) as described below. The service(s) may be provisioned, such as remotely and/or in real time, as managed services, also referred to as managed subscriber services, routing and/or load balancing traffic to one or more applications providing one or more applications.

The method includes interfacing between one or more applications, such as a first application and a second application, and an interface to the network (block 2502), such as by providing a hardware and/or software interface to which one or more application service providers may couple an application and/or device for implementing a service with respect to the packets being transmitted over the network. In one embodiment, the interfacing is implemented such that the application(s)/device(s) is unaware that it is not directly connected with the network, such as by not requiring that Layer 2 or Layer 3 protocols be modified to accommodate the application(s)/device(s). In addition, the method includes intercepting one or more of the plurality of packets prior to a forwarding thereof, such as by a router or switch, toward the at least one associated intended destination (block 2504). The interception may take place after the packet has been processed, and forwarded, by an ingress router to a carrier facility, but prior to the receipt and forwarding of that packet by an egress router out of the carrier facility. The method further includes evaluating the intercepted packet(s) based on a one or more specifications of one or more subsets of the plurality of packets with respect to which the application(s) is to perform the service(s) (block 2506), such as a first specification of a first subset of the plurality of packets with respect to which a first application is to perform a first service and a second specification of a second subset of the plurality of packets with respect to which a second application is perform a second service. At least the first specification may specify the first subset of the plurality of packets based on criteria other than only the routing data contained in the intercepted packet, e.g. other than only the Layer 2 or Layer 3 data. For example, the application service provider(s) may define criteria for which packets are and/or are not to be intercepted, such as criteria based on the packet payload, or portion thereof, alone or in combination with the Layer 2 and/or Layer 3 data. It will be appreciated that the criteria may be defined as inclusive or exclusive criteria, i.e. specifying which packets are to be acted on or, alternatively, which are to be excluded. Further, the method includes acting on the intercepted packet, based on the evaluating, to facilitate the performance of at least one of the service(s), alone or in combination, with respect to the intercepted packet if the intercepted packet is included in at least one of the specified subset(s), or combinations thereof (block 2508). As noted above, the disclosed embodiments may act on behalf of an application service provider, performing functions specified thereby, and/or the intercepted packets may simply be passed to the device and/or application of the application service provider to be processed according to the service provided thereby. Accordingly, the acting may include at least one of providing at least a copy of at least a portion of the intercepted packet to the application(s), deleting the intercepted packet, substituting a modified intercepted packet for the intercepted packet, substituting a new packet for the intercepted packet, allowing the intercepted packet to continue to the at least one associated intended destination, or other singular or compound actions or combinations thereof. In particular, the acting may include providing the intercepted packet, or a copy thereof, to a first application/device if the intercepted packet is one of a specified first subset to facilitate the performance of a first service with respect to the intercepted packet and generate a result based thereon and to a second application/device if the intercepted packet is one of a specified second subset to facilitate the performance of a second service with respect to the intercepted packet and generate a result based thereon. Further, the method may include receiving the result of the performance of the service(s) on the intercepted packet from the application(s) wherein the result may comprise at least one of an instruction to delete the intercepted packet, an instruction to modify the intercepted packet, an instruction to substitute a modified intercepted packet for the intercepted packet, an instruction to substitute a new packet for the intercepted packet, an instruction to allow the intercepted packet to continue to the at least one associated intended destination, an instruction to respond to the source, or combinations thereof and further wherein the acting further comprises executing the instruction.

As described, in one embodiment, more than one application service provider may be interested in providing more than one service to the network. In one embodiment, the specified subsets of the plurality of packets may be different, e.g. each service provider may be providing a different service with respect to different packets flowing over the network. In another embodiment, the specified subsets may overlap, partially or entirely. For example, the service providers could be interested in the same packets, such as for providing the same service competitively or at different price points, for example. In such a situation, the acting may further comprise providing the intercepted packet only to a first application service provider when the intercepted packet is one of a first subset specified by the first application service provider and one of a second subset specified by a second application service provider. Alternatively, other methods of resolving packet contention may be implemented, such as round robin, or providing each with a copy of the packet(s). In one embodiment, the same application service provider may provide more than one service and those multiple services may the be the same or a different service. For example, an application service provider and/or operator of the disclosed embodiments may wish to provide the same service but split/balance the processing load. Thereby, non-overlapping subsets of the plurality of packets to which each instantiation of the service will be applied may be specified by the application service provider and/or by an operator of the disclosed embodiments. In one embodiment bi-directionally related packets may be routed to the same service of the multiple services.

To reduce implementation barriers, the interfacing may further comprise interfacing between the application(s) and the network without modifying layer 2 or layer 3 protocols of the application(s), the interface to the network, such as a router or switch, or combination thereof. This would avoid having to reconfigure the application(s) or network interface, such as routers or switches, to handle interconnection of the application(s) with the network. In one embodiment, the interfacing may further comprise translating between the protocols used by the network and the protocols used by application(s), e.g. between a service provider network form ("SPNF") and an internal application server form ("IASF"). Intercepted packets would be appropriately modified prior to being provided to the application(s) and any packets provided by the application(s) for release to the network would be appropriately modified prior to such release.

The disclosed embodiments may be implemented as a system for transparently provisioning one or more services provided by one or more application service providers to a network via one or more applications, the network carrying a plurality of packets each being transmitted by an associated source to at least one associated intended destination intended by the source. Each of the plurality of packets may comprise routing data operative to cause the forwarding of the packet via the network towards the at least one intended destination, as was described above. The system may include a packet processor coupled between the application(s) and the network, the packet processor being further operative to intercept at least one of the plurality of packets prior to a forwarding thereof toward the at least one associated intended destination, evaluate the at least one intercepted packet based on one or more specifications of one or more subsets of the plurality of packets with respect to which the application(s) is to perform the service(s), and act on the intercepted packet to facilitate the performance of the service(s), individually or in combination, with respect to the intercepted packet if the intercepted packet is included in one of the associated specified subset(s), wherein at least one of the specifications specifies a subset based on criteria other than only the routing data contained in the intercepted packet. For example, the packet processor may be operative to intercept at least one of the plurality of packets prior to the forwarding thereof toward the at least one associated destination, evaluate the at least one intercepted packet based on a first specification of a first subset of the plurality of packets with respect to which a first application is to perform a first service and a second specification of a second subset of the plurality of packets with respect to which a second application is to perform a second service. Exemplary services include a firewall service, content control service, malicious content detection service, anti-denial-of-service service, intrusion detection and/or prevention service, interne protocol (IPv4 to IPv6) gateway service, lawful intercept service, URL filtering service, or combinations thereof. Further, the services may be provided such that at least one of the associated source, at least one associated intended destination, or a combination thereof, are unaware of the operations of the interface. The service(s) may be provisioned, such as remotely and/or in real time, as managed services, also referred to as managed subscriber services, routing and/or load balancing traffic to one or more applications providing one or more applications.

The act performed by the packet processor may include at least one of provide at least a copy of the intercepted packet to the application(s), delete the intercepted packet, modify the intercepted packet, substitute a modified intercepted packet for the intercepted packet, substitute a new packet for the intercepted packet, allow the intercepted packet to continue to the at least one associated intended destination, respond to the associated source, or other singular or compound actions or combinations thereof. In particular, the interface may be further operative to provide the at least one intercepted packet to a first application if the intercepted packet is one of a specified first subset to facilitate the performance of a first service with respect to the intercepted packet and generate a result based thereon or to a second application if the intercepted packet is one of a specified second subset to facilitate the performance of a second service with respect to the intercepted packet and generate a result based thereon. The interface may then be further operative to receive the result of the performance of the service(s) on the intercepted packet from the application(s) and, wherein the result comprises at least one of an instruction to delete the intercepted packet, an instruction to modify the intercepted packet, an instruction to substitute a modified intercepted packet for the intercepted packet, an instruction to substitute a new packet for the intercepted packet, an instruction to allow the intercepted packet to continue to the at least one associated intended destination, an instruction to respond to the source, or combinations thereof, the packet processor is further operative to execute the instruction.

As described, in one embodiment, more than one application service provider may be interested in providing services to the network and/or an application service provider may be interested in providing more than one service. In one embodiment, the specified subsets of the plurality of packets may be different. Alternatively, the specified subsets may overlap or be the same. As such, the interface may be further operative to provide the intercepted packet only to a first application when the intercepted packet is one of a first subset and one of a second subset. Alternatively, other methods of resolving packet contention may be implemented, such as round robin, or providing each with a copy of the packet(s).

To reduce implementation barriers, the interface may be capable of coupling between the application(s) and the network without modifying layer 2 or layer 3 protocols of the application(s) and/or interface to the network. This would avoid having to reconfigure the application(s) and/or network interfaces to handle the interconnection of the application(s) with the network.

The system for transparently provisioning one or more services, such as first and second services, the services being provided by one or more, e.g. first and second, application service providers to a network via one or more, e.g. first and second, applications, the network carrying a plurality of packets each being transmitted by a source to at least one intended destination intended by the source, may be implemented by one or more processors, one or more memories coupled with the processor(s), a network interface operative to couple the processor with the network, and an application interface operative to couple the processor with the application(s). Each of the plurality of packets may comprises routing data operative to cause the forwarding of the packet via the network towards the at least one intended destination, as was described above. The system may further comprise first logic stored in the memory(s) and executable by the processor(s) cause the processor(s) to intercept at least one of the plurality of packets prior to a forwarding thereof toward the at least one intended destination, second logic, coupled with the first logic, stored in the memory(s) and executable by the processor(s) to cause the processor(s) to evaluate the at least one intercepted packet based on one or more, e.g. first and second, specifications of one or more, e.g. first and second, subsets of the plurality of packets with respect to which the application(s) is to perform the service(s), wherein at least the first specification specifies the first subset based on criteria other than only the routing data contained in the intercepted packet, and third logic, coupled with the second logic, stored in the memory(s) and executable by the processor(s) to cause the processor(s) to act on the intercepted packet to facilitate the performance of at least one of the service(s), individually or in combination, with respect to the intercepted packet if the intercepted packet is included in at least one of the associated specified subset(s), individually or in combination.

It will be appreciated that the application(s) may be implemented in software executing on the packet processor or implemented in a separate device connected thereto.

As was described above, the disclosed embodiments may further comprise interfacing between the application(s) and the network without modifying layer 2 or layer 3 protocols of the application(s), the interface to the network, such as a router or switch, or combination thereof. This would avoid having to reconfigure the application(s) or network interface, such as routers or switches, to handle interconnection of the application(s) with the network. In one embodiment, the interfacing may further comprise translating between the protocols used by the network and the protocols used by application(s), e.g. between a service provider network form ("SPNF") and an internal application server form ("IASF"). Intercepted packets would be appropriately modified prior to being provided to the application(s) and any packets provided by the application(s) for release to the network would be appropriately modified prior to such release. Effectively, the network infrastructure would be transparent to the application.

Accordingly, the disclosed embodiments may implement a Flow Based Routing/Content Based Routing (FBR/CBR) Service Manager enabling definition of new services and the provisioning of customers that subscribe to them and would enable the use of Commercial off-the-shelf (COTS) applications, such as those which are capable of running in the IBM BladeCenter H/HT chassis systems, so as to facilitate offering of Enhanced Services in Service Providers networks. This would enable Service Providers to increase their revenue streams by offering new and enhanced security services, content delivery services, video and audio streaming services, IPTV and Internet services.

In one embodiment, the Blade Center Service Manager, such as Release 1.0, may be designed to optimize the use of the Deep Packet Inspection (DPI) technology, e.g. as implemented in a DPPM blade, described in detail above, with the IBM BladeCenter H/HT chassis to form the basis for a carrier class Service Delivery Platform. It may provide the means to use high speed DPI Blade technology to surgically identify, divert, and transform transport encapsulated customer specific flows and, intelligently, forward targeted flow streams to Blade Servers running COTS Enterprise Applications. The Service Manager Release 1.0 system provides the following high level functions:

System Main Services:
Facilitates offering Enhanced Services on top of service provider's transport services, deployed anywhere in the network.
Use of proven enterprise COTS applications, instead of developing custom made ones, as an Enhanced Service offering.
Enables the definition of an Enhanced Service by grouping one or more COTS Applications, referred to as Enhanced Services Components.
Uses VMware ESX servers to enable a single Blade Server Host to contain one or more VMs with COTS applications that makes up an Enhanced Service offering.
Enhanced Services Manager:
Enables definition of Enhanced Services as one or more applications running on blade servers.
Enables definition of content selection rules with transport encapsulation and flow steering rules to perform the FBR/CBR functions.
Supports HA functions with DPPM Blades running in an Active/Standby configuration.
Data Collection and Reporting
Collects performances data from up to 60 DPPM/DPI Blades.
Stores per subscriber and per enhanced service performance data.
Enables stored data access via SQL queries.
Services Manager is a software solution which manages CloudShield DPPM/DPI Blades Flow Control Switching which can also interface with other functional components deployed within an IBM BladeCenter enabling Service Providers to deploy new revenue bearing services, using COTS applications, for subscribers within the network.

The architecture may include a CloudShield (CS) DPPM/DPI Blade facilitating DPI and Flow Control Switch based re-routing of traffic through server blades running Enhanced Services Components applications such as CheckPoint Firewall, IPS Proventia and others, to carry out per user enhanced services policies. The DPPM/DPI Blade facilitates data plane packet transformation, and traffic adaptation required to properly leverage enterprise applications on server blades without any modification. The Services Manager application provides the necessary control plane logic that understands the relationships of customers to desired services, network addressing and selection of customer's flows, required to provide and offer revenue generating Enhanced Services. Enhanced Services may be referred to as a functional solution that, when deployed, enables a service provider to offer services on top of their traditional transport services that they offer today. According to the disclosed embodiments, an Enhanced Service offering may use one or more COTS enterprise grade application without any modifications. When more than one COTS application is used to render an Enhanced Service offering, each COTS application may be referred to as an Enhanced Service Component of the Enhanced Service solution.

Complementary to the Services Manager application, in the data plane, a DPPM/DPI Blade FBR/CBR RAVE application, may operate in tandem with the BladeCenter switch fabric to identify customers and coordinate traffic flows to the appropriate blades within the chassis. Software applications operating on blade servers' Virtual Machines provide the value add content such as security applications, proxy enhanced services, content insertion and interfacing to content services providers and new ones not yet thought out. The objective is to use the FBR/CBR RAVE Application and the switch fabric to route all traffic to the appropriate server blades while the CloudShield blades may intelligently adapt packet flows to switch configuration and possibly provide augmentation services such as intermediary services during blade failover, billing data, content based routing, and packet header transformation.

The DPPM/DPI Blade FBR/CBR may analyze all traffic at wire speed, to categorize flows, for example, into one of three buckets, namely traffic not of interest, traffic that may be of interest and traffic known to require specific processing for delivery to enhanced services components. Traffic not of interest may be redirected (directly or indirectly switched) to its normal path. Traffic potentially of interest may be passed along for further layer 2 through 7 analysis within the DPPM/DPI Blade FBR/CBR RAVE application. Traffic known to be of interest may be processed by the FBR/CBR RAVE application and apply steering rules to render one or more Enhanced Service.

The DPPM/DPI Blade receives the packets from the Service Provider's network. As a result, customer flows can be identified by different means, depending on the transport services technology used, such as:
  IPv4 Address
  Ipv6 Address
  Ipv6 Embedded Routing Address
  802.1q in q Embedded Tags (near future)
  MPLS Label Stack Entry or Pseudo Wire
  MPLS over Ethernet with other possible encapsulations As will be described, in one embodiment, the packets may then be transformed to an internal application service form (IASF) by changing the payload encapsulation to an Ethernet frame, changing IP information and forwarding and steering the packet to the server blades using different source/destination MAC addresses and different IP addresses if required. At the end, the serviced (child) packet needs to be changed again to its original (parent) service provider network form (SPNF) with the same payload and network transport encapsulation and sent out into the network. Hence, as will be described, original packet header encapsulations need to be preserved while the packet payload is re-encapsulated with Ethernet frames several times.

Figure 5:
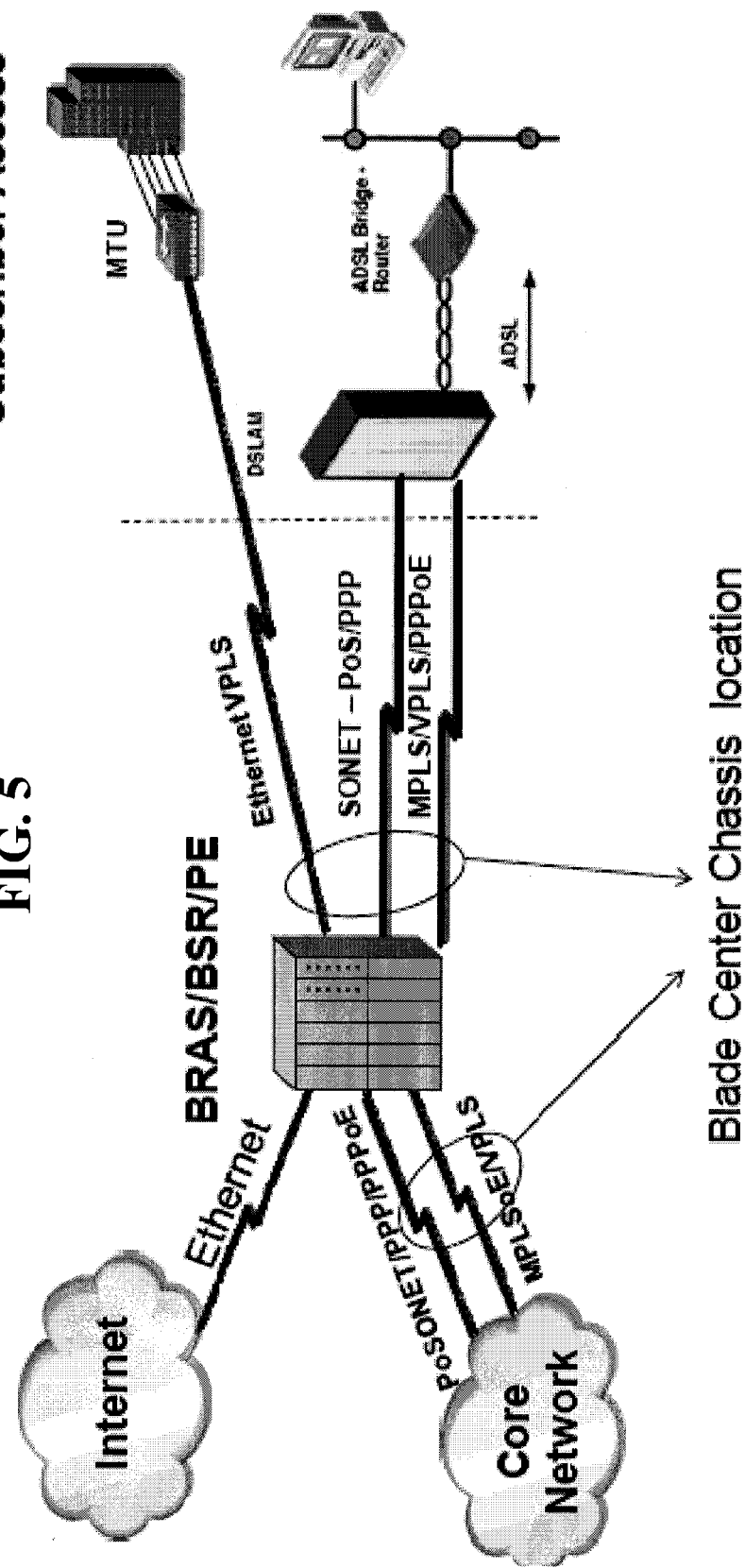
FIG. 5 depicts an exemplary deployment of services according to the disclosed embodiments, including exemplary transport encapsulations implicated thereby.

FIG. 5 depicts exemplary transport encapsulation technologies that the BladeCenter Content and Service Delivery Platform can encounter depending on the deployment scenario.

Figure 6:
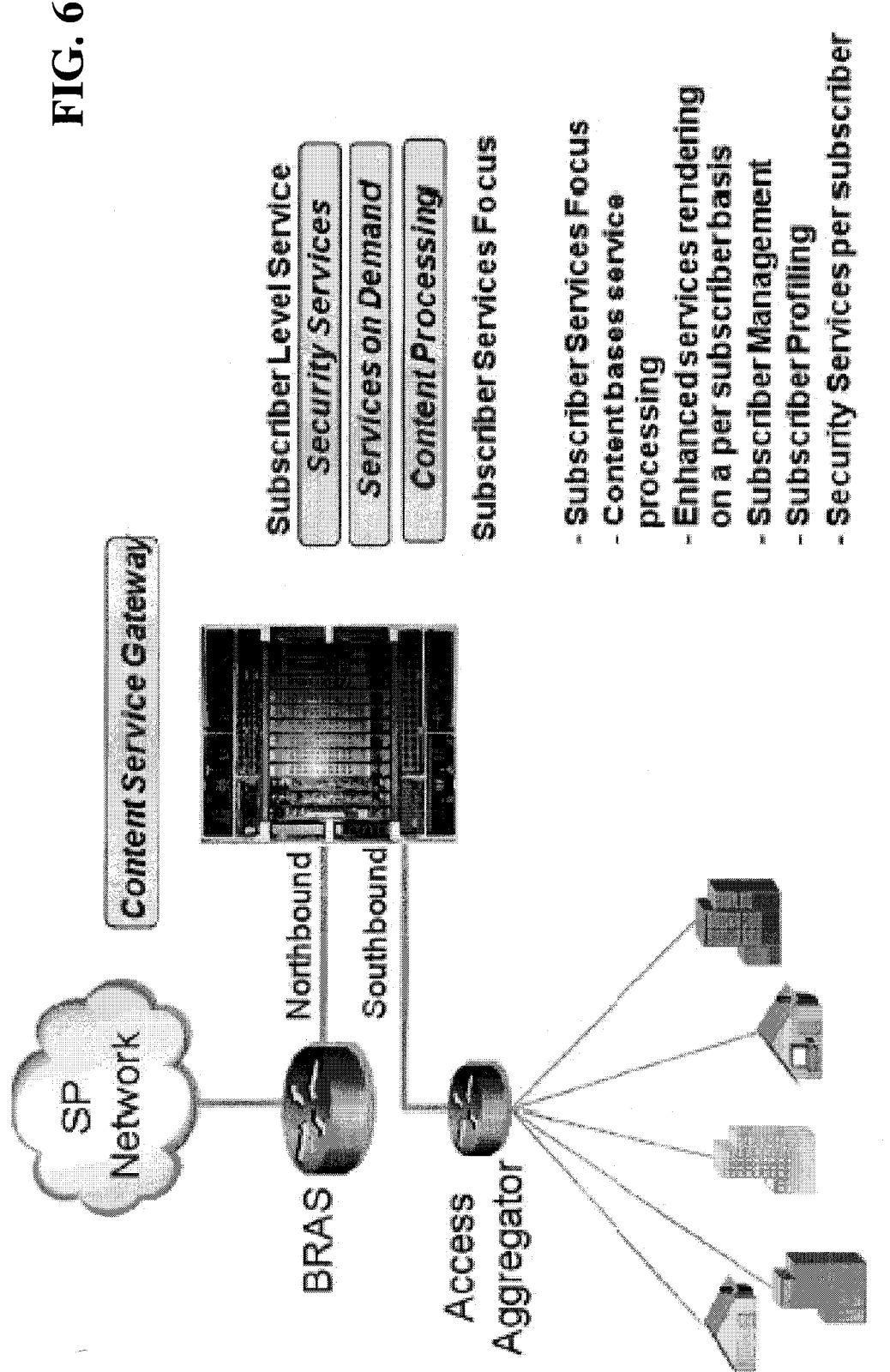
FIG. 6 depicts one exemplary deployment of a Blade Center implementation.

The location of the Blade Center Platform, in reference to the location of the subscribers within the service provider's network, may be very important. Normally a Broadband Remote Access Server (BRAS) or a Broadband Services Router (BSR) is used as an access concentrator in support of subscriber's transport access services into the Service Provider's network. As shown in FIG. 6, the location of the Blade Center platform may determine the type of network transport encapsulation to be processed.

If the Blade Center platform monitors links between the BRAS/BSR and subscribers, as shown in FIG. 6, the DPPM/DPI Blades will see packets with different network transport encapsulations such as MPLSoE, MPLSoPPPoE, VPLS, and VPLSoPPPoE. If VPLS is used it could be deployed with single customer C-VLAN, with one or more C-VLANs belonging to a single customer, in this case, for example, a maximum of 4000 VLANs are assigned to different customers. This may be used in small Metro Ethernet deployments as the solution is limited by the number of unique VLANs that can be assigned, hence, a maximum of 4000 customers can be serviced per link. To scale the solution, stacked VLANs, or Q-in-Q VPLS technology may be used. In this case, C-VLANs are encapsulated in one S-VLAN per customer. Hence, customer flows may be selected based on S/C-VLAN combinations.

Figure 24:
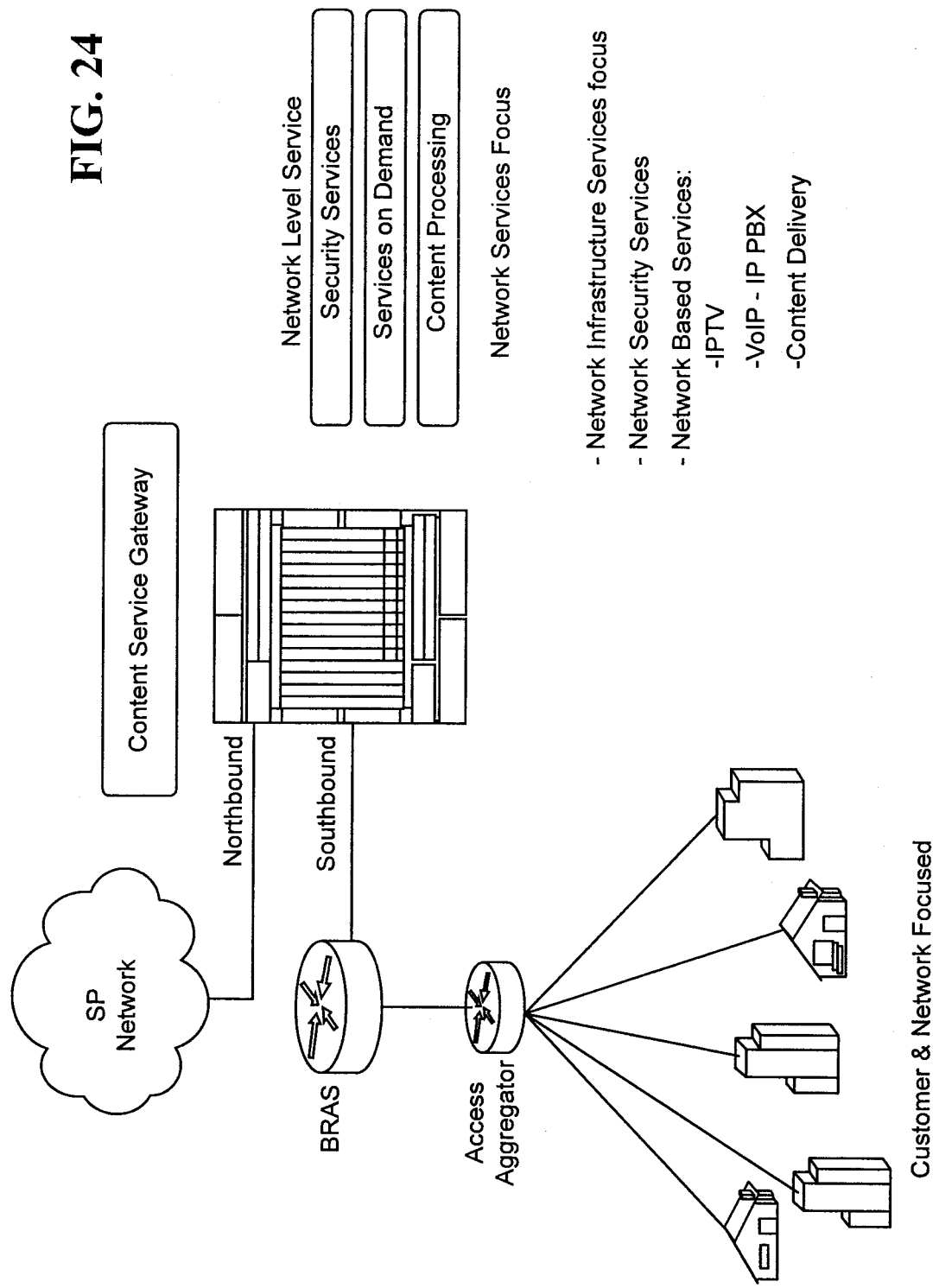
FIG. 24 depicts an alternate exemplary deployment of a Blade Center implementation.

If the platform is located between the BRAS/BSR and the core network, as shown in FIG. 24, it will most likely see pure Ethernet traffic with MPLSoPPPoE, MPLSoE, with different encapsulation technologies. Hence, customer flows may be identified differently.

Figure 25:
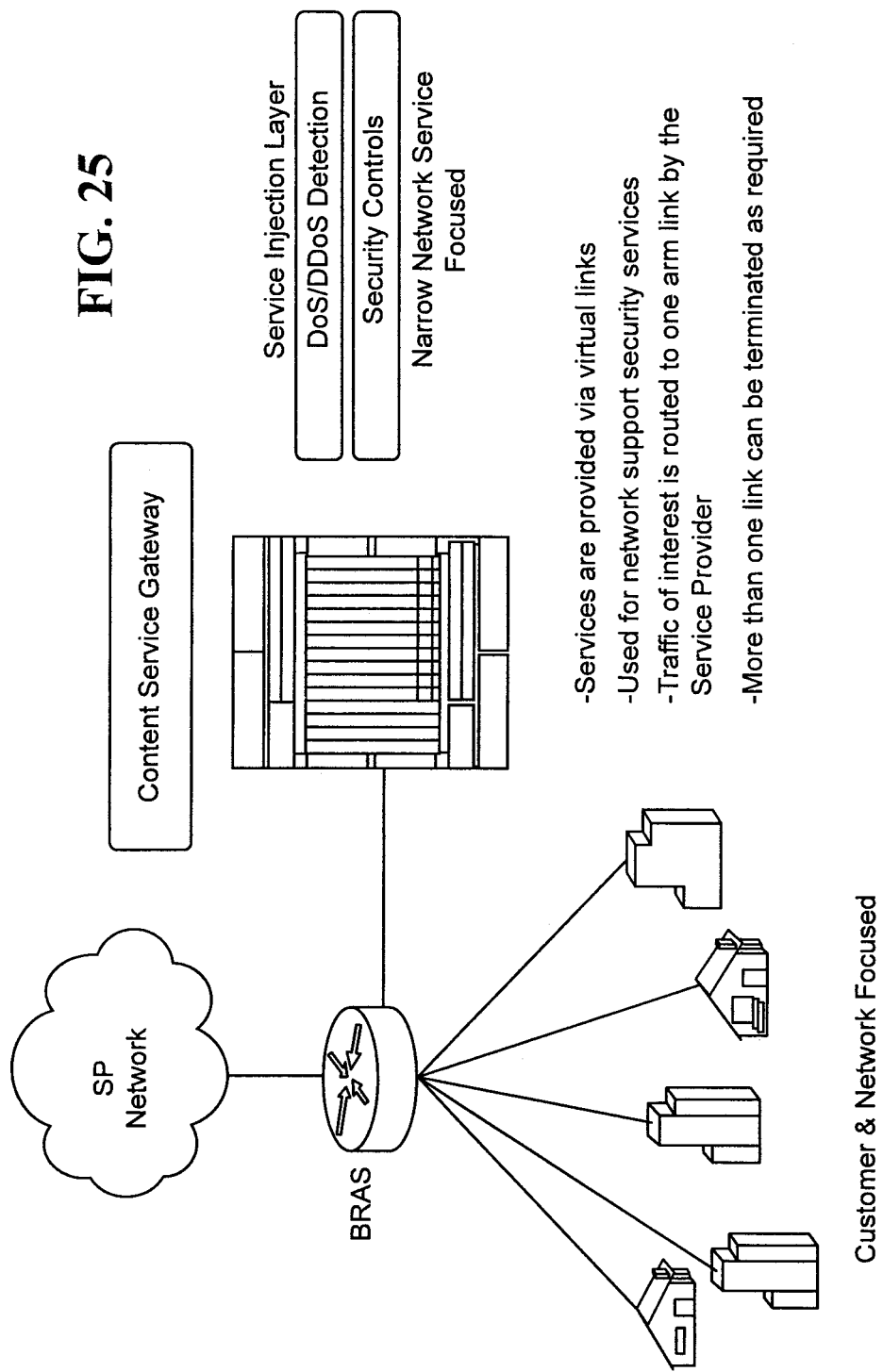
FIG. 25 depicts another alternate exemplary deployment of a Blade Center implementation.

A third deployment arrangement that monitors and controls flows in one arm active mode may also be used. The platform may be positioned sideways, receiving selected traffic from the BRAS/BSR as shown in FIG. 25. In this deployment case one or two virtual MPLS or VLAN links could be used to simulate a drop link, however, traffic is selectively routed to the platform by the BRAS/BSR. The significant part of this deployment case is that since only one link is provided, there is the need then to simulate a southbound (customer facing) port and a northbound (network facing) port. This is done by either having two dedicated VLANs out of the BRAS/BSR or using MPPLS pseudowires. Since MPLs pseudowires are unidirectional, two pseudowires may be needed to simulate a virtual MPLs bidirectional link. Hence, a virtual northbound port may be formed using one pseudowire for transmit and the other one for receive.

In all three cases one or more transport encapsulations may be present and subscriber's flows may need to be correlated to subscribers IDs in different ways. If the subscriber's flows are destined for Internet access services, then IP addresses need to be resolved to subscribers ID and services provisioned accordingly. If MPLS encapsulations are used, then a combination of MPLS tunnel and pseudowire is needed to correlate customer flows with customer ID and services provisioned. If VPLS with Q-in-Q is used, then a combination of S-VLAN and C-VLANs is needed to correlate customer flows with customer ID and services provisioned. In these last two cases most likely the IP addresses are not globally unique.

For added flexibility and to differentiate the solution, the Blade Center Platform may be positioned in any part of the Service Provider's network and easily handle any type of encapsulation seamlessly. It is assumed that, conceptually, a FAST (Flow Acceleration System, either hardware or software based) using a Deep Packet Inspection functional component may exist in the system that will enhance the ability to do to FBR/CBR functions within the DPPM/DPI Blade.

Exemplary applications of the disclosed embodiments include: DNS server protection, such as DNS Defender provided by Cloudshield Technologies, Inc., San Jose, Calif.; Carrier Class Firewall Services; Carrier Class IDS/IPS & Malware Detection Services; IPv6 Security; Multi-Stream IPTV.

Regarding DNS Defender, Domain Name Service (DNS) may be considered the digital glue of the different technologies that form the Internet. Unfortunately, DNS servers have become a weak link of the global Internet as everything from web surfing to making a digital call depends upon it. At the same time this is one of the oldest, most "trusting" protocols deployed in use today. The CloudShield DNS Defender™ product is an example of a Content Processing application which can be used with the disclosed embodiments. As service providers work on scaling and protecting their DNS infrastructure, it often involves multiple routers, firewalls and load balancers in addition to a farm of servers. However, these defenses can't protect the DNS servers from malicious flood attacks that use "good" DNS transactions.

DNS Defender may implemented using a single higher performance blade performing content processing within the BladeCenter cabinet. DNS Defender protects DNS servers from attacks while accelerating their performance Malicious or errant traffic is detected and discarded while valid DNS requests are passed through for processing. DNS Defender accelerates DNS lookups by "caching" DNS server responses, for example, achieving the industry's highest performance of over 800,000 requests per second. Service providers and web hosting companies may significantly reduce their operational costs because DNS Defender eliminates the need for firewalls, load balancers and the majority of the DNS servers and the associated power and management costs. And since there are fewer systems, there is CAPEX savings as well. To perform this operation, the payload of every request may need to be processed and at times even responded to by the CloudShield blade on behalf of the DNS server.

Regarding Carrier Class—Firewall Services, the Blade-Center chassis may be an optimal platform for implementation of managed security services such as commercial Firewalls that enterprise customers are familiar with and have already integrated and tested. Unfortunately, a product designed for a single enterprise does not scale to serving thousands of customers nor do they have support for the network transport protocols encapsulations and the high availability requirements that service providers demand. This is where a CloudShield blade acting, as a network processor blade, may be utilized.

Figure 26:
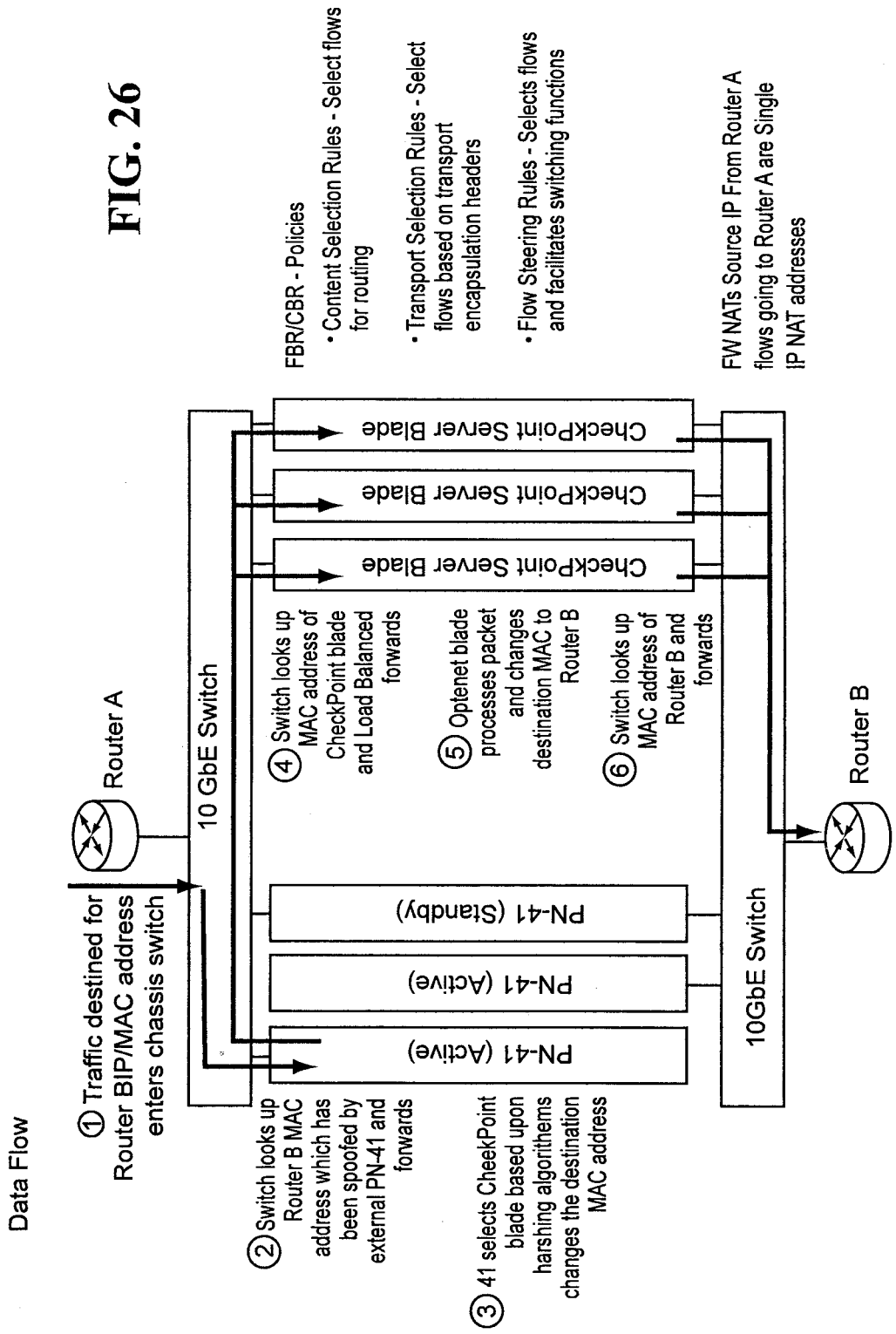
FIG. 26 depicts another alternate exemplary deployment of a Blade Center implementation.

CloudShield DPPM/DPI blades act as the line card in the BladeCenter HT Chassis monitoring the traffic between aggregation routers and load balances flows across multiple server blades that host the CheckPoint firewall service. Checkpoint Firewalls loaded on server blades, receive traffic that is directed to and from them by the CloudShield DPPM/DPI Blades operating according to the disclosed embodiments. The DPPM/DPI Blades may also ensure the "stickiness" of customer's flows into the selected Checkpoint Firewalls so that they can perform per/customer per/flow stateful analysis. The DPPM/DPI Blades may also collect billing data and monitor each individual service. FIG. 26 above shows the DPPM/DPI Blades in an Active Termination deployment scenario. Each DPPM/DPI Blade terminates 4 10 GigE backplane links and selectively transform the network packets into normal Ethernet frames and load balances traffic over the ServerBlades that are host to the Checkpoint Firewalls. This exemplary implementation may provide 20 Gbps of full duplex packet flow processing capability for a high performance Carrier Class Firewall service.

Regarding Carrier Class IDS/IPS & Malware Detection Services, the Internet is not a safe place; it doesn't take more than a few minutes, after connecting a computer to the Internet, for the computer to become the target of scanners and profilers that are the precursor of more serious attacks. Corporations may have Intrusion Detection Systems (IDS)/Intrusion Protection Systems (IPS) and malware detection applications to identify and protect their networks from attacks. However, an opportunity may exist for Service Providers to offer IDS/IPS and Malware Detection services to the millions of small businesses that use and depend on Internet services. In particular, the disclosed embodiments may be used to leverage top enterprise IDS/IPS applications together with Malware Detection applications and offer Managed Security Services to small business customers.

Carrier Class IDS/IPS & Malware Detection Services can be implemented as shown in FIG. 5, however, the blade servers will be running IDS/IPS and Antivirus detection applications in virtual machines. The DPPM/DPI Blades may use the Service Manager and the FBR/CBR RAVE application to direct flows of interest into the server blades.

Regarding IPv6 Security, Service Providers are becoming aware of the fact that the Internet is running out of IPv4 addresses. It is estimated that if the allocation of IPv4 addresses continues at present rate, the Internet will run out of IPv4 addresses by 2012. However, some countries are already experiencing problems and some others will start to run out of IPv4 addresses by 2010. The disclosed embodiments may be used to implement an Internet Transition Gateway that will convert bidirectional IPv6 and IPv4 flows, effectively allowing connectivity between IPv6 and IPv4 networks seamlessly.

The CloudShield Internet Transition Gateway (ITG) may provide the IPv6-to-IPv4 connectivity to allow IPv6 hosts to access the IPv4 Internet. Hence, Service Providers can use the ITG internally in their networks and also offer IPv6-to-IPv4 interworking services. In this manner, customers that can't obtain IPv4 addresses will be able to obtain IPv6 addresses and still access the IPv4 Internet.

The ITG can also be used to leverage existing IPv4 Security Applications such as the CheckPoint Firewall services. In this use case the ITG converts IPv6 traffic to IPv4 and forwards the traffic back to the CheckPoint Firewalls. The CheckPoint Firewall blades scrub the flows and send them back to the ITG Viper Blade to be converted back to IPv6. This use case provides both, IPv6 to IPv4 interworking and leverages existing IPv4 security infrastructure to provide security to IPv6 networks.

Regarding Multi-Stream IPTV, DPPM/DPI technology may be used to intercept MPLS encapsulated IPTV multicast channels and use FBR/CBR with CloudShield's Flow Acceleration Technology (FAST) to switch the Multicast channels internally into a BladeCenter Chassis. The DPPM/DPI Blades receives the MPLS Multicast video streams from Microsoft A-servers at the main head-end office. The DPPM/DPI Blade FBR/CBR RAVE application removes the MPLS encapsulation headers and forwards the flows first to an Ad Insertion Server and to a server running Envivio Video Streaming which creates two additional video streams, one for PCs and a second one for mobile hand-held devices. Once the three video streams are created, the DPPM/DPI Blade uses FBR/CBR to restore the MPLS transport header to the broadband IPTV service and routes the other two flows to two other destinations for further distribution.

Figure 27:
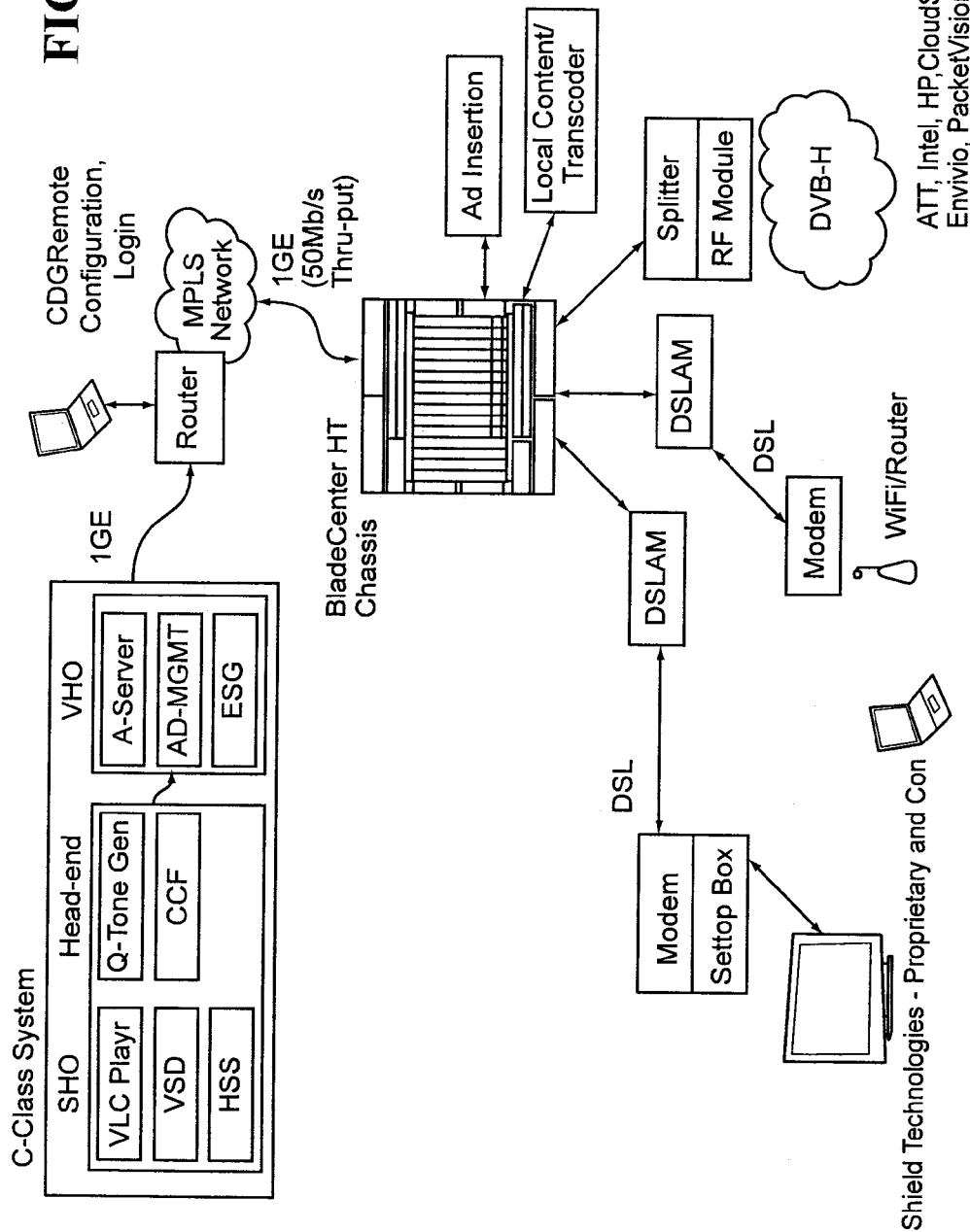
FIG. 27 depicts another alternate exemplary deployment of a Blade Center implementation.

FIG. 27 show a high level view of one implementation of a BladeCenter HT chassis leveraging IPTV multicast broadband services to extend coverage to other devices that, otherwise, could not receive the service, such as PCs and PDAs, Cell Phones, and other video ready hand-held devices. The solution may make IPTV services available to a broader set of subscribers hence, substantially increasing the revenue potential by leveraging existing broadband IPTV services.

Figure 28:
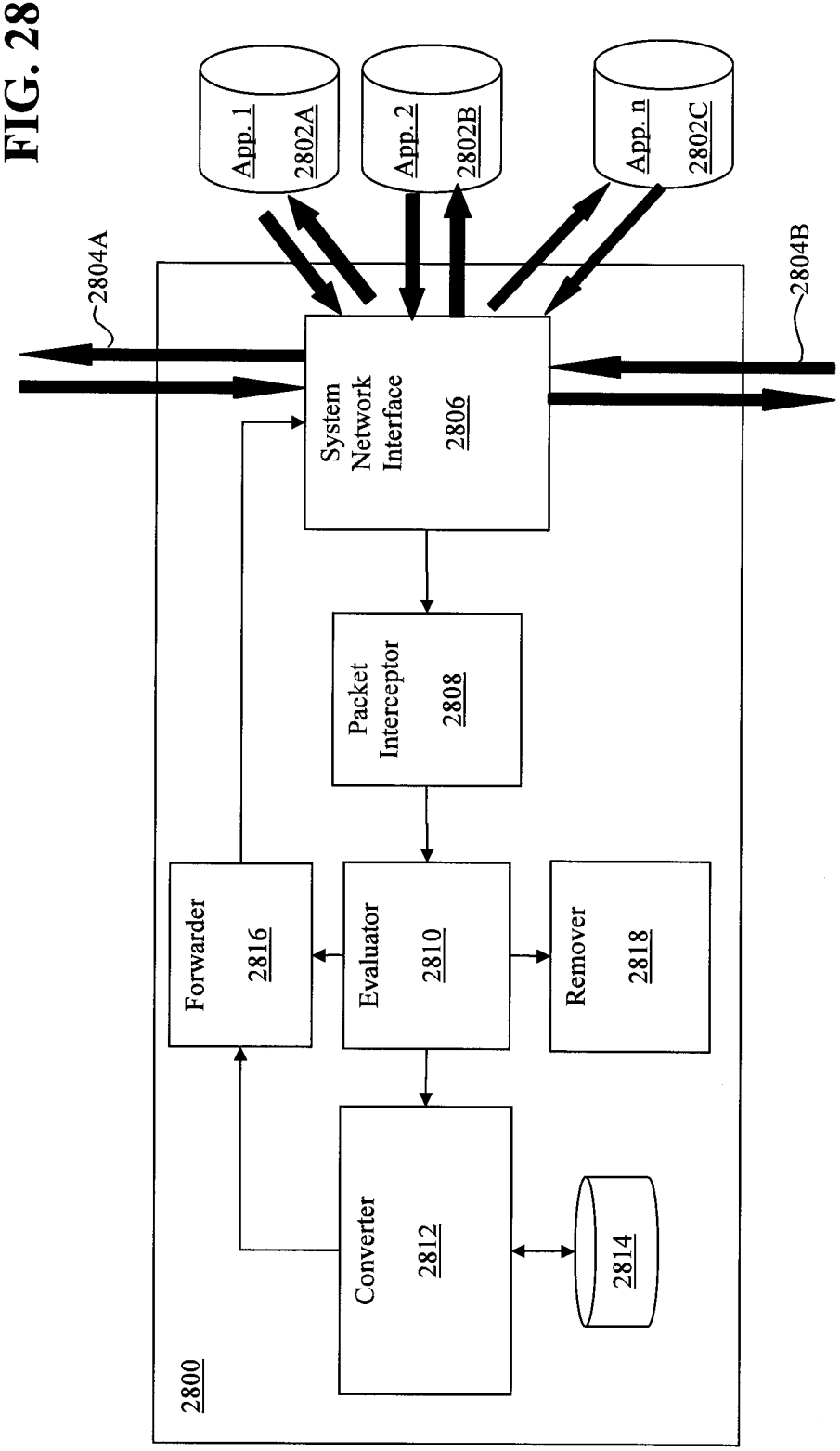
FIG. 28 depicts a block diagram of a system for implementing transparent network access to an application according to one embodiment.
Figure 29:
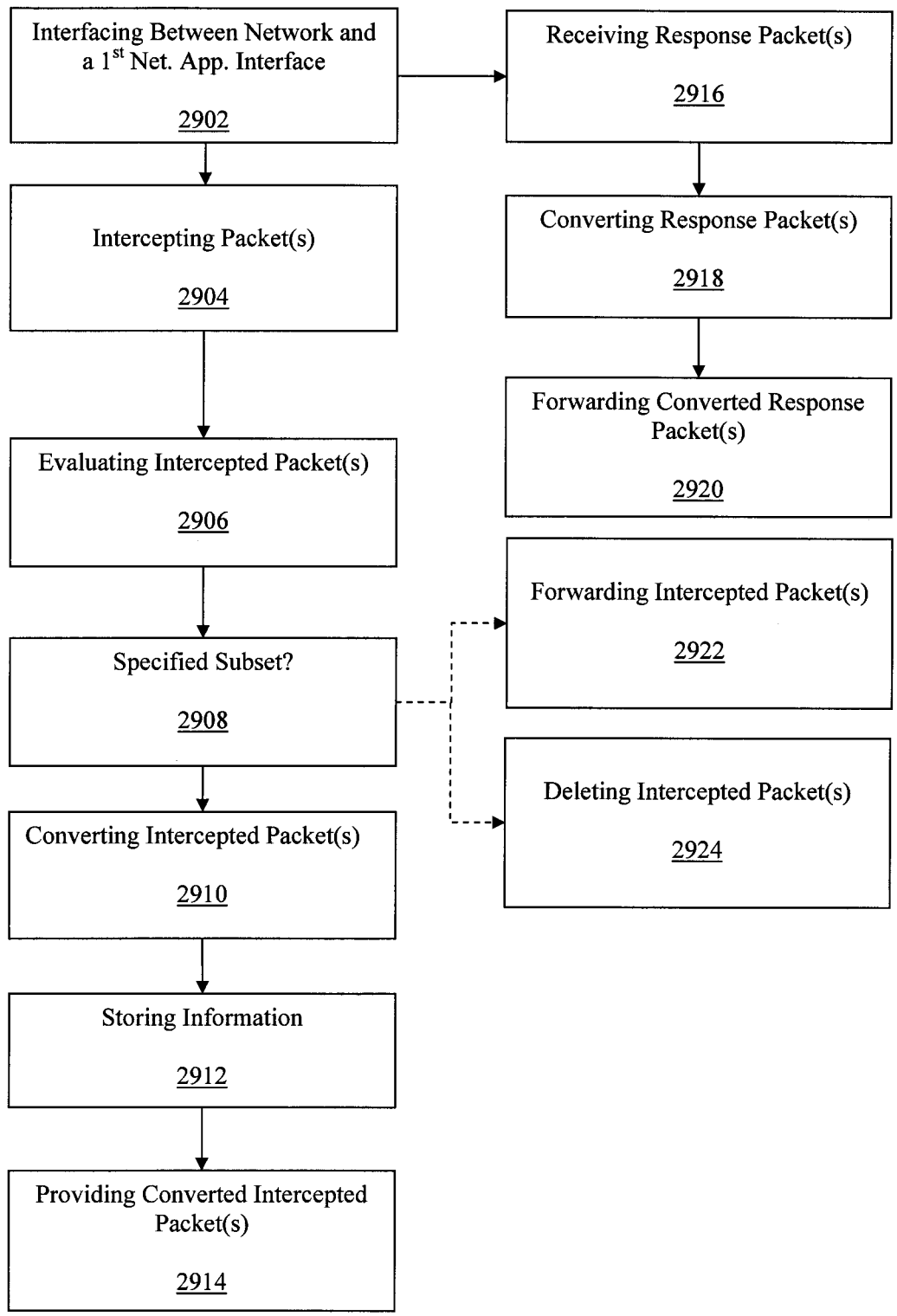
FIG. 29 depicts flow chart showing exemplary operation of the system of FIG. 28.

Referring to FIGS. 28 and 29, as described, the disclosed embodiments may implement a method of transparently interfacing one or more applications 2802A, 2802B, 2802C to a network 2804A, 2804B, such as a firewall service, content control service, malicious content detection service, anti-denial-of-service service, intrusion detection and/or prevention service, interne protocol (IPv4 to IPv6) gateway service, lawful intercept service, URL filtering service, or other enterprise and/or COTS application or combinations thereof, etc., the application(s) 2802A, 2802B, 2802C being provided by one or more application service providers (not shown) and operative to provide the one or more services via the network 2804A, 2804B. The application(s) may be implemented in software, hardware or a combination thereof. For example, the application(s) may be implemented as a hardware appliance, having appropriate software executing thereon, either in a blade implementation, i.e. compatible with the IBM blade server, or rack mountable device implementation. Alternatively, the application(s) may be provided/implemented in software and executed on a third party server or other device. The disclosed embodiments are transparent to the application(s), i.e. the application(s) are unaware that they may be provided with less than all of the network traffic and/or that the packets provided to the application(s) have been converted from a incompatible form to a compatible form, as will be described.

Each of the applications 2802A, 2802B, 2802C may include one or more application network interfaces (not shown) capable of connecting the application(s) 2802A, 2802B, 2802C to the network 2804A, 2804B, the network 2804A, 2804B carrying a plurality of packets in at least one format, which may include a protocol, e.g. SPNF, incompatible with the format, e.g. protocol, expected by the application(s) 2802A, 2802B, 2802C, e.g. IASF, each being transmitted by a source (not shown) to at least one intended destination (not shown) intended by the source, each of the plurality of packets comprising routing data operative to cause the forwarding of the packet via the network 2804A, 2804B towards the at least one intended destination, e.g. data which is used by the various routers and switches on the network 2804A, 2804B to forward the packet along a route which should convey the packet to its ultimate destination. This data includes inter-network data, such as Layer 2 data or other data, such as a MAC address, which may be used to route the packet among devices within a network, as well as intra-network data, such as Layer 3 data or other data, such as an IP address, which may be used to route the packet among devices which are connected to different networks. The source and destination may include any combination of inter and intra network devices. For example, the intended destination could be one of the application(s) 2802A, 2802B, 2802C. Accordingly, for example, the source and destination may include inter-network entities, e.g. within a particular network hop, such as client devices and firewalls and/or proxy servers, or ingress and egress routers of a network, the ingress router receiving external communications and forwarding them, based on the layer 2 or 3 data, to the egress router. Alternatively, the source and destination may include intra-network entities, such as a client web browser and web server communicating using Layer 3 data.

The network 2804A, 2804B may include any public or private network, or portion thereof, or combination thereof, including the internal network of a carrier which may comprise an ingress router and an egress router. The network 2804A, 2804B may include upstream 2804A and downstream 2804B portions with respect to the point at which the disclosed embodiments are coupled with the network 2804A, 2804B to implement the disclosed functionality. It will be appreciated that physical connection of the disclosed embodiments with network 2804A, 2804B may be implementation dependent and may include a physical and/or logical interconnection therewith.

The method includes interfacing between the network 2804A, 2804B and the application network interface of the application(s) 2802A, 2802B, 2802C (block 2902) and intercepting each of at least a portion of the plurality of packets prior to a forwarding thereof toward the at least one intended destination (block 2904). The interception may take place after the packet has been processed, and forwarded, by an ingress router to a carrier facility, but prior to the receipt and forwarding of that packet by an egress router out of the carrier facility. The method further includes evaluating each of the intercepted packets based on one or more specifications of one or more subsets of the plurality of packets with respect to which the application(s) 2802A, 2802B, 2802C is/are to perform the service(s) (block 2906). The specification(s) may be provided by the application service provider(s). i.e. one or more of the application service providers may supply one or more specifications of subsets of the intercepted packets that they would like provided to, or excluded from, their associated application(s) 2802A, 2802B, 2802C. In one embodiment, the subset(s) may include all of the plurality of packets. The specification(s) may specify the subset(s) based on the routing data or criteria other than only the routing data. It will be appreciated that the criteria may be defined as inclusive or exclusive criteria, i.e. specifying which packets are to be included in or, alternatively, which are to be excluded from, the subset(s). For example, the criteria may specify a subset based on the source of the intercepted packet, e.g. where the source is a subscriber to the service provided by the application.

Figure 2:
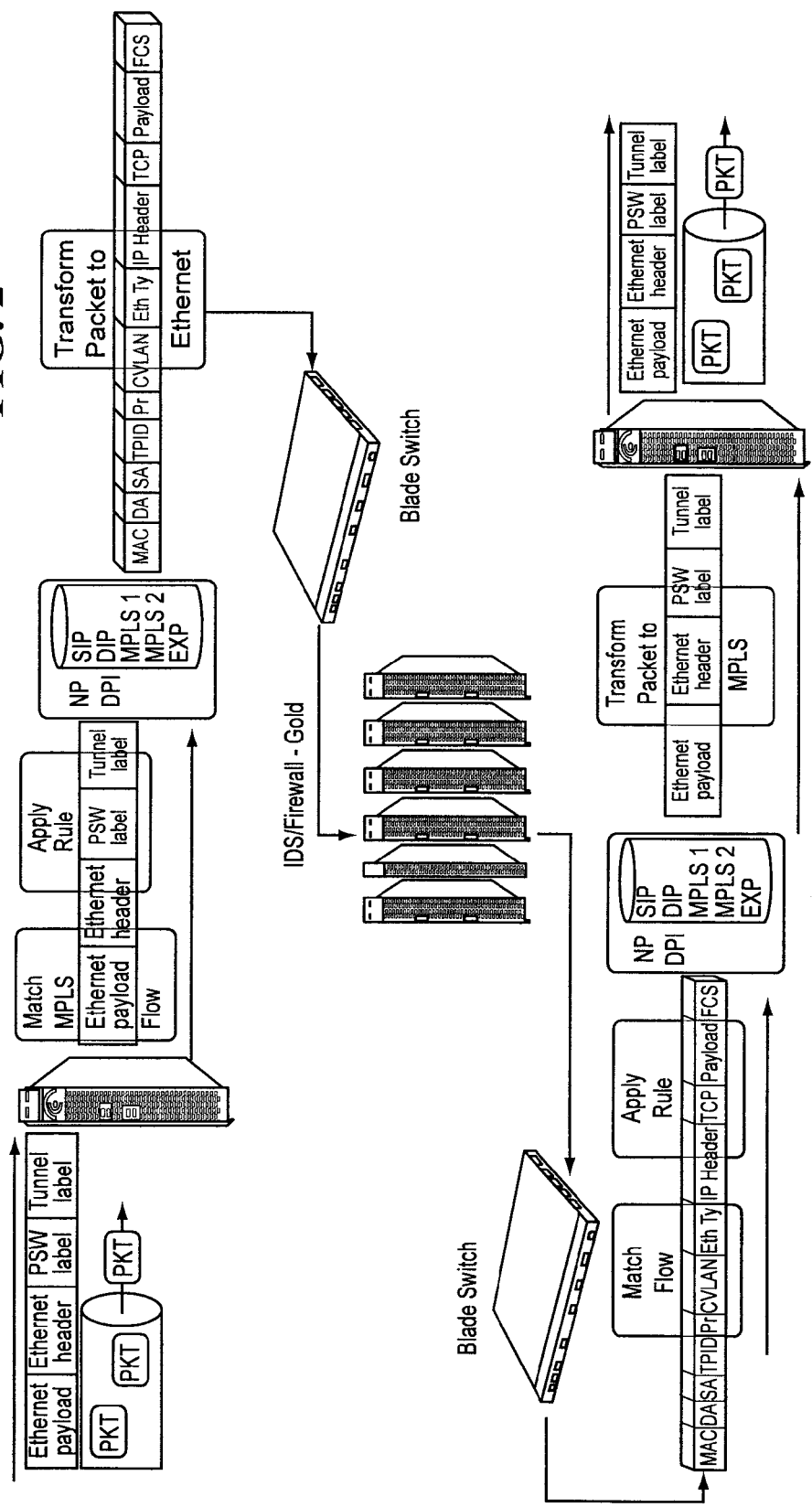
FIG. 2 depicts an exemplary implementation of a system for implementing transparent network access to an application according to one embodiment.

The method further includes converting the intercepted packet from the first format, such as a format conforming with a first communications protocol, incompatible with the application(s) 2802A, 2802B, 2802C, e.g. SPNF, to a second format, such as a second format conforming with a second communications protocol different from the first communications protocol, compatible with the application(s) 2802A, 2802B, 2802C, e.g. IASF, Ethernet, etc. (block 2910), storing information representative thereof (block 2912), such as in storage device 2814, and providing the converted intercepted packet to the associated application 2802A, 2802B, 2802C via the application network interface of that application to facilitate the performance of the service with respect to the intercepted packet (block 2914), if the intercepted packet is one of the specified subset(s) (block 2908) associated with the application. The stored information stored in the storage device 2814 may be representative the state of the intercepted packet or other state information, permitting the disclosed embodiments to statefully process subsequently intercepted packets or responses received from the application(s). See FIG. 2 which shows a block diagram of an exemplary implementation. Where a particular packet is specified in more than one subset of interest of more than one application 2802A, 2802B, 2802C, each interested application 2802A, 2802B, 2802C may be provided with a copy of the particular patent. Alternatively, one or more packet contention policies may be implemented, such as round robin, to which designate which interested application 2802A, 2802B, 2802C will be provided with the particular packet. Priority of one application 2802A, 2802B, 2802C over another when subsets overlap may be resolved among the application service providers such as on a fee basis.

Figure 3:
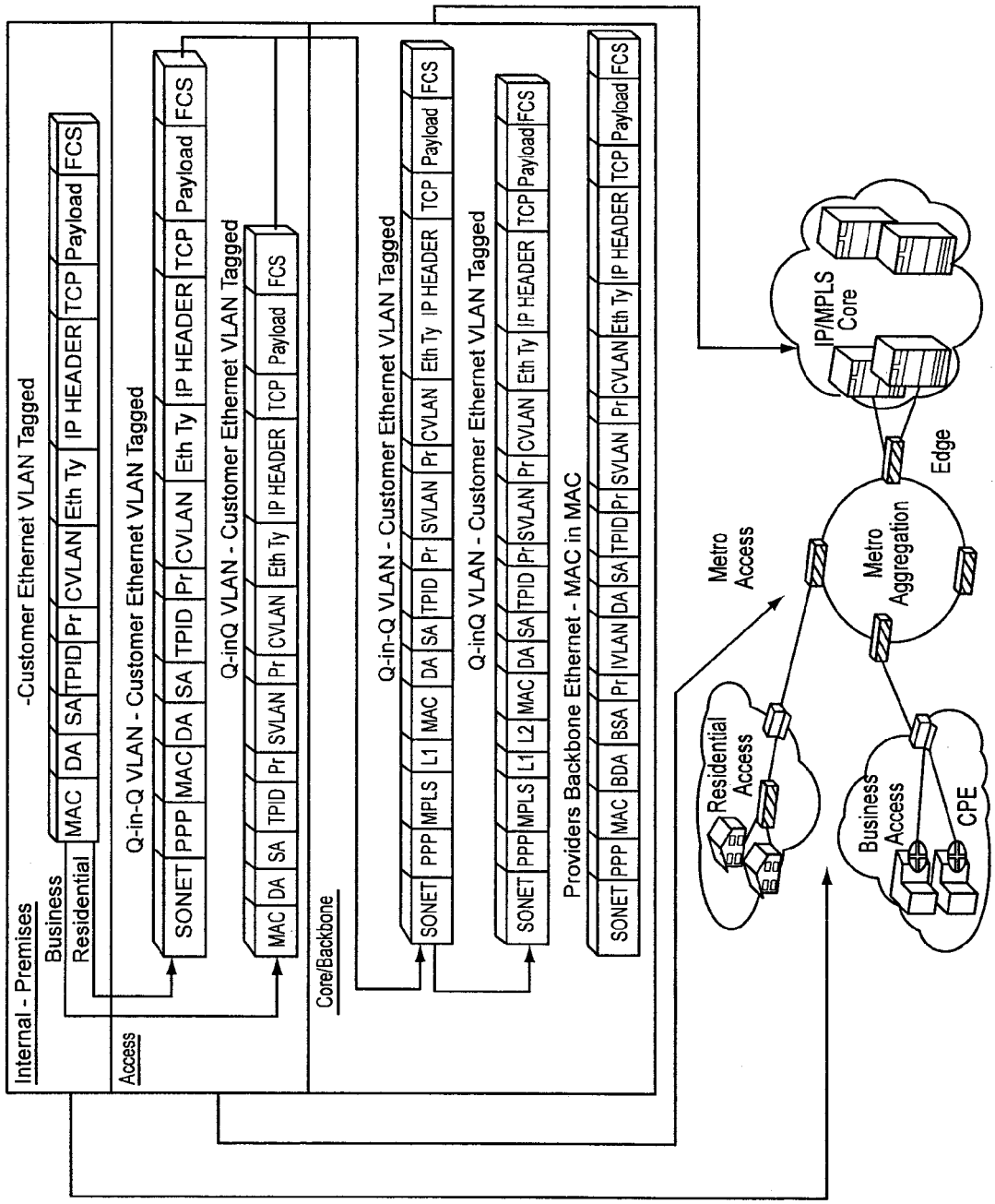
FIG. 3 depicts exemplary packet formats among which a given packet may be converted.
Figure 4:
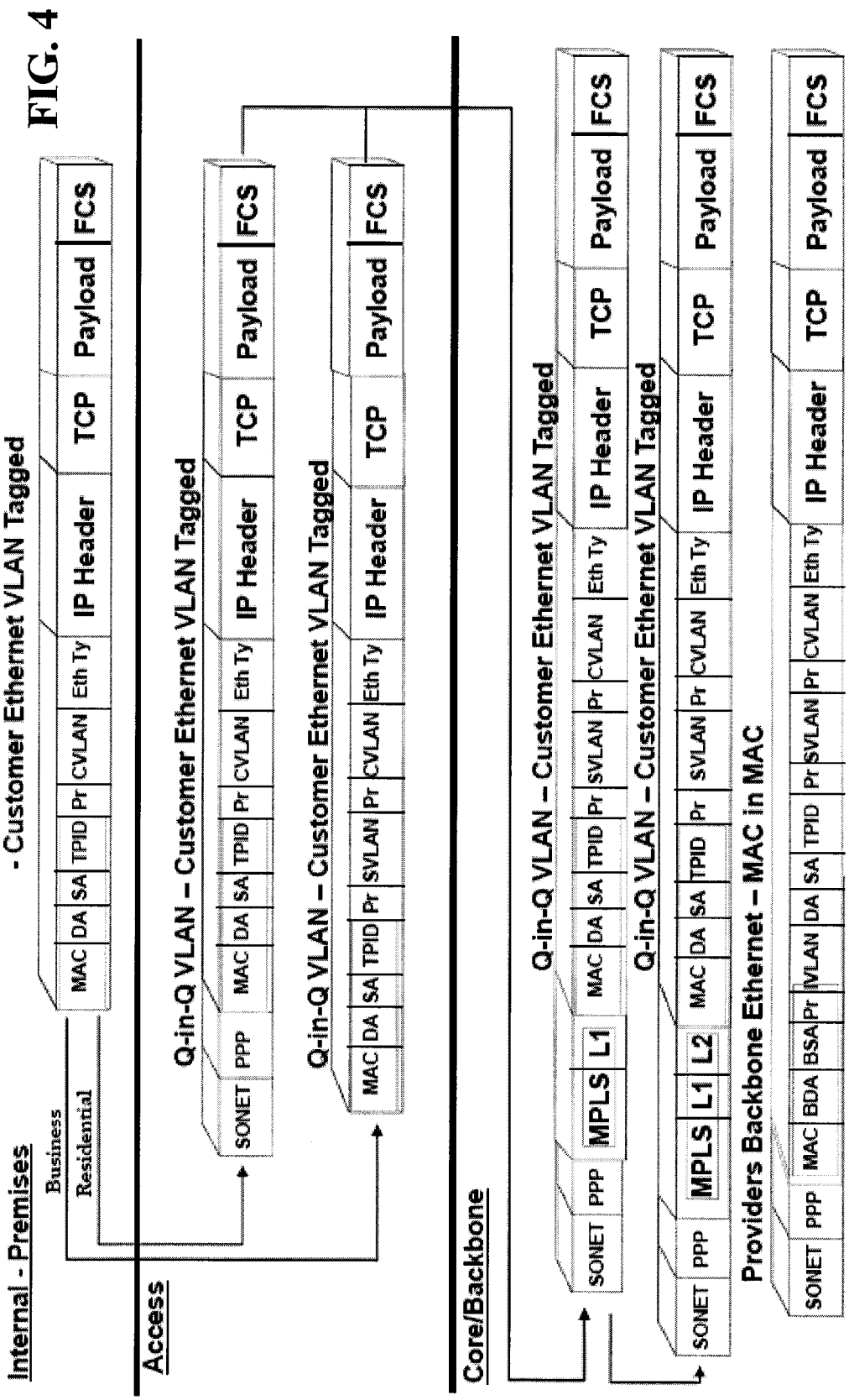
FIG. 4 depicts exemplary packet formats among which a given packet may be converted.

The converting may include modifying a portion of the intercepted packet, such as a portion of the packet header, from an original state to a modified state, the stored information being representative of the modification. The converting may include removing carrier-specific, e.g. SPNF specific, data from the packet which was appended/prepended, or otherwise inserted in, to the enterprise packet, e.g. IASF form, for the purpose of routing the packet through the carrier's network. The carrier-specific data may then be stored while the converted packet is processed by the application(s) 2802A, 2802B, 2802C. Upon receipt of the result of the performance of the service, as will be described in more detail below, the carrier-specific data may then be restored, e.g. re-appended/prepended/inserted, to the result, i.e. result packet, so as to be able to continue to forward the result via the carrier's network. FIGS. 3-5 show exemplary packet formats among which a given packet may be converted. It will be appreciated that the conversion of packets may include any conversion, including format conversions, protocol conversions, translation, or combinations thereof. In particular, the conversion may include any conversion between that which an application 2802A, 2802B, 2802C expects and otherwise. In one embodiment, the first application incompatible format includes IPv6 and second application compatible format includes IPv4. In another embodiment, the first application incompatible format includes multi-protocol label switching ("MPLS") and second application compatible format includes Ethernet.

In one embodiment, the method may further include processing a subsequent packet, travelling in the same direction as the current intercepted packet or the opposite direction thereof, intercepted subsequent to the intercepted packet based on the stored information. For example, the stored information may indicate start of a sequence, stream and/or conversation of related packets, which may or may not be intermingled among intervening packets, each of which is to be treated in a particular manner. For example, subsequent packets of a stream may be released to the network 2804A, 2804B, thereby bypassing the application(s) 2802A, 2802B, 2802C where only a first one or more packets of a stream needs to be passed to an application 2802A, 2802B, 2802C for provision of the service. In this embodiment, the stored information may used to modify the specification of a subset to include or exclude subsequently intercepted packets. For example, multiple instances of the same application(s) 2802A, 2802B, 2802C may be provided, such as to scale an enterprise class application 2802A, 2802B, 2802C to meet carrier class traffic handling requirements. In this case, the disclosed embodiments may provide load balancing capabilities such that no one instance of an application 2802A, 2802B, 2802C is overloaded by the carrier-class traffic volume. Further, where the application(s) 2802A, 2802B, 2802C involves processing of related packets, the disclosed embodiments can ensure that related packets are provided to the same application 2802A, 2802B, 2802C instance, while balancing load across instances, to ensure proper performance of the service.

As the application(s) 2802A, 2802B, 2802C, which are designed to be directly coupled with the network 2804A, 2804B, i.e. they expect to "see" all network traffic, but, in fact, are indirectly coupled with the network 2804A, 2804B, they are unaware of the intercepting, evaluating and converting and therefore unaware of those intercepted packets which are excluded from the specified subset and therefore not provided to the application(s). For example, the application(s) 2802A, 2802B, 2802C may include enterprise class applications or other COTS applications designed to be deployed in an enterprise environment. The expectations of the applications are met as they are not aware of what they are not being provided with. Accordingly, the application(s) need not be modified to operate with the disclosed embodiments as the disclosed embodiments accommodate their specific requirements. For example, the disclosed embodiments permit the deployment of enterprise or COTS type applications in a non-enterprise environment, such as a carrier-class deployment, without modification.

The method may further include forwarding the intercepted packets to the network if the intercepted packet is not one of the specified subset(s) or, alternatively, deleting the intercepted packet if the intercepted packet is not one of the specified subsets (blocks 2922, 2924).

Where the intercepted packet was provided to the application(s) 2802A, 2802B, 2802C, the method may further include receiving, in response to the providing of the converted intercepted packet to the application(s) 2802A, 2802B, 2802C, from the first application via the first application interface, a response packet in the second format, e.g. the application compatible format, resulting from the performance of the first service by the first application with respect to the provided converted intercepted packet (block 2916). The response packet may then be converted from the second format, e.g. the application compatible format, to the first format, e.g. the application incompatible format, based on the stored information (block 2918). The converted response packet may then be forwarded to the network 2804A 2804B (block 2920). As described above, the conversion may include restoring prefixed, suffixed or inserted routing data, or otherwise transforming the form and/or protocol of the response packet, e.g. for compatibility with the carrier network. For example, where the converting of the intercepted packet included modifying a portion of the intercepted packet, such as the packet header, from an original state to a modified state, such as from conformance with a first communications protocol to conformance with a second communications protocol different therefrom, the stored information being representative of the modification, the converting of the response packet include restoring the portion from the modified state to the original state. Exemplary conversion include IPv4 from/to IPv6, MPLS to/from Ethernet, etc. or combinations thereof.

In one embodiment, the specification(s) of the subset(s) of intercepted packets to be provided to the application(s) may be modified based on the intercepted packet(s), the response packet(s) or a combination thereof to affect the evaluation of a subsequently intercepted one or more packets This allows the disclosed embodiments to dynamically adapt the evaluation of intercepted packets, and which of those are provided to the application(s), based on the intercepted packets and/or the results of the processing of those packets by the application(s). Such modifications may be used to include or exclude subsequently intercepted packets from being provided to an application. For example, where the application provides a malware detection service and only the first packet of a stream of packets need be checked for malware, the disclosed embodiments may determine, based on clearance of the first packet by the applications, that subsequent packets of the stream may be bypassed around the application so as to improve throughput by modifying the appropriate specification to exclude those packets from the subset provided to the application. It will be appreciated that subsequently received packets may be travelling in the same direction as a particular packet, such as from the same source to the same destination, from the same source to a different destination or from a different source to a different destination. Further, the subsequently received packets may be travelling in the opposite direction, such as from the same or different destination to the same or different source, such as might occur in a conversation between a source and destination. Multiple sources and multiple destinations may be implicated, such as in VoIP call set up transactions and the subsequent voice traffic.

As was described, the disclosed embodiments may provide for the deployment of more than one application, including different applications and/or multiple instances of the same application. In particular, the method may further include interfacing between the network and a second application network interface of a second application, the second application being provided by a second application service provider and operative to provide a second service via the network, the second application network interface being capable of connecting the second application to the network, wherein the first format is incompatible with the second application. The method further includes evaluating the intercepted packet based on a second specification of a second subset of the plurality of packets with respect to which the second application is to perform the second service and, wherein the converting further includes converting the intercepted packet from the application incompatible format to a format compatible with the second application, storing information representative thereof and providing the converted intercepted packet to the second application via the second application network interface to facilitate the performance of the second service with respect to the intercepted packet, if the intercepted packet is one of the specified second subset. As was described, each application may be associated with a different specification of a subset of intercepted packets to be provided thereto and the subsets may be exclusive and/or overlapping and may include all of the intercepted packets. Where the multiple applications include multiple instances of the same application, the subsets for each application may be exclusive and may be specified so as to divide the intercepted packets among the instances of the application, such as to load balance, e.g. permit lesser capable enterprise class applications to handle higher carrier-class volumes. The subsets may be dynamically determined such as based on load. For example, all intercepted traffic be routed to a first application instance until it is determined that the application is approaching its capacity. Upon this determination, overflow traffic may then be routed to another instance of the application. Regardless of load, related packets may be dynamically determined and routed to the same application instance, by defining their inclusion and/or exclusion from associated subsets, in particular when the service provided is stateful among related packets. It will be appreciated that packets may be related based on one or more attributes of the packets, such as source, destination, content, type, direction of travel, e.g. conversations, streams, etc., or combinations thereof. and that whether or not two packets are related may be subjective and defined by the application or application service provider.

Wherein multiple applications and/or application instances are deployed, the method may further include receiving, in response to the forwarding of the converted intercepted packet to the first application, from the first application via the first application interface, a response packet in the second format resulting from the performance of the first service by the first application with respect to the forwarded converted intercepted packet and receiving, in response to the forwarding of the converted intercepted packet to the second application, from the second application via the second application interface, a response packet in the third format resulting from the performance of the second service by the second application with respect to the forwarded converted intercepted packet. Further, the method may include converting the response packet to the first format based on the stored information and forwarding the converted response packet to the network, as was described above.

As was described above, the method may further include modifying the first specification, the second specification, or a combination thereof, based on the intercepted packet, the response packet or a combination thereof, a subsequent intercepted packet being evaluated in accordance therewith, and wherein the modification of the first specification or second specification includes and/or excludes the subsequent intercepted packet from the first subset or second subset respectively.

Referring to FIG. 28, the disclosed embodiments further relate to a system 2800, implementing the methods described above, for transparently interfacing a first application 2802A, 2802B, 2802C to a network 2804A, 2804B, the first application 2802A, 2802B, 2802C being provided by a first application service provider and operative to provide a first service via the network 2804A, 2804B, the first application 2802A, 2802B, 2802C including a first application network interface (not shown) capable of connecting the first application 2802A, 2802B, 2802C to the network 2804A, 2804B, the network 2804A, 2804B carrying a plurality of packets in a first format incompatible with the first application 2802A, 2802B, 2802C, each being transmitted by a source to at least one intended destination intended by the source, each of the plurality of packets comprising routing data operative to cause the forwarding of the packet via the network 2804A, 2804B towards the at least one intended destination.

The system 2800 includes: a system network interface 2806 operative to interface between the network 2804A, 2804B and the first application network interface of the first application 2802A, 2802B, 2802C; a packet interceptor 2808 coupled with the system network interface 2806 and operative to intercept each of at least a portion of the plurality of packets prior to a forwarding thereof toward the at least one intended destination; a packet evaluator 2810 coupled with the packet interceptor 2808 and operative to evaluate each of the intercepted packets based on a first specification of a first subset of the plurality of packets with respect to which the first application 2802A, 2802B, 2802C is to perform the first service; and a packet converter 2812 coupled with the packet evaluator 2810 and operative to convert the intercepted packet from the first format to a second format compatible with the first application 2802A, 2802B, 2802C, store information representative thereof, such as in a storage device 2814, e.g. a memory, disk or other storage medium, and provide the converted intercepted packet to the first application 2802A, 28082B, 2802C, such as via the system network interface 2806 and/or the first application network interface to facilitate the performance of the first service with respect to the intercepted packet, if the intercepted packet is one of the specified first subset. The system 2800 may further include: a packet forwarder 2816 coupled with the packet evaluator 2810 and operative to forward the intercepted packet to the network if the intercepted packet is not one of the specified first subset, such as via the system network interface 2806; and/or a packet remover 2818 coupled with the packet evaluator 2810 and operative to delete the intercepted packet from the network 2804A, 2804B if the intercepted packet is not one of the specified first subset.

In one embodiment, the specified first subset may comprises all of the plurality of packets. The first specification may specify the first subset based on criteria other than only the routing data used to route the packet towards the intended destination. The criteria may include identification of the source of the intercepted packet as a subscriber to the first service. The criteria may be provided by the first application service provider. In one embodiment, the packet converter may be further operative to modify the first specification based on the intercepted packet, a subsequent intercepted packet being evaluated in accordance therewith, such as to exclude the subsequent intercepted packet from the first subset, for example, wherein the subsequent intercepted packet was transmitted from the at least one destination to the source.

The packet converter 2812 is further operative to receive, in response to having provided the converted intercepted packet to the first application, from the first application 2802A, 2802B, 2802C via the first application interface, a response packet in the second format as a result of the performance of the first service by the first application with respect to the provided converted intercepted packet, the packet converter 2812 being further operative to convert the response packet from the second format to the first format based on the stored information and wherein the packet forwarder 2816 is further operative to forward the converted response packet to the network. The packet converter 2812 may further be operative to modify a portion of the intercepted packet from an original state to a modified state, the stored information being representative of the modification and restore the portion from the modified state to the original state of the response packet. The portion may include at least a portion of the header of the intercepted packet. The first format may conform to a first communications protocol, such as IPv6 or MPLS, and the second format may conform to a second communications protocol different from the first communications protocol, such as IPv4 or Ethernet.

The packet converter 2812 may be further operative to modify the first specification based on the intercepted packet, such as to exclude or include a subsequently intercepted packet, e.g. as part of a stream and/or conversation of packets, the response packet or a combination thereof, the subsequent intercepted packet being evaluated in accordance therewith.

In one embodiment, the system 2800 may be implemented by a processor and a memory coupled with the processor and further including: first logic stored in the memory and executable by the processor to cause the system network interface 2806 to intercept each of at least a portion of the plurality of packets prior to a forwarding thereof toward the at least one intended destination; second logic stored in the memory and executable by the processor to evaluate each of the intercepted packets based on a first specification of a first subset of the plurality of packets with respect to which the first application 2802A, 2802B, 2802C is to perform the first service; and third logic stored in the memory and executable by the processor to convert the intercepted packet from the first format to a second format compatible with the first application 2802A, 2802B, 2802C, store information representative thereof and provide the converted intercepted packet to the first application 2802A, 2802B, 2802C via the first application network interface to facilitate the performance of the first service with respect to the intercepted packet, if the intercepted packet is one of the specified first subset. The third logic may be further executable by the processor to receive, in response to having provided the converted intercepted packet to the first application 2802A, 2802B, 2802C, from the first application 2802A, 2802B, 2802C via the first application interface, a response packet in the second format as a result of the performance of the first service by the first application 2802A, 2802B, 2802C with respect to the provided converted intercepted packet, the packet converter being further operative to convert the response packet from the second format to the first format based on the stored information; and wherein the system 2800 may further include fourth logic stored in the memory and executable by the processor to forward the converted response packet to the network 2804A, 2804B.

As was described, the system network interface 2806 may be further operative to interface between the network 2804A, 2804B and a second application network interface (not shown) of a second application 2802A, 2802B, 2802C, the second application 2802A, 2802B, 2802C being provided by a second application service provider and operative to provide a second service via the network 2804A, 2804B, the second application network interface being capable of connecting the second application 2802A, 2802B, 2802C to the network, wherein the first format is incompatible with the second application 2802A, 2802B, 2802C. The second application may be different from the first application or may be the same, e.g. a second instance of the first application. Further, the first application service provider may the same as the second application service provider or may be different. The packet evaluator 2810 may be further operative to evaluate the intercepted packet based on a second specification of a second subset of the plurality of packets with respect to which the second application 2802A, 2802B, 2802C is to perform the second service. Wherein the packet converter 2812 is further operative to convert the intercepted packet from the first format to a third format compatible with the second application 2802A, 2802B, 2802C, store information representative thereof and provide the converted intercepted packet to the second application 2802A, 2802B, 2802C via the second application network interface to facilitate the performance of the second service with respect to the intercepted packet, if the intercepted packet is one of the specified second subset. The first and second subsets may be static or dynamically defined, may be the same or different, overlapping, non-overlapping or comprise the entirety of the plurality of packets. The first and second subsets may be specified to divide packets among first and second applications 2802A, 2802B, 2802C and may be determined dynamically based on load. Related packets of the plurality of packets may be specified to be in the same one of the first or second subsets, such as where the related packets comprises a stream, e.g. are travelling in same direction or where the related packets comprise a conversation or exchange, e.g. travelling in opposite directions with respect to the source and destination thereof.

The packet converter 2812 may be further operative to receive, in response to the forwarding of the converted intercepted packet to the first application 2802A, 2802B, 2802C, from the first application 2802A, 2802B, 2802C via the first application interface, a response packet in the second format as a result of the performance of the first service by the first application 2802A, 2802B, 2802C with respect to the forwarded converted intercepted packet. The packet converter 2812 may be further operative to receive, in response to the forwarding of the converted intercepted packet to the second application 2802A, 2802B, 2802C, from the second application 2802A, 2802B, 2802C via the second application interface, a response packet in the third format as a result of the performance of the second service by the second application 2802A, 2802B, 2802C with respect to the forwarded converted intercepted packet. Further, the packet converter 2812 may be operative to convert the response packet to the first format based on the stored information and, wherein the system 2800 further comprises a packet forwarder 2816 coupled with the packet converter 2812, forward the converted response packet to the network 2804A, 2804B.

In one embodiment, the packet converter 2812 may be further operative to modify the first specification, the second specification, or a combination thereof, based on the intercepted packet, the response packet or a combination thereof, a subsequent intercepted packet being evaluated in accordance therewith. The modification of the first specification or second specification may include and/or exclude the subsequent intercepted packet from the first subset or second subset respectively, e.g. where in the modification of the first specification excludes the subsequent intercepted packet from the first subset and the modification of the second specification includes the subsequent intercepted packet in the second subset.

The packet evaluator 2810 may be further operative to evaluate a subsequent packet intercepted subsequent to the intercepted packet based on the stored information. The packet converter 2812 may be further operative to modify the first specification based on the stored information wherein the first subset is altered thereby. The first application may be unaware of those intercepted packets which are not included in the first subset. The at least one intended destination may include the first application and the first specification may be provided by the first application service provider.

As has been described, a system for transparently provisioning services provided by one or more applications has been disclosed utilizing an intermediary unbeknownst to the application(s), the intermediary being logically and/or physically coupled between the application(s) and the network to which the services are to be provisioned so as to be able to filter and/or modify all, or a subset, of the network traffic, i.e. packets, visible to the application(s). In this way, the application(s) may be unaware of the filtering and/or modifications undertaken by the intermediary and what the application(s) see is all that they thinks exists. The traffic may be modified, e.g. headers added/removed or other protocol modifications, by the intermediary before being supplied to the application so that the application gets the traffic in a form that it expects. Further the output of the application(s) may be modified for reinsertion to the network, e.g. to correct for the expectations, i.e. protocol of the network. e.g. proxy wan/lan to allow carriers to implement enterprise applications at carrier level without having to buy carrier class applications. Allow IPv4 apps to be used on IPv6 network. Stateful processing, processing of present packet based on a prior packet, may be required make the proper modifications to the application(s) output based on the application(s) input (i.e. converting communications protocols properly). Stateful processing may be required so that applications see bidirectional flow/bidirectionally related packets/flows (requests and responses thereto, e.g. conversations) that they expect. Intelligent bypassing may be used to bypass traffic, otherwise subject to the service/ processing of the application(s), when such processing is unnecessary, e.g. if a stream is approved based on the first packet thereof, the remainder of the stream may be bypassed, if the stream is not capable of carrying a virus (audio stream), bypass virus checking. Bypass emails that do not have attachments from being virus checked. Load balancing may be implemented whereby the intermediary divides the subject traffic across multiple instantiations, intelligently assuring that related traffic is sent to the same application instance. The disclosed embodiments may be used to scale a slower application, via multiple instantiations, up to wire speed. The disclosed embodiments may split up traffic by customer or by flow. The disclosed embodiments may implement a cooperative implementation, where the application(s) can notify the intermediary to bypass traffic, such as by pre-approving traffic. While this implies that the application be aware of intermediary and have a communication channel thereto, the network interface of the application(s) can be the same, i.e. unaware of intermediary. In an implementation providing multiple sequentially applied services from multiple applications, the disclosed embodiments may use stateful processing to implement virtualized physical placement of the services such that bi-directional traffic is processed through the services in the proper order, such as would be the case without the presence of the intermediary. This ensures, for the subset of packets processed by the sequentially applied services, that response packets are processed in the opposite order through the sequentially applied services.

The disclosed embodiments permit off-the-shelf (COTS) enterprise applications to be sold as a managed enhanced services by service providers, such as Checkpoint, Firewall; ISS, IPS; BlueCoat, Antivirus, Content Control; open source, and/or any other related COTS application. The disclosed embodiments may used to transform packets in network form (SPNF), such as MPLS, VPLS, PPP, etc., into normal Ethernet flows, i.e. provide flow switching of Ethernet packets into the COTS applications. The disclosed embodiments further reconstruct the original network form from the Ethernet flows after the applications have applied their services. The disclosed embodiments enable content flow switching by parsing packet payloads for specific content.

Accordingly, without any substantial changes to the enterprise applications, such applications become carrier class with:
  OSS/BSS billing support—each new application doesn't need to be integrated with backend billing systems;
  Multi-tenant or multi-subscriber support;
  High Availability—capability of detecting an application is down and automatically rerouting the flow to a different instance;
  Load sharing/balancing—traffic may be distributed across applications running on multiple server cards;
  WAN to LAN Proxy —MPLS labels may be stripped off and reapplied along with appropriate VLAN tags while ensuring that applications don't see WAN protocols;
  Facilitation of on-demand enhanced services provisioning and
  Facilitation of Subscriber services:
    Network security: firewall, anti virus, intrusion protection, anti-spam; Enhanced digital voice and video: dial plans, roaming video; and Hosted virtual infrastructure: web, filer, email, voice.
  Service Control
    Traffic prioritization;
    Bandwidth usage control;
    Network flow analysis;
    L2-L7 access analysis;
    P2P control and cache; and
    Tiered Service and QoS.
  Security
    DDoS mitigation;
    DNS protection;
    BGP protection;
    Botnet protection;
    Content Filtering; and
    Native IPv6 Security.
  Transport
    IPv4 & IPv6 migration;
    Multicasting and acceleration: IPTV, VoIP, P2P; and
    Content Based Routing: user services.

Meeting the universal demand for an Internet that is more robust, that is capable of sustaining its own growth and that can adapt to new technologies, requires the migration of the current network infrastructure to next generation networking technologies. This next generation data network is often referred to as the "Optical Internet."

The shift to the Optical Internet has created a new set of challenges. Chief among these challenges is the need to manage an exponentially higher volume of network traffic at much higher rates of speed. In the U.S., the principal standard for optical networks is the American National Standards Institute ("ANSI") standard for synchronous data transmission over optical media known as Synchronous Optical Network ("SONET"). The SONET standard actually comprises multiple standards for transmission rates up to 9.953 gigabits per second ("Gbps") with the capability to go up to 20 Gbps. Each transmission rate standard is known as an Optical Carrier Level ("OC-X"). Exemplary optical carrier levels include OC-12 for communications at 622.08 Mbps, OC-48 for communications at 2.488 Gbps and OC-192 for communications at 10 Gbps. Today's microprocessors face a situation where they cannot support the pace of performance increases associated with the deployment of fiber-based network bandwidth of OC-48 and higher. Simply put, the move to fiber-optic networks has pushed the physical limits of microprocessors and the I/O bus beyond their current technical capabilities. The platform described herein is designed to address many issues associated with Optical Internet services that cannot be addressed by the current software based firewall servers.

Figure 9:
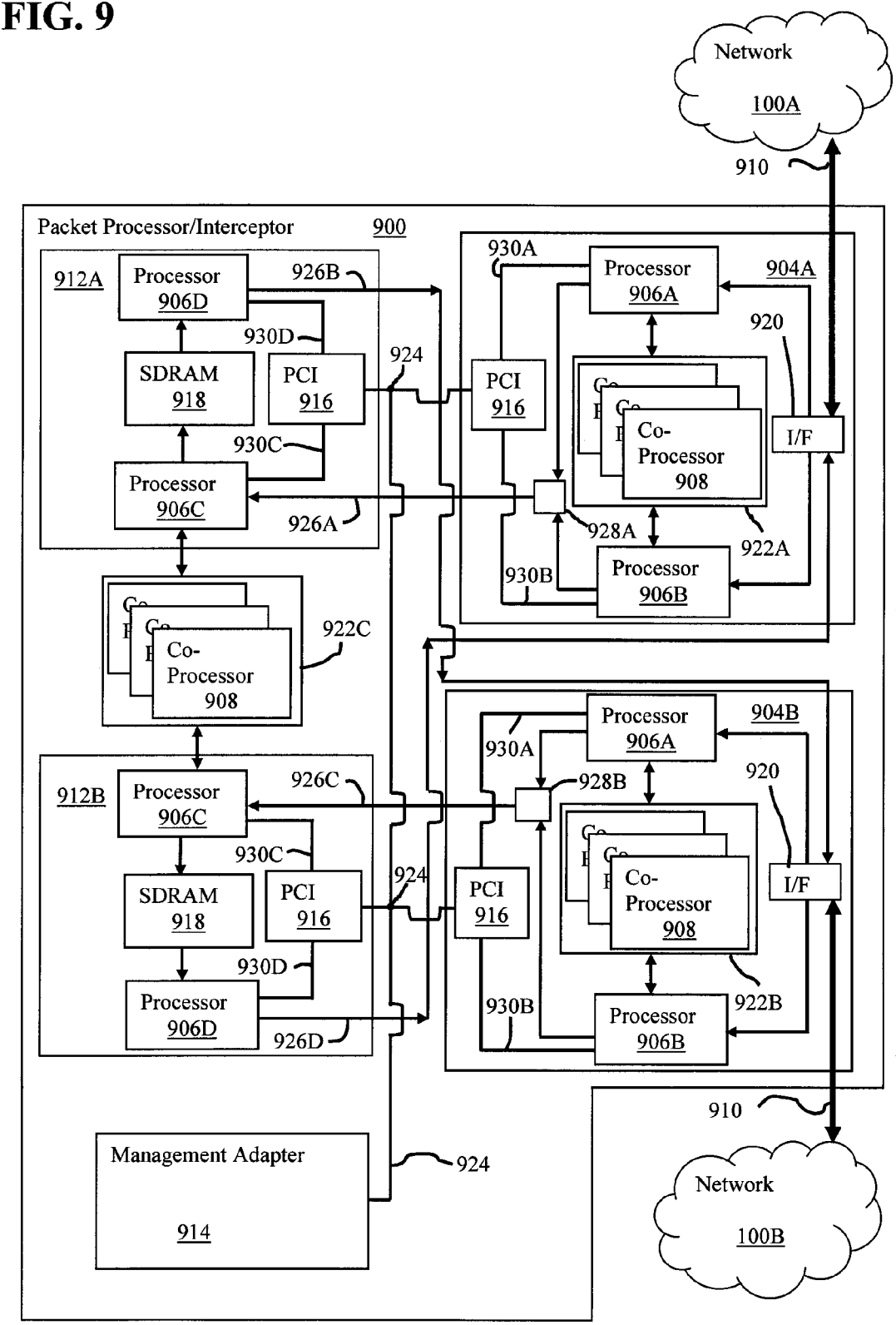
FIG. 9 depicts a block diagram of a packet interceptor/analyzer according to one embodiment.

FIG. 9 shows an exemplary device 900 for intercepting and processing packets at wire speed from an optical based network 100, such as the Internet, compatible with the OC-48 standard or faster. For a more detailed explanation of the operation of devices which intercept and process packets, refer to U.S. Pat. No. 7,114,008 entitled "EDGE ADAPTER ARCHITECTURE APPARATUS AND METHOD", incorporated by reference herein. The exemplary device 900 may include the Rapid Intelligent Processing Platform manufactured by Cloudshield Technologies, Inc., located in San Jose, Calif. For clarity, some components of the device 900 are not shown.

The device 900 shown in FIG. 9 is coupled with the network 100 (consisting of an upstream network portion 100A and a downstream network portion 100B) via a network connection 910 so as to be able to intercept and process packets communicated between the upstream network portion 100A and the downstream network portion 100B of the network 100. Herein, the phrase "coupled with" is defined to mean directly connected to or indirectly connected through one or more intermediate components. Such intermediate components may include both hardware and software based components. In one embodiment, the network connection 910 is an optical network connection. In an alternate embodiment, the network connection 910 is an electrical network connection.

In one embodiment, not shown in the figure, the device 900 is configured to operate within a rack-mount system, e.g. implemented as a blade for installation within a blade enclosure, such as the IBM Blade Center described above, comprising a chassis which provides power, cooling and a housing for the other components, as described below. The housing further includes a backplane into which the other components plug into and which interconnects those components. Such components may include interface components to couple external devices to add additional processing functionality.

The device 900 includes two primary processing elements 904A, 904B which intercept and process packets from the network 100. One primary processing element 904A is coupled with the upstream network 100A and the other primary processing element 904B is coupled with the downstream portion of the network 100B via the network interface 920. It will be appreciated that additional primary processing elements 904A, 904B may be provided depending on the topology, physical and logical arrangement of the network 100 and the coupling point of the device 900. Further, the functionality of the processing elements 904A, 904B may be consolidated into a single processing element. In one embodiment, each primary processing element 904A, 904B includes a printed circuit board capable of being plugged into the backplane described above. For more detail on the operation of the primary processing elements, refer to U.S. Pat. Nos. 7,210,022 entitled "APPARATUS AND METHOD FOR INTERCONNECTING A PROCESSOR TO CO-PROCESSORS USING SHARED MEMORY AS THE COMMUNICATION INTERFACE" and 7,318,144 entitled "APPARATUS AND METHOD FOR INTERCONNECTING A PROCESSOR TO CO-PROCESSORS USING SHARED MEMORY", both which are incorporated by reference herein.

The primary function of the primary processing elements 904A, 904B is to perform stateless processing tasks on the incoming packet stream. Stateless processing tasks are tasks that do not require knowledge of what has come before in the packet stream. Stateless tasks include ingress and egress filtering. Ingress and egress filtering involves ensuring that packets arriving from a particular portion of the network actually came from that portion of the network, as was described above. For example, where the device 900 is programmed with the range of network addresses in the portion of the network 100B downstream of the device 900, packets arriving from that downstream portion with a network address out of range would be detected as invalid and filtered out of the packet stream, or vice versa for the upstream portion of the network 100A. Egress filtering refers to filtering in the upstream to downstream direction and ingress filtering refers to filtering in the downstream to upstream direction. For the filtering function, the filter values are typically maintained in block lists. Note that while filtering is a stateless function, independent of what packets have come before, the device 900 interjects stateful processing, as described below, to dynamically update the filtering or other information required for the stateless processing tasks. While the network processor 906A, 906B on the primary processing elements 904A, 904B can store state information about historical packet activity, each processing element 904A, 904B only sees one direction of the packet flow off the network 100. Therefore, they cannot perform true stateful processing tasks which requires bi-directional visibility. This functionality is provided by the secondary processing elements 912A, 912B, described in more detail below.

The device 900 further includes two secondary processing elements 912A, 912B which are coupled with the primary processing elements 904A, 904B via a command/control bus 924 and packet busses 926A, 926B, 926C, 926D. In one embodiment, each secondary processing element 912A, 912B is a printed circuit board capable of being plugged into the backplane described above. Additional secondary processing elements 912A, 912B may be included or the functionality of the secondary processing elements 912A, 912B may be consolidated into a single secondary processing element. In one embodiment, the command/control bus 924 is a bus routed over the interconnecting backplane of device 900 and complying with the Compact Personal Computer Interface ("cPCI") standard and is 64 bits wide and operates at a frequency of at least 33 MHz. Exemplary packet busses 926A, 926B, 926C, 926D include busses complying with the IX bus protocol of the Intel IXP1200 Network Processing Unit and are described in more detail below. Each exemplary packet bus 926A, 926B, 926C, 926D may be bi-directional, 64 bits wide and operate at a frequency of at least 84 MHz and may be routed over the backplane described above. Alternatively, other bus technologies/protocols may be used and are dependent upon the implementation of the device 900. The command/control bus 924 carries command and control information between the primary and secondary processing elements 904A, 904B, 912A, 912B. The packet busses 926A, 926B, 926C, 926D carry packet data between the primary and secondary processing elements 904A, 904B, 912A, 912B. For more detail on the operation of the secondary processing elements, refer to U.S. Pat. Nos. 7,082,502 entitled "APPARATUS AND METHOD FOR INTERFACING WITH A HIGH SPEED BI-DIRECTIONAL NETWORK" and 7,428,618 entitled "APPARATUS AND METHOD FOR INTERFACING WITH A HIGH SPEED BI-DIRECTIONAL NETWORK", both of which are incorporated by reference herein.

The primary function of the secondary processing elements 912A, 912B is to perform stateful processing tasks, i.e. tasks which are dependent on historical activity. One example of a stateful processing task involves network security applications which require monitoring conversations, i.e. bi-directional packet flow, in the packet stream, typically consisting of requests and responses to those requests. Stateful processing and the ability to monitor traffic bi-directionally allows the secondary processing elements watch for requests and responses and match them up. The arrangement of the inbound network processors 906C of the secondary processing elements 912A, 912B, described in more detail below, allows them to share information about packets coming from either direction, i.e. upstream or downstream. Further, the secondary processing elements 912A, 912B can affect the stateless processing of the primary processing elements 904A, 904B. For example, where the secondary processing elements 912A, 912B determine that packets from a certain network address are consistently invalid, the secondary processing elements 912A, 912B can add that network address to the filtering list of the primary processing elements 904A, 904B thereby dynamically updating the stateless processing environment.

For example, packets such as those traversing between a web browser and web server change port numbers once a session between the two entities is created. A stateless rule cannot be applied that says "don't allow HTTP POST commands from network address ABC" without destroying all communications from the network address ABC. To accomplish the desired filtering and not destroy all communications from the source network address, the device 900 watches for new sessions directed to the web server on port 80 (standard HTTP application port). By watching the traffic, an example session might choose to then communicate on port 23899 at the web server. Only by subsequently watching traffic destined to this new port would the device 900 be able to search for HTTP POST commands that need to be blocked. Once identified, the packets could then be dealt with. If the session startup was not monitored and information not stored for future reference, i.e. not storing state information, an HTTP POST command traversing the network as part of a text stream from a different application, such as a document about how to configure a blocking system, might be falsely identified. Stateful inspection generally requires visibility to traffic in both directions. In the case above, a packet from the client to the server would have shown the request for a new web session. The response from the server to the client would have shown the web server port number to monitor. In firewalls it is also this response that subsequently allows that port number to have future traffic allowed through the firewall. This second port number on the server is the one for which traffic can be subsequently monitored for the HTTP POST. By storing relevant information for future packet processing analysis, the device 900 is made stateful.

In addition, the device 900 includes a management adapter 914 which is coupled with the command/control bus 924. The management adapter 914 is used to manage the device 900 and control the functionality of the primary and secondary processing elements 904A, 904B, 912A, 912B. In one embodiment, the management adapter 914 includes a computer server having dual-Pentium III processors manufactured by Intel Corporation, located in Santa Clara, Calif., or suitable alternatives. The management adapter 914 further includes at least 64 MB of RAM and at least 10 GB of hard disk storage. The management adapter 914 is preferably implemented as a single board computer that plugs into the back plane, as described above, although more than one board as well as a stand alone personal computer may also be used. The management adapter 914 further includes an external management interface (not shown) which allows the connection of an external management device (not shown) for programming, controlling and maintaining the device 900. In one embodiment, the external management interface includes a model 82550 100 megabit Ethernet Interface manufactured by Intel Corporation, located in Santa Clara, Calif. Other interfaces, such as serial, parallel, coaxial and optical based interfaces may also be used. In one embodiment, the external management device is a desktop computer such as the Deskpro Model ENS SFF P733 manufactured by Compaq Computer Corporation, located in Houston, Tex. Alternatively, any suitable Pentium™ class computer having suitable memory and hard disk space in addition to Ethernet or other form of network connectivity, may be used. Further, the external management device may be located locally with respect to the device 900 or remotely and connected to the device 900 via a local or wide area network.

The primary processing elements 904A, 904B are preferably capable of operating in parallel. The two primary processing elements 904A, 904B, are also referred to as Media Adapter Cards ("MAC") or Media Blade Adapters ("MBA"). Each primary processing element 904A, 904B includes a network interface 920, two network processors 906A, 906B, a set 922A, 922B of one or more co-processors 908, a packet bus interface 928A, 928B, and a command/control bus interface 916. The network interface 920 is coupled with the network 100 via the network connection 910. In one embodiment, the network connection 910 is an optical network connection operating at a throughput of approximately 2.5 Gbps and a 1, 4 or 16 bit width. Each network processor 906A, 906B is coupled with the network interface 920, in a parallel configuration, to receive packets from the network 100. The network interface converts the protocol, bus width and frequency of the network connection 910 to the protocol, bus width and frequency of the network processors 906A, 906B. Further, the network interface 920 splits the incoming data stream between the network processors 906A, 906B, as described below. It will be appreciated that the disclosed embodiments can support any number of network processors 906A, 906B operating in parallel as described below, as the application demands. Further, each secondary processing element 912A, 912B is also coupled with network interface 920 of one of the primary processing elements 904A, 904B via packet busses 126C, 126D to transmit packets onto the network 100, described in more detail below. The network interface 920 converts the protocol, frequency and bus width of the packet busses 126C, 126D from the secondary processing elements to the protocol, frequency and bus width of the network connection 910. In addition, each network processor 906A, 906B is coupled with a set 922A, 922B of one or more co-processors 908 which is described in more detail below. Further, each network processor 906A, 906B is coupled with the command/control bus 924 via command/control interface busses 930A, 930B and the command/control bus interface 916. In one embodiment, the command/control interface busses 930A, 930B are compliant with the Personal Computer Interface ("PCI") standard and are 32 bits wide and operate at a frequency of at least 33 MHz. Further, the command/control bus interface 916 is a PCI to cPCI bus bridge for interfacing the busses 930A, 930B with the command/control cPCI bus 924, described above. Both network processors 906A, 906B are also coupled with one of the secondary processing elements 912A, 912B via the packet bus interface 928A, 928B and the packet bus 926A, 926B.

Each secondary processing element 912A, 912B also includes two network processors 906C, 906D, in a serial configuration, and a command/control bus interface 916. It will be appreciated that the disclosed embodiments can support any number of network processors 906A, 906B operating serially as described below, as the application demands. Each of the network processors 906C, 906D is coupled with the command/control bus 924 via the command/control interface busses 930C, 930D and the command/control bus interface 916. In one embodiment, the command/control interfaces are at least 33 MHz 32 bit PCI compliant as described above and the command/control bus interface 916 is a PCI-to-cPCI bus bridge as described above. One of the network processors 906C is coupled with both network processors 906A, 906B of one of the primary processing elements 904A, 904B via the packet bus 926A, 926C and packet bus interface 928A, 928B for receiving packet data from the primary processing elements 904A, 904B. The other of the network processors 906D is coupled with the network interface 920 of the other of the primary processing elements 904A, 904B via the packet bus 926B, 926D for sending packet data to the network 100, as described above. The secondary processing elements 912A, 912B are also referred to as Intelligent Packet Adapters ("IPA").

Each secondary processing element 912A, 912B further includes a shared synchronous dynamic RAM ("SDRAM") memory fabric 918 coupled between each of the network processors 906C, 906D to allow the network processors 906C, 906D to operate uni-directionally and move data from the inbound network processor 906C to the outbound network processor 906D. For more detail on the operation of this memory fabric 918, refer to U.S. Pat. Nos. 7,082,502 entitled "APPARATUS AND METHOD FOR INTERFACING WITH A HIGH SPEED BI-DIRECTIONAL NETWORK" and 7,428,618 entitled "APPARATUS AND METHOD FOR INTERFACING WITH A HIGH SPEED BI-DIRECTIONAL NETWORK", both of which are incorporated by reference herein.

In addition, one of the network processors 906C, from each secondary processing element 912A, 912B is coupled with a set 922C of co-processors 908. It will be appreciated that the description below relating to the sharing of co-processors 908 sets 922A, 922B between the two network processors 906A, 906B of the primary processing element 904A, 904B are applicable to the arrangement of the co-processors 908 and the secondary processing elements 912A, 912B. In one embodiment of the secondary processing elements 912A, 912B, the network processors 906C which are sharing the co-processors 908 of set 922C are located on two different circuit boards (one for each element 912A, 912B) which share a common daughter card containing the set 922C of co-processors 908.

Each network processor 906C, 906D handles one direction of the bi-directional packet flow coming to/from the secondary processing elements 912A, 912B. In particular, the inbound network processor 906C handles traffic incoming to the secondary processing element 912A, 912B and performs inspection and analysis tasks. The outbound network processor 906D handles outgoing traffic from the secondary processing element 912A, 912B and performing actions on the packet such as modification, cleansing/deletion or insertion of new or replacement packets. By serializing the network processors 906C, 906D on the secondary processing elements 912A, 912B, the processing of packets can be divided into steps and distributed between the two network processors 906C, 906D. It will be appreciated more network processors 906C, 906D may be coupled serially to enhance the ability to sub-divide the processing task, lowering the burden on any one network processor 906C, 906D only at the cost of the latency added to the packet stream by the additional network processors 906C, 906D and the additional hardware cost. The network processors 906C, 906D intercommunicate and share data via an SDRAM memory fabric to implement this serial packet flow. Further each secondary processing element 912A, 912B handles a different direction of packet flow from the network 100. In particular, the upstream secondary processing element 912A handles packets flowing from the network 100A upstream of the device 900 to the network 100B downstream of the device 900. The downstream secondary processing element 912B handles packets flowing from the network 100B downstream of the device 900 to the network 100A upstream of the device 900. For a more detailed description, please refer to U.S. Pat. Nos. 7,082,502 entitled "APPARATUS AND METHOD FOR INTERFACING WITH A HIGH SPEED BI-DIRECTIONAL NETWORK" and 7,428,618 entitled "APPARATUS AND METHOD FOR INTERFACING WITH A HIGH SPEED BI-DIRECTIONAL NETWORK", both of which are incorporated by reference herein.

The device 900 intercepts and processes packets from the network 100. One "upstream" primary processing element 904A intercepts packets arriving from the network 100A upstream of the device 900 and the other "downstream" primary processing element 904B intercepts packets arriving from the network 100B downstream of the device 900. The intercepted packets are pre-processed, as described above, and then passed on to a corresponding secondary processing element 912A, 912B for subsequent processing and possible release back to the network 100. Further, within each primary processing element 904A, 904B, the network interface 920 converts the protocol, frequency and bus width of the network connection 910 to the protocol, frequency an bus width of the network processors 906A, 906B and splits the incoming packet stream among the two network processors 906A, 906B which process packets in parallel (explained in more detail below). In one embodiment, the packet stream is alternated between the network processors 906A, 906B in a "ping-pong" fashion, i.e. a first packet going to one network processor 906A, 906B, the second packet going to the other network processor 906A, 906B and the next packet going back to the first network processor 906A, 906B, and so on. For more detail on this parallel packet processing architecture, refer to U.S. Pat. No. 7,114,008 entitled "EDGE ADAPTER ARCHITECTURE APPARATUS AND METHOD", incorporated by reference herein. The network processors 906A, 906B are further coupled with the packet bus interface 928A, 928B which couples both network processors 906A, 906B with the common packet bus 926A, 926C to the secondary processing elements 912A, 912B. The packet bus interface 928A, 928B converts the bus width of the packet processors 906A, 906B to the bus width of the packet bus 926A, 926C. For more information about the packet bus interface 928A, 928B, refer to U.S. Pat. Nos. 7,210,022 entitled "APPARATUS AND METHOD FOR INTERCONNECTING A PROCESSOR TO CO-PROCESSORS USING SHARED MEMORY AS THE COMMUNICATION INTERFACE" and 7,318,144 entitled "APPARATUS AND METHOD FOR INTERCONNECTING A PROCESSOR TO CO-PROCESSORS USING SHARED MEMORY", both which are incorporated by reference herein.

For example, a packet traveling from the network 100A upstream of the device 900 to the network 100B downstream of the device 900 is intercepted by the network interface 920 of the upstream primary processing element 904A. The network interface 920 passes the intercepted packet to one of the network processors 906A, 906B which preliminarily process the packet as described above. This may involve the shared co-processors 908, as described below. The packet is then transmitted to the inbound network processor 906C of the upstream secondary processing element 912A for subsequent processing via the packet bus interface 928A and the packet bus 926A. Within the upstream secondary processing element 912A, the packet is processed and moved from the inbound network processor 906C to the outbound network processor 906D via the SDRAM memory fabric 918. This processing may involve processing by the shared co-processors 922. If it is determined that the packet is to be released, in original or modified form, the outbound network processor 906D sends the packet to the network interface 920 of the downstream primary processing element 904B via the packet bus 926B. The network interface 920 of the downstream primary processing element 904B then transmits the packet back onto the network 100B.

For packets traveling from the network 100B downstream of the device 900 to the network 100A upstream of the device 900, the packets are intercepted by the network interface 920 of the downstream primary processing element 904B. The network interface 920 passes the intercepted packet to one of the network processors 906A, 906B which preliminarily process the packet as described above. This may involve the shared co-processors 908, as described below. The packet is then transmitted to the inbound network processor 906C of the downstream secondary processing element 912B for subsequent processing via the packet bus interface 928B and packet bus 926C. Within the downstream secondary processing element 912B, the packet is processed and moved from the inbound network processor 906C to the outbound network processor 906D via the SDRAM memory fabric 918. This processing may involve processing by the shared co-processors 922. If it is determined that the packet is to be released, in original or modified form, the outbound network processor 906D sends the packet to the network interface 920 of the upstream primary processing element 904A via the packet bus 926D. The network interface 920 of the upstream primary processing element 904A then transmits the packet back onto the network 100A.

Overall, the device 900 intercepts packets flowing in an up or downstream direction, processes them and determines a course of action based on the application that the device 900 is implementing. Such actions include, for example, releasing the packet to the network 100, modifying the packet and releasing it to the network 100, deleting the packet, substituting a different packet for the intercepted packet, forwarding the packet to additional internal or external processing resources (not shown), logging/storing information about the packet, or combinations thereof. Applications include content delivery application or security applications such as for preventing unauthorized network access or preventing denial of service attacks.

The network processor 906A, 906B, 906C, 906D used in the primary and secondary processing elements 904A, 904B, 912A, 912B is preferably a general purpose network processor which is suitable for a wide variety of network applications. In one embodiment, each primary and secondary processing element 904A, 904B, 912A, 912B includes two network processors 906A, 906B, 906C, 906D and supporting hardware (not shown), as described above. An exemplary network processor 906A, 906B, 906C, 906D is the Intel IXP1200 Network Processor Unit, manufactured by Intel Corporation, located in Santa Clara, Calif. or Netronome NFP-3200 network flow processor manufactured by Netronome Inc., located in Cranberry Twp, Pa. For more detailed information about the exemplary processor 906, please refer to Intel® IXP1200 Network Processor Datasheet part no. 278298-007 published by Intel Corporation, located in Santa Clara, Calif. This exemplary network processor 906A, 906B provides six micro-engines/path-processors for performing processing tasks as well as a StrongARM™ control processor. Each of the network processors 906A, 906B, 906C, 906D preferably operates a frequency of 233 MHz or faster, although slower clock speeds may be used. It will be appreciated that other network specific or general purpose processors may be used.

As with most general purpose processors, the network processor 906A, 906B, 906C, 906D is capable of being programmed to perform a wide variety of tasks. Unfortunately, this adaptability typically comes at the price of performance at any one given task. Therefore, to assist with the processing of packets, each network processor 906A, 906B on the primary processing element 904A, 904B and the inbound network processor 906C on the secondary processing element 912A, 912B is coupled with one or more co-processor 908 sets 922A, 922B, 922C. The co-processors 908 on each set 922A, 922B, 922C may be specialized processors which perform a more limited set of tasks, but perform them faster and more efficiently than the network processor 906A, 906B, 906C is capable of. In one embodiment, the co-processors 908 include one or more classification co-processors and one or more content addressable memories ("CAM").

The classification co-processors 908 are used to accelerate certain search and extraction rules for the network processor 906A, 906B, 906C. In one embodiment of device 900, the co-processor 908 set 922A, 922B of each primary processing element 904A, 904B includes two classification co-processors 908. The shared co-processor 908 set 922C also includes two classification co-processors shared by the secondary processing elements 912A, 912B. An exemplary classification co-processor is the PM2329 ClassiPI Network Classification Processor manufactured PMC-Sierra, Inc., located in Burnaby, BC Canada. This co-processor is capable of operating at a frequency of at least 100 MHz.

The CAM co-processors 908 are used to facilitate certain search and compare operations that would otherwise be computationally intensive and degrade the performance of the network processor 906A, 906B, 906C. It is preferable that the CAM co-processors 108 be capable of being cascaded together, from 2 to 8, or more devices, to increase the search range. It is further preferable that the CAM co-processors 108 have the capability of processing at least 100 million compares per second. In such a design, each CAM data bit has an associated local mask bit that is used during the compare operation. In contrast with global mask bits, the local mask bits are used only with the associated bit and only for compare operations. This provides masking on an individual bit basis for ternary operation. In one embodiment of the device 900, the co-processor 908 set 922A, 922B of each primary processing element 904A, 904B includes eight CAM co-processors 908. The shared co-processor 908 set 922C also includes eight CAM co-processors 908 shared by the secondary processing elements 912A, 912B. An exemplary CAM is the NetLogic NSE3128 Network Search Engine, formerly named IPCAM®-3, manufactured by Net- Logic Microsystems, Inc., located in New York City, N.Y. For more detailed information about the exemplary CAM, refer to NSE3128 Network Search Engine product brief available at the web site netlogic.com/html/datasheets/nse3128.html, last accessed May 11, 2001.

An exemplary CAM device may have at least the following features:

Organization options of any single device in cascade: 64K×72, 32K×144 or 16K×288;
Local mask bit associated with each CAM;
Clock rates: 50/66/100 MHz for 1 megabit devices or up to 200 MHz for a 9 megabit device;
Eight global mask registers;
16 bit instruction bus;
32 bit result bus;
36/72 bit comparand bi-directional bus or 72/144 bit comparand bus for a 9 megabit device;
flags to indicate Match ("/M"), Multiple Match ("/MM") and Full Flag ("/FF"); and
24 bit Next Free Address ("NFA") bus.

It will be appreciated that other classification processors and CAM's may be used and that additional task specific co-processors may also be used, such as cryptographic co-processors, to enhance the processing capability of the primary or secondary processing elements 904A, 904B, 912A, 912B.

As was discussed, the device 900 has to be able to operate at wire speed or faster so as not to degrade network throughput. In the case of an OC-48 class network, this means handling communications speeds of nearly 2.5 Gbps in both directions through the device 900 simultaneously to achieve full duplex functionality, for a total of nearly 5 Gbps throughput for the device 900. Ideally, to achieve this goal, the co-processors 908 should be directly connected to the network processors 906A, 906B, 906C. This would achieve the highest bandwidth of data exchange between these devices, maximizing their utilization and efficiency. Unfortunately, physical, electrical and device design limitations make this direct connection difficult to achieve.

With regard to the primary processing elements 904A, 904B, the physical limitations primarily include the limited amount of space/area available on a single circuit board. It is difficult and expensive to implement two network processors 906A, 906B, their supporting hardware and up to ten co-processors 908, or more, as well as all of the routing interconnections on a single circuit board. An alternative is to move some of the devices to daughter card circuit boards which plug into a main circuit board. This would increase the available area for part placement but introduces electrical concerns regarding the interfaces between the devices. In particular, a daughter card arrangement introduces a board-to-board connector between the daughter card and the main circuit board. This connector introduces undesirable electrical characteristics into the interface between devices mounted on the daughter card and devices mounted on the main circuit board. These undesirable characteristics include increased noise, lower limits on operating frequency, increased parasitic capacitance, increased resistance and increased inductance. These characteristics limit the speed with which these devices can communicate. In order to properly interface across the connector, careful modeling is required to predict the electrical behavior of the connector and how it will impact the interface.

Further, complexities related to interfacing the network processors 906A, 906B to the co-processors 908 also complicate the design and implementation of the device 900. In particular, both the network processor 906A, 906B and the co-processors 908 provide input/output busses for the purpose of interconnecting that device with other devices. However, the network processor 906A, 906B as well as the different types of co-processors 908, all have different interface requirements, such as different supported clock frequencies, bus widths and communications protocols. In addition, the interfaces are further complicated by the desire to connect more than one of each type of co-processor 908 with the network processor 906A, 906B. Even further complicating the interface requirements is the desire to allow each network processor 906A, 906B on the processing element 904 to share the same co-processors 908 and allow each inbound network processor 906C to share the same co-processor 908 set 922C. Sharing co-processor 908 sets 922A, 922B, 922C allows the network processors 906A, 906B, 906C to interoperate and share data, such as state information, in addition to saving costs by reducing the number of devices on the primary processing elements 904A, 904B. When one network processor 906A, 906B, 906C decides to store state information, that information is made available to the other network processor 906A, 906B, 906C. Further, when global updates to the data stored within the co-processors 908 are needed, such as updates to the CAM tables, these updates can be performed more efficiently since there are fewer co-processor sets 922A, 922B, 922C to update. For example, when the secondary processing elements 912A, 912B, due to the result of some stateful processing task, need to update the state information in the CAM data, such as the filtering block lists, the updates need to go to fewer devices resulting in a faster and more efficient distribution of those updates. Further, the sharing of state information among the network processors 906A, 906B on the primary processing elements 904A, 904B, allows the network processors 906A, 906B to operate in parallel and thereby reduces the traffic flow to each network processor 906A, 906B, achieving a longer number of clock cycles over which a packet may be processed.

For more detail on the operation of this co-processor 90 sharing and the interface between the primary and secondary network elements 904A, 904B, 912A, 912B and the co-processor sets 922A, 922B, 922C, refer to U.S. Pat. Nos. 7,210,022 entitled "APPARATUS AND METHOD FOR INTERCONNECTING A PROCESSOR TO CO-PROCESSORS USING SHARED MEMORY AS THE COMMUNICATION INTERFACE" and 7,318,144 entitled "APPARATUS AND METHOD FOR INTERCONNECTING A PROCESSOR TO CO-PROCESSORS USING SHARED MEMORY", both which are incorporated by reference herein.

In addition, the architecture of the device 900 allows for efficient processing of any portion of the packet regardless of whether it is in the header or payload. This allows for more flexible packet analysis which can adapt to changing network protocols. For example, packet changes such as Multi-protocol Label Switching ("MPLS") have made even the normal IP header look different in a packet since it is now preceded by the MPLS tag. Similarly, new network application are constantly being developed may have their own format and header/payload structure. The disclosed architecture does not treat the header any different from payload in its ability to analyze a given packet. This allows for maximum adaptability to evolving network technologies.

As can be see, the above description discloses a unique architecture capable of bridging the technology gap between existing network processing technology and next generation networking technology. The architecture of the device 900 leverages parallel processing for stateless tasks and serialized/staged processing for stateful tasks. It will be appreciated that the ability to process data statefully requires bi-directional visibility over the traffic stream of the network 102 and further requires deployment of the device 900 at a point, i.e. a choke point, within the network 102 where all traffic of interest is visible and through which it must flow. Alternatively, the device 900 can provide partial stateful and stateless operation in situations where complete bi-directional visibility cannot be guaranteed or is not available.

For stateless processing tasks, such as filtering, pre-processing and other tasks not requiring knowledge of historical packet activity or matching of bi-directional packet activity, multiple parallel network processors 906A, 906B are provided for each network 102A, 102B direction of the bi-directional traffic stream. The incoming packets are equally distributed among the parallel network processors 906A, 906B, which reduces the load on any one processor. As described above, the primary processing elements 904A, 904B provide two network processors 906A, 906B each, operating parallel. Further, the architecture is scalable, allowing for additional parallel network processors 906A, 906B to be added to provide additional processing capability, with only the cost of the additional hardware required. The architecture of the device 900 further allows for the parallel network processors 906A, 906B to share a common set 922A, 922B of co-processors 108. In addition to hardware savings, this configuration permits the processors 906A, 906B to share state information among themselves, further increasing efficiency of operation.

Where a particular application requires stateful processing tasks, such as a security application that needs to monitor bi-directional and/or historical packet activity, the architecture of the device 900 further provides serialized/staged processors for each direction of the packet flow. These serialized/staged processors divide up the required processing tasks, thereby reducing the load on any one processor. For each direction, a the packet data flows through an inbound processor 906C dedicated to receiving inbound traffic and performing inspection, analysis and other preliminary tasks. The inbound processor then passes the packet data to an outbound processor via a memory fabric, described above. The outbound processor then completes the processing, such as by modifying, deleting, or releasing the packet modified or unmodified and or logging/storing information about the packet for subsequent processing. It will be appreciated that the architecture is scalable and that additional network processors 906C, 906D may be added to further divide up the processing burden, reducing the load on individual network processors 906C, 906D. Additional network processors 906C, 906D may be connected using the described memory fabric or by coupling multiple secondary processing elements 912A, 912B in series via the IX bus and backplane described above. Further, the inbound processors of each direction of packet flow are coupled together via a common set 922C of co-processors similar to the parallel configured processors 906A, 906B. In addition to the hardware savings, this configuration permits the efficient sharing of bi-directional packet activity, thereby providing complete stateful processing capability of the bi-directional packet flow. Further, the network processors 906C, 906D performing the stateful processing can dynamically update state information to the stateless network processors 906A, 906B, thereby providing dynamic accommodation to changing network conditions.

The architecture of the device 900 bridges the network and packet processing technology gap by distributing the processing tasks and reducing the load and utilization of any one network processor 906A, 906B, 906C, 906D. For example, Network Processing Units (NPUs) such as the Intel® IXP1200, described above, were originally designed to be "systems on a chip" that performed all of the required processing tasks. They provide data buses, memory buses (SDRAM and SRAM) as well as interface buses (general purpose 10 and PCI). Additionally they have multiple fast path processors, often called micro-engines, and control processors often embedded or attached via a control processor interface. In the case of the Intel IXP1200 a StrongARM control processor is embedded. These chips expect that data flows in from the data bus, is processed immediately or stored in SDRAM or SRAM memory for further processing. At the time of forwarding of the data, the data is read from the memory and forwarded out on the data bus. This methodology infers that data must traverse the data and memory buses at least twice, once to store and once to forward a packet.

The architecture of the device 900 sends packets on a data bus only once and traverse the memory bus at most twice versus a possible three times in the prior design. With regards to the memory bus the packet is written and only the portions of the packet required for inspection which were not processed as they flow through the processor need be read. This results in a 1 to 2 times flow rate utilization of the memory bus. Forwarding is handled invisibly to the processor, via the memory fabric, and thus removes that third traditional movement of the data across the memory bus.

The single direction of traffic flow through the device 900 allows network processors 906A, 906B, 906C, 906D to be able to process data flows faster than originally intended. This is due to the fact that most processors are constrained by bus saturation. Take the IXP1200 for example, the SDRAM bus is a 6.6 Gbps bus with saturation around 5 Gbps. The IX Bus (data bus) is a 6 Gbps bus with saturation around 4.1 Gbps. To understand traffic levels that can be achieved one should take the worst case traffic flow, which is generally small packets at highest flow rate, to calculate what can be processed. The SDRAM would limit a traditional environment to 1.66 Gbps and the IX Bus would limit at 2 Gbps. These are maximums and headroom should be preserved. This estimate would suggest that Gigabit Ethernet would be the most an IXP1200 could attain. By using the network processor 906A, 906B, 906C, 906D uni-directionally, OC-48 requires only 2.5 Gbps on the data bus and no more that 5 Gbps on the memory bus. This allows existing devices to process faster than originally intended. Additionally, since the packets are moved around less, no processor is required to forward the packets which frees up more internal micro-engines for processing the packet.

This same approach can utilize the newer network processors 906A, 906B, 906C, 906D being developed to handle OC-48 and faster networks to be able to process packets at speeds up to OC-192 (10 Gbps) and faster. This can be done with external memory versus internal memory. This is a significant issue since internal memory requires a far more complex design of a network processor, increasing design time, reducing yields and increasing costs.

As can be seen, the preferred packet interception device implements scalable, transparent and non-invasive interception of packets for multiple devices. It is therefore intended that the foregoing detailed description be regarded as illustrative rather than limiting, and that it be understood that it is the following claims, including all equivalents, that are intended to define the spirit and scope of this invention.

We claim:

1. A method of transparently interfacing a first application to a network, the method comprising:

interfacing between the network and a first application network interface of the first application, the first application being provided by a first application service provider and operative to provide a first service via the interfacing, the first application network interface being capable of connecting the first application to the network, the network carrying a plurality of packets in a first format incompatible with the first application, each packet of the plurality of packets being transmitted, via the network, by a source to at least one intended destination intended by the source, each packet of the plurality of packets comprising routing data operative to cause the forwarding of the packet via the network towards the at least one intended destination, the network comprising a first portion and a second portion, the first portion being from the source to the interfacing, the second portion being from the interfacing to the at least one intended destination, the first portion being different than the second portion;

intercepting each packet of at least a portion of the plurality of packets received via the first portion prior to a forwarding thereof toward the at least one intended destination via the second portion;

evaluating each of the intercepted packets based on a first specification of a first subset of the plurality of packets with respect to which the first application is to perform the first service; and converting an intercepted packet from the first format to a second format compatible with the first application and incompatible with the first and second portions of the network, storing information representative thereof and providing the converted intercepted packet to the first application via the first application network interface to facilitate the performance of the first service with respect to the intercepted packet, if the intercepted packet is one of the specified first subset;

receiving in response to the providing of the converted intercepted packet to the first application, from the first application via the first application interface when the performance of the first service results in a response, a response packet in the second format resulting from the performance of the first service by the first application with respect to the provided converted intercepted packet;

converting the response packet from the second format to the first format based on the stored information; and forwarding the converted response packet to the network, towards the at least one intended destination, wherein the first service provided by the first application is a service other than causing of the forwarding of the packet via the network towards the at least one intended destination, the first application and the first service provided thereby being separate from the at least one intended destination intended by the source and being independent of the converting.

2. The method of claim 1 further comprising forwarding the intercepted packet to the network if the intercepted packet is not one of the specified first subset.

3. The method of claim 1 further comprising deleting the intercepted packet if the intercepted packet is not one of the specified first subset.

4. The method of claim 1 wherein the converting of the intercepted packet further comprises modifying a portion of the intercepted packet from an original state to a modified state, the stored information being representative of the modification.

5. The method of claim 4 wherein the converting of the response packet further comprises restoring the portion from the modified state to the original state.

6. The method of claim 4 wherein the portion comprises at least a portion of the header of the intercepted packet.

7. The method of claim 1 wherein the first format conforms to a first communications protocol and the second format conforms to a second communications protocol different from the first communications protocol.

8. The method of claim 7 wherein the first format comprises IPv6 and the second format comprises IPv4.

9. The method of claim 7 wherein the first format comprises multi-protocol label switching ("MPLS") and the second format comprises Ethernet.

10. The method of claim 1 further comprising modifying the first specification based on the intercepted packet, the response packet or a combination thereof, a subsequent intercepted packet being evaluated in accordance therewith.

11. The method of claim 10 wherein the modification of the first specification excludes the subsequent intercepted packet from the first subset.

12. The method of claim 10 wherein the subsequent intercepted packet was transmitted from the at least one destination to the source.

13. The method of claim 1 wherein the specified first subset comprises all of the plurality of packets.

14. The method of claim 1 wherein the first specification specifies the first subset based on at least the routing data.

15. The method of claim 1 wherein the first specification specifies the first subset based on criteria other than only the routing data.

16. The method of claim 15 wherein the criteria identifies the source of the intercepted packet as a subscriber to the first service.

17. The method of claim 16 wherein the criteria is provided by the first application service provider.

18. The method of claim 1 further comprising modifying the first specification based on the intercepted packet, a subsequent intercepted packet being evaluated in accordance therewith.

19. The method of claim 18 wherein the modification of the first specification excludes the subsequent intercepted packet from the first subset.

20. The method of claim 18 wherein the subsequent intercepted packet was transmitted from the at least one destination to the source.

21. The method of claim 1 further comprising:

interfacing between the network and a second application network interface of a second application, the second application being provided by a second application service provider and operative to provide a second service via the network, the second application network interface being capable of connecting the second application to the network, wherein the first format is incompatible with the second application;

wherein the evaluating further comprises evaluating the intercepted packet based on a second specification of a second subset of the plurality of packets with respect to which the second application is to perform the second service; and wherein the converting further comprises converting the intercepted packet from the first format to a third format compatible with the second application, storing information representative thereof and providing the converted intercepted packet to the second application via the second application network interface to facilitate the performance of the second service with respect to the intercepted packet, if the intercepted packet is one of the specified second subset.

22. The method of claim 21 wherein the first and second services are the same, the first subset being different from the second subset.

23. The method of claim 21 further comprising:
receiving, in response to the forwarding of the converted intercepted packet to the first application, from the first application via the first application interface, a response packet in the second format resulting from the performance of the first service by the first application with respect to the forwarded converted intercepted packet;
receiving, in response to the forwarding of the converted intercepted packet to the second application, from the second application via the second application interface, a response packet in the third format resulting from the performance of the second service by the second application with respect to the forwarded converted intercepted packet;
converting the response packet to the first format based on the stored information; and
forwarding the converted response packet to the network.

24. The method of claim 23 further comprising modifying the first specification, the second specification, or a combination thereof, based on the intercepted packet, the response packet or a combination thereof, a subsequent intercepted packet being evaluated in accordance therewith.

25. The method of claim 24 wherein the modification of the first specification or second specification excludes the subsequent intercepted packet from the first subset or second subset respectively.

26. The method of claim 24 where in the modification of the first specification excludes the subsequent intercepted packet from the first subset and the modification of the second specification includes the subsequent intercepted packet in the second subset.

27. The method of claim 24 wherein the subsequent intercepted packet was transmitted from the at least one destination to the source.

28. The method of claim 1, further comprising processing a subsequent packet intercepted subsequent to the intercepted packet based on the stored information.

29. The method of claim 1, wherein the storing further comprises modifying the first specification based on the stored information wherein the first subset is altered thereby.

30. The method of claim 1, wherein the first application is unaware of those intercepted packets which are not included in the first subset.

31. The method of claim 1, wherein the at least one intended destination comprises the first application.

32. The method of claim 1, wherein the first specification is provided by the first application service provider.

33. The method of claim 1
wherein forwarding the converted response packet to the network, towards the at least one intended destination comprises forwarding the converted response packet to an intended destination of the at least one intended destination intended by the source via the network, the intended destination being separate from the first application and the first service provided thereby.

34. The method of claim 1, wherein the first service is an antivirus service, an anti-spam service, or an intrusion protection service.

35. A system for transparently interfacing a first application to a network, the system comprising:
a system network interface operative to interface between the network and a first application network interface of the first application, the first application being provided by a first application service provider and operative to provide a first service via the system network interface, the first application network interface being capable of connecting the first application to the network, the network carrying a plurality of packets in a first format incompatible with the first application, each packet of the plurality of packets being transmitted, via the network, by a source to at least one intended destination intended by the source, each packet of the plurality of packets comprising routing data operative to cause the forwarding of the packet via the network towards the at least one intended destination, the network comprising a first portion and a second portion, the first portion being from the source to the system network interface, the second portion being from the system network interface to the at least one intended destination, the first portion being different than the second portion;
a packet interceptor coupled with the system network interface and operative to intercept each packet of at least a portion of the plurality of packets received via the first portion prior to a forwarding thereof toward the at least one intended destination via the second portion;
a packet evaluator coupled with the packet interceptor and operative to evaluate each of the intercepted packets based on a first specification of a first subset of the plurality of packets with respect to which the first application is to perform the first service; and
a packet converter coupled with the packet evaluator and operative to convert an intercepted packet from the first format to a second format compatible with the first application and incompatible with the first and second portions of the network, store information representative thereof and provide the converted intercepted packet to the first application via the first application network interface to facilitate the performance of the first service with respect to the intercepted packet, if the intercepted packet is one of the specified first subset,
wherein the first service provided by the first application is a service other than causing of the forwarding of the packet via the network towards the at least one intended destination, the first application and the first service provided thereby being separate from the at least one intended destination intended by the source and being independent of the converting,
wherein the packet converter is further operative to receive, in response to having provided the converted intercepted packet to the first application, from the first application via the first application interface, a response packet in the second format as a result of the performance of the first service by the first application with respect to the provided converted intercepted packet, the packet converter being further operative to convert the response packet from the second format to the first format based on the stored information, and
wherein the system further comprises a packet forwarder coupled with the packet converter and operative to forward the converted response packet to the network.

36. The system of claim 35 further comprising a packet forwarder coupled with the packet evaluator and operative to forward the intercepted packet to the network if the intercepted packet is not one of the specified first subset.

37. The system of claim 35 a packet remover coupled with the packet evaluator and operative to delete the intercepted packet if the intercepted packet is not one of the specified first subset.

38. The system of claim 35 wherein the packet converter is further operative to modify a portion of the intercepted packet from an original state to a modified state, the stored information being representative of the modification.

39. The system of claim 38 wherein the packet converter is further operative to restore the portion from the modified state to the original state.

40. The system of claim 38 wherein the portion comprises at least a portion of the header of the intercepted packet.

41. The system of claim 35 wherein the first format conforms to a first communications protocol and the second format conforms to a second communications protocol different from the first communications protocol.

42. The system of claim 41 wherein the first format comprises IPv6 and the second format comprises IPv4.

43. The system of claim 41 wherein the first format comprises multi-protocol label switching ("MPLS") and the second format comprises Ethernet.

44. The system of claim 34 wherein the packet converter is further operative to modify the first specification based on the intercepted packet, the response packet or a combination thereof, a subsequent intercepted packet being evaluated in accordance therewith.

45. The system of claim 44 wherein the modification of the first specification excludes the subsequent intercepted packet from the first subset.

46. The system of claim 44 wherein the subsequent intercepted packet was transmitted from the at least one destination to the source.

47. The system of claim 35 wherein the specified first subset comprises all of the plurality of packets.

48. The system of claim 35 wherein the first specification specifies the first subset based on at least the routing data.

49. The system of claim 35 wherein the first specification specifies the first subset based on criteria other than only the routing data.

50. The system of claim 49 wherein the criteria identifies the source of the intercepted packet as a subscriber to the first service.

51. The system of claim 50 wherein the criteria is provided by the first application service provider.

52. The system of claim 35 wherein the packet converter is further operative to modify the first specification based on the intercepted packet, a subsequent intercepted packet being evaluated in accordance therewith.

53. The system of claim 52 wherein the modification of the first specification excludes the subsequent intercepted packet from the first subset.

54. The system of claim 52 wherein the subsequent intercepted packet was transmitted from the at least one destination to the source.

55. The system of claim 35 wherein:
the system network interface is further operative to interface between the network and a second application network interface of a second application, the second application being provided by a second application service provider and operative to provide a second service via the network, the second application network interface being capable of connecting the second application to the network, wherein the first format is incompatible with the second application;
wherein the packet evaluator is further operative to evaluate the intercepted packet based on a second specification of a second subset of the plurality of packets with respect to which the second application is to perform the second service; and
wherein the packet converter is further operative to convert the intercepted packet from the first format to a third format compatible with the second application, store information representative thereof and provide the converted intercepted packet to the second application via the second application network interface to facilitate the performance of the second service with respect to the intercepted packet, if the intercepted packet is one of the specified second subset.

56. The system of claim 55 wherein the first and second services are the same, the first subset being different from the second subset.

57. The system of claim 55 wherein:
the packet converter is further operative to receive, in response to the forwarding of the converted intercepted packet to the first application, from the first application via the first application interface, a response packet in the second format as a result of the performance of the first service by the first application with respect to the forwarded converted intercepted packet;
the packet converter is further operative to receive, in response to the forwarding of the converted intercepted packet to the second application, from the second application via the second application interface, a response packet in the third format as a result of the performance of the second service by the second application with respect to the forwarded converted intercepted packet;
the packet converter being further operative to convert the response packet to the first format based on the stored information; and
wherein the system further comprises a packet forwarder coupled with the packet converter and operative to forward the converted response packet to the network.

58. The system of claim 57 wherein the packet converter is further operative to modify the first specification, the second specification, or a combination thereof, based on the intercepted packet, the response packet or a combination thereof, a subsequent intercepted packet being evaluated in accordance therewith.

59. The system of claim 58 wherein the modification of the first specification or second specification excludes the subsequent intercepted packet from the first subset or second subset respectively.

60. The system of claim 58 wherein the modification of the first specification excludes the subsequent intercepted packet from the first subset and the modification of the second specification includes the subsequent intercepted packet in the second subset.

61. The system of claim 58 wherein the subsequent intercepted packet was transmitted from the at least one destination to the source.

62. The system of claim 35, wherein the packet evaluator is further operative to evaluate a subsequent packet intercepted subsequent to the intercepted packet based on the stored information.

63. The system of claim 35, wherein the packet converter is further operative to modify the first specification based on the stored information wherein the first subset is altered thereby.

64. The system of claim 35, wherein the first application is unaware of those intercepted packets which are not included in the first subset.

65. The system of claim 35, wherein the at least one intended destination comprises the first application.

66. The system of claim 35, wherein the first specification is provided by the first application service provider.

67. A system for transparently interfacing a first application to a network, the system comprising:
- a processor and a memory coupled with the processor; and
- a system network interface coupled with the processor and operative to interface between the network and a first application network interface of the first application, the first application being provided by a first application service provider and operative to provide a first service via the system network interface, the first application network interface being capable of connecting the first application to the network, the network carrying a plurality of packets in a first format incompatible with the first application, each packet of the plurality of packets being transmitted, via the network, by a source to at least one intended destination intended by the source, each packet of the plurality of packets comprising routing data operative to cause the forwarding of the packet via the network towards the at least one intended destination, the network comprising a first portion and a second portion, the first portion being from the source to the system network interface, the second portion being from the system network interface to the at least one intended destination, the first portion different than the second portion;

wherein the system further comprises:
- first logic stored in the memory and executable by the processor to cause the system network interface to intercept each packet of at least a portion of the plurality of packets received via the first portion prior to a forwarding thereof toward the at least one intended destination via the second portion;
- second logic stored in the memory and executable by the processor to evaluate each of the intercepted packets based on a first specification of a first subset of the plurality of packets with respect to which the first application is to perform the first service; and
- third logic stored in the memory and executable by the processor to convert an intercepted packet from the first format to a second format compatible with the first application and incompatible with the first and second portions of the network, store information representative thereof and provide the converted intercepted packet to the first application via the first application network interface to facilitate the performance of the first service with respect to the intercepted packet, if the intercepted packet is one of the specified first subset, wherein the first service provided by the first application is a service other than causing of the forwarding of the packet via the network towards the at least one intended destination, the first application and the first service provided thereby being separate from the at least one intended destination intended by the source and being independent of the converting, wherein the third logic is further executable by the processor to receive, in response to having provided the converted intercepted packet to the first application, from the first application via the first application interface, a response packet in the second format as a result of the performance of the first service by the first application with respect to the provided converted intercepted packet, the packet converter being further operative to convert the response packet from the second format to the first format based on the stored information, and wherein the system further comprises fourth logic stored in the memory and executable by the processor to forward the converted response packet to the network.

68. A system for transparently interfacing a first application to a network, the first application being provided by a first application service provider and operative to provide a first service via the network, the first application including a first application network interface capable of connecting the first application to the network, the network carrying a plurality of packets in a first format incompatible with the first application, each being transmitted, via the network, by a source to at least one intended destination intended by the source, the at least one intended destination being separate from the first application, each of the plurality of packets comprising routing data operative to cause the forwarding of the packet via the network towards the at least one intended destination, the system comprising:
- means for interfacing between the network and a first application network interface of the first application, the first application being provided by a first application service provider and operative to provide a first service via the means for interfacing, the first application network interface being capable of connecting the first application to the network, the network carrying a plurality of packets in a first format incompatible with the first application, each packet of the plurality of packets being transmitted, via the network, by a source to at least one intended destination intended by the source, each packet of the plurality of packets comprising routing data operative to cause the forwarding of the packet via the network towards the at least one intended destination, the network comprising a first portion and a second portion, the first portion being from the source to the means for interfacing, the second portion being from the means for interfacing to the at least one intended destination, the first portion different than the second portion;
- means for intercepting each packet of at least a portion of the plurality of packets received via the first portion prior to a forwarding thereof toward the at least one intended destination via the second portion;
- means for evaluating each of the intercepted packets based on a first specification of a first subset of the plurality of packets with respect to which the first application is to perform the first service;
- means for converting, independent of the first application and the first service provided thereby, an intercepted packet from the first format to a second format compatible with the first application and incompatible with the first and second portions of the network, storing information representative thereof and providing the converted intercepted packet to the first application via the first application network interface to facilitate the performance of the first service with respect to the intercepted packet, if the intercepted packet is one of the specified first subset;
- means for receiving in response to the providing of the converted intercepted packet to the first application, from the first application via the first application interface, a response packet in the second format resulting from the performance of the first service by the first application with respect to the provided converted intercepted packet;

means for converting the response packet from the second format to the first format based on the stored information; and means for forwarding the converted response packet to the network, wherein the first service provided by the first application is a service other than causing of the forwarding of the packet via the network towards the at least one intended destination, the first application and the first service provided thereby being separate from the at least one intended destination intended by the source and being independent of the converting.

* * * * *